United States Patent
Osawa et al.

(10) Patent No.: US 9,687,743 B2
(45) Date of Patent: Jun. 27, 2017

(54) INFORMATION PROCESSING SYSTEM, INFORMATION PROCESSING APPARATUS, AND COMPUTER-READABLE STORAGE MEDIUM HAVING INFORMATION PROCESSING PROGRAM STORED THEREIN

(75) Inventors: Toru Osawa, Kyoto (JP); Satoshi Kira, Kyoto (JP); Shinya Saito, Kyoto (JP); Kenta Tanaka, Kyoto (JP); Jumpei Horita, Kyoto (JP); Kozo Makino, Kyoto (JP); Yoshiteru Fukuda, Kyoto (JP); Masayuki Kuwajima, Kyoto (JP); Takashi Yoshimi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 426 days.

(21) Appl. No.: 12/608,137

(22) Filed: Oct. 29, 2009

(65) Prior Publication Data

US 2011/0013879 A1 Jan. 20, 2011

(30) Foreign Application Priority Data

Jul. 14, 2009 (JP) .................. 2009-165688

(51) Int. Cl.
*H04N 5/76* (2006.01)
*H04N 9/80* (2006.01)
(Continued)

(52) U.S. Cl.
CPC ............ *A63F 13/60* (2014.09); *A63F 13/332* (2014.09); *A63F 13/77* (2014.09); *A63F 13/92* (2014.09);
(Continued)

(58) Field of Classification Search
CPC ........ H04N 9/804; H04N 5/85; H04N 9/8205; G11B 27/105; G11B 27/329;
(Continued)

(56) References Cited

U.S. PATENT DOCUMENTS 6,540,614 B1 * 4/2003 Nishino et al. ................. 463/40
7,115,031 B2 * 10/2006 Miyamoto et al. ............... 463/1
(Continued)

FOREIGN PATENT DOCUMENTS

| JP | 2002-271708 | 9/2002 |
|----|-------------|--------|
| JP | 2004-164589 | 6/2004 |

(Continued)

OTHER PUBLICATIONS

Pokémon Battle Revolution, DS Battle Mode, The Pokémon Company, URL: http://www.pokemon.co.jp/game/wii/pbr_sp/mode.html searched Jul. 2009.
(Continued)

*Primary Examiner* — Nigar Chowdhury
(74) *Attorney, Agent, or Firm* — Nixon & Vanderhye PC

(57) ABSTRACT

A first information processing apparatus executes an application, and generates control data in accordance with a state of an execution of the application. The control data is transmitted to a second information processing apparatus. Video data is stored in advance in the second information processing apparatus. The second information processing apparatus receives the control data transmitted from the first information processing apparatus, determines a video to be reproduced based on the control data, and reproduces the video based on the video data.

12 Claims, 30 Drawing Sheets

(51) Int. Cl.
   *A63F 13/60* (2014.01)
   *A63F 13/92* (2014.01)
   *A63F 13/332* (2014.01)
   *A63F 13/77* (2014.01)
   *H04N 21/41* (2011.01)
   *H04N 21/436* (2011.01)
   *H04N 21/4363* (2011.01)

(52) U.S. Cl.
   CPC ... *H04N 21/4126* (2013.01); *H04N 21/43615* (2013.01); *H04N 21/43637* (2013.01); *A63F 2300/402* (2013.01); *A63F 2300/403* (2013.01); *A63F 2300/552* (2013.01)

(58) Field of Classification Search
   CPC .......... G11B 2220/2562; G11B 27/034; G11B 27/3027; A63F 13/06; A63F 13/10; A63F 13/02; A63F 2300/6045; A63F 2300/1012; A63F 2300/1062; A63F 2300/1043; A63F 2300/1037; A63F 2300/1006; A63F 2300/1025
   USPC ...... 386/248, 299, 326, 332–337; 463/36–39
   See application file for complete search history.

(56) References Cited

U.S. PATENT DOCUMENTS

| | | | | |
|---|---|---|---|---|
| 7,428,023 | B2 * | 9/2008 | Allen | H04N 5/4403 348/14.05 |
| 7,484,207 | B2 * | 1/2009 | Sato | 717/174 |
| 8,668,561 | B2 * | 3/2014 | Hansen et al. | 463/1 |
| 2002/0059617 | A1 * | 5/2002 | Terakado et al. | 725/80 |
| 2007/0015577 | A1 * | 1/2007 | Hsu | 463/37 |
| 2008/0316887 | A1 * | 12/2008 | Chernick | A63F 9/183 369/63 |
| 2009/0240766 | A1 * | 9/2009 | Kikkawa et al. | 709/203 |
| 2009/0285550 | A1 * | 11/2009 | Yamada et al. | 386/95 |
| 2010/0118115 | A1 * | 5/2010 | Takahashi | H04N 1/00291 348/24 |
| 2010/0260336 | A1 * | 10/2010 | Mulcahy | H04N 21/4122 380/210 |
| 2011/0067093 | A1 * | 3/2011 | Kamada et al. | 726/7 |

FOREIGN PATENT DOCUMENTS

| | | |
|---|---|---|
| JP | 2005-680 | 1/2005 |
| JP | 2007-139379 | 6/2007 |
| JP | 2007-274278 | 10/2007 |
| JP | 2009-71624 | 4/2009 |

OTHER PUBLICATIONS

My Pokémon Ranch, Official Play-guide book p. 12, Shusuke Motomiya & One Up, Media Factory, Inc., Released on Jun. 13, 2008, ISBN 978-4-8401H-2329-7.

Yuki Kai, Wii de Shinsakujouhou ya DS Taikenban wo Haishin suru "Min-na no Nintendo Channel", BB Watch, Nov. 27, 2007, Impress Watch Corporation, 3 pages.

* cited by examiner

F I G. 1
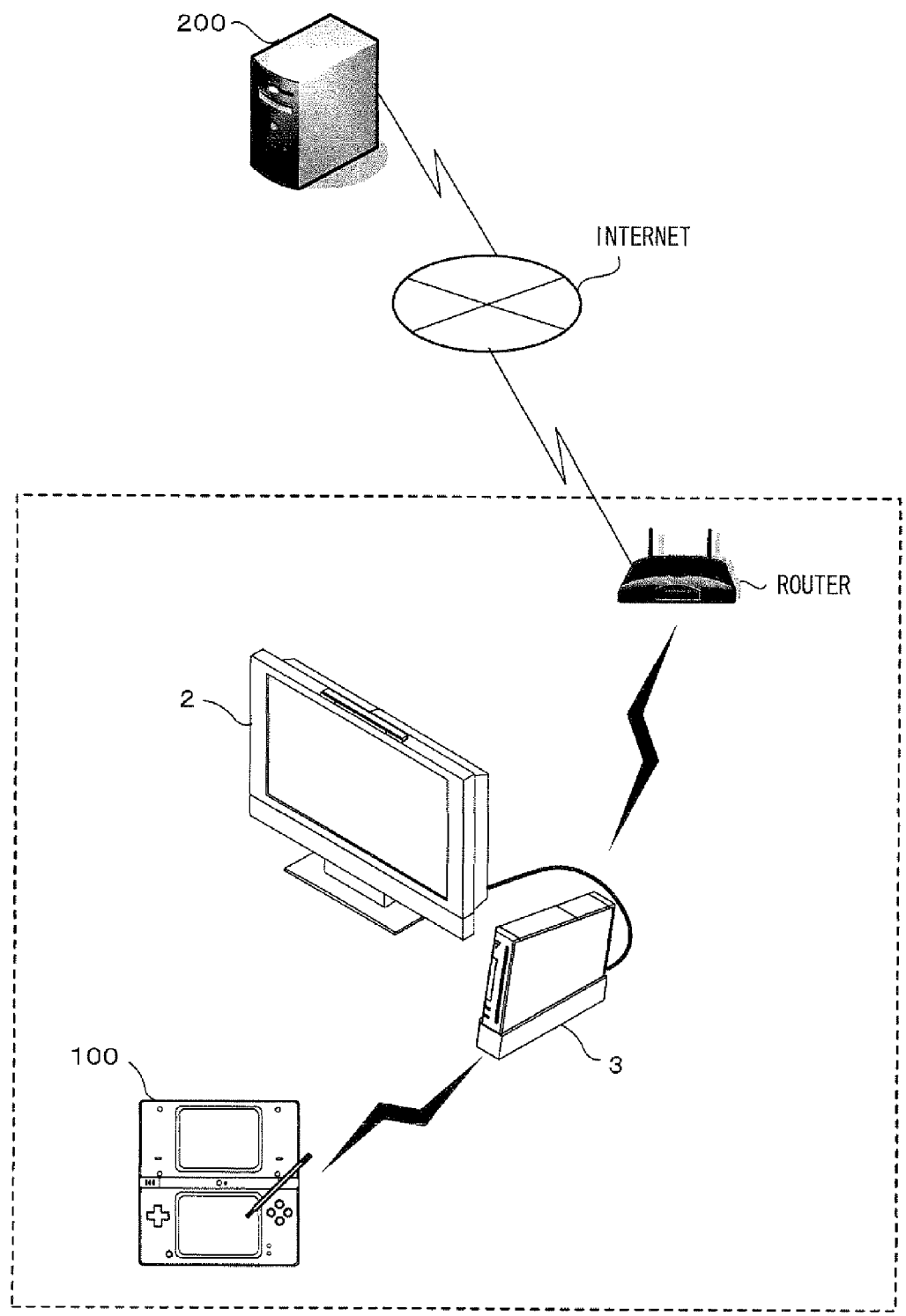

200

F I G. 1 1
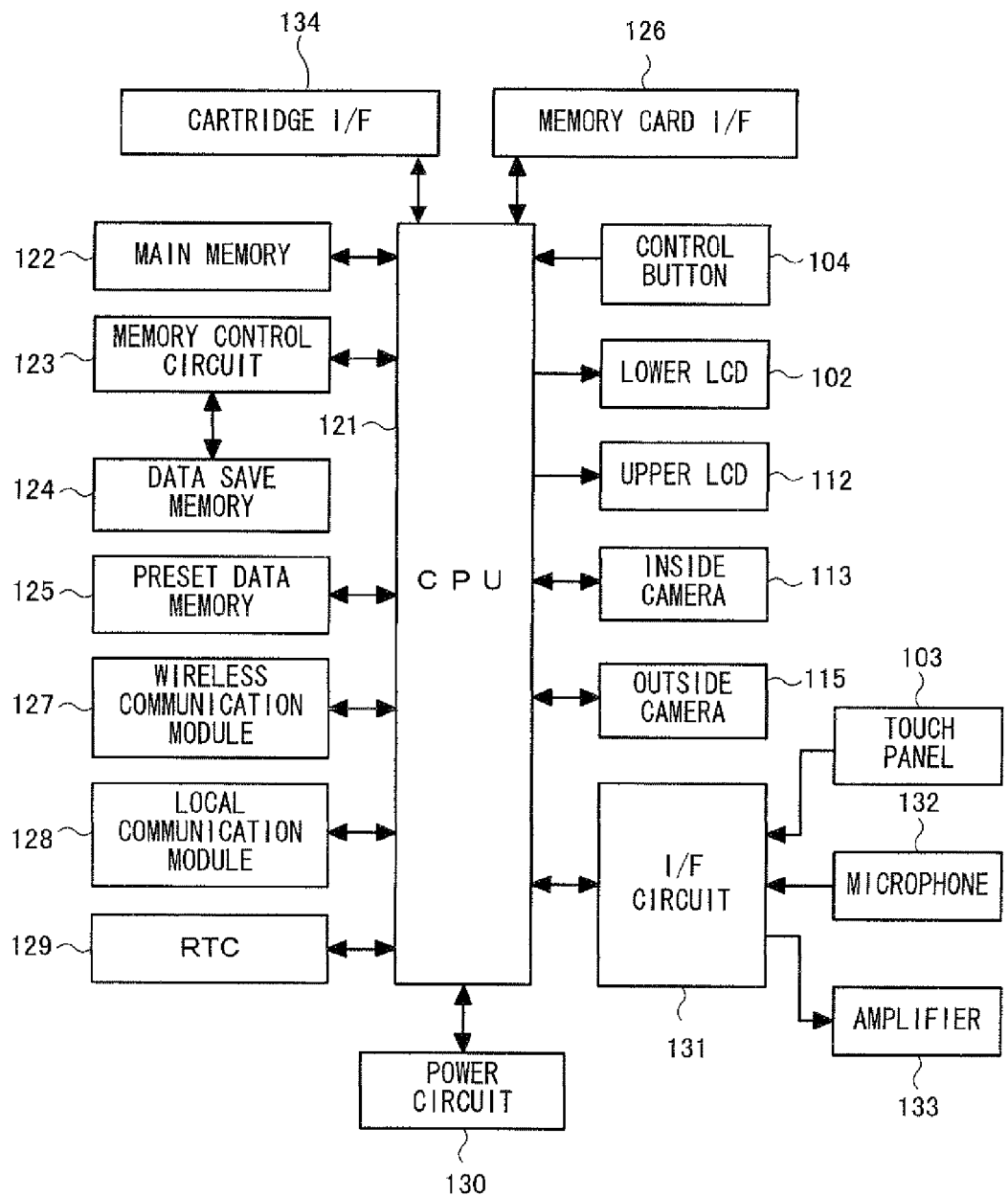

FIG. 21

| No | FRAME | DIALOGUE | REMARK |
|---|---|---|---|
| 1 | 0001-0100 | "I HAVE RECOMMENDED SOFTWARE. YOU WANT TO TRY IT?" | INTRODUCTION |
| 2 | 0101-0200 | WORDLESS | VIDEO FOR WHEN SELECTION IS BEING WAITED FOR |
| 3 | 0201-0300 | "THIS IS TIC-TAC-TOE! TOUCH SQUARE TO PLACE MARK!" | VIDEO FOR OPERATION GUIDE |
| 4 | 0301-0400 | "IT'S FUNNY THAT GAME CAN BE GIVEN THOUGH WE ARE AWAY FROM EACH OTHER!" | CHAT |
| 5 | 0401-0500 | "IS IT SUNNY THERE NOW?" | CHAT |
| 6 | 0501-0600 | WORDLESS | CHAT |
| 7 | 0601-0700 | "GOOD" | CPU'S RESPONSE ON THE FIRST TURN OF PLAYER |
| 8 | 0701-0800 | "UH-OH" | CPU'S RESPONSE ON THE FIRST TURN OF PLAYER |
| 9 | 0801-0900 | "KEEP IT UP!" | CPU'S RESPONSE ON THE FIRST TURN OF PLAYER |
| 10 | 0901-1000 | "OH, YOU PLACED IT THERE!" | CPU'S RESPONSE ON THE SECOND TURN OF PLAYER |
| 11 | 1001-1100 | "PRETTY GOOD!" | CPU'S RESPONSE ON THE SECOND TURN OF PLAYER |
| 12 | 1101-1200 | "ARE YOU ALL RIGHT WHERE YOU PLACED IT?" | CPU'S RESPONSE ON THE SECOND TURN OF PLAYER |
| 13 | 1201-1300 | "MAYBE I'M FINISHED!" | CPU'S RESPONSE ON THE THIRD TURN OF PLAYER |
| 14 | 1301-1400 | "OH, NO! I'M IN A PINCH!" | CPU'S RESPONSE ON THE THIRD TURN OF PLAYER |
| 15 | 1401-1500 | "THAT HELPS ME!" | CPU'S RESPONSE ON THE THIRD TURN OF PLAYER |
| 16 | 1501-1600 | "I'LL PLACE IT HERE..." | VIDEO FOR WHEN CPU PLACES MARK |
| 17 | 1601-1700 | "I LOST!" | VIDEO FOR WHEN PLAYER WINS |
| 18 | 1701-1800 | "I WON!" | VIDEO FOR WHEN CPU WINS |
| 19 | 1801-1900 | "GAME IS DRAWN!" | VIDEO FOR WHEN GAME IS DRAWN |
| 20 | 1901-2000 | WORDLESS | VIDEO FOR WHEN INDUCING PLAYER TO RETRY |
| 21 | 2001-2100 | "SEE YOU!" | VIDEO FOR WHEN QUITTING GAME | ard
INFORMATION PROCESSING SYSTEM, INFORMATION PROCESSING APPARATUS, AND COMPUTER-READABLE STORAGE MEDIUM HAVING INFORMATION PROCESSING PROGRAM STORED THEREIN

CROSS REFERENCE TO RELATED APPLICATION

The disclosure of Japanese Patent Application No. 2009-165688, filed on Jul. 14, 2009, is incorporated herein by reference.

BACKGROUND

Field of the Invention

Example embodiments of the present invention relate to an information processing system including a first information processing apparatus and a second information processing apparatus, and more particularly, to an information processing system for executing processing with the first information processing apparatus and the second information processing apparatus being coordinated with each other.

Description of the Background Art

Conventionally, there has been an information processing system in which two information processing apparatuses are coordinated with each other. For example, there is disclosed a game system enabling an instruction to a game executed on the stationary game apparatus through an operation of a hand-held game apparatus that is connected to a stationary game apparatus by means of wireless communication (for example, "Pokémon Battle Revolution, DS Battle Mode", The Pokémon Company, URL: *http://www.pokemon.co.jp/game/wii/pbr_sp/mode.html*, searched on July, 2009, hereinafter, referred to as Non-Patent Document 1). Moreover, there is disclosed a game system in which characters collected and stored in game software for a hand-held game apparatus can be transferred to game software for a stationary game apparatus (for example, "My Pokémon Ranch, official play-guide book" p. 12, Shusuke Motomiya & One Up, Media Factory, Inc., released on Jun. 13, 2008, ISBN 978-4-8401-2329-7, hereinafter, referred to as Non-Patent Document 2). In this game system, the hand-held game apparatus makes an instruction to transfer a character to the stationary game apparatus and the character is transferred from the hand-held game apparatus to the stationary game apparatus. In addition, the character transferred to the stationary game apparatus can be transferred back to the hand-held game apparatus.

However, the game system disclosed in Patent Document 1 is a system enabling an operation of an information processing apparatus to be performed by using another information apparatus. Moreover, the game system disclosed in Patent Document 2 is a system enabling data to be transferred between two information processing apparatuses. Each of the game systems is not a system in which a video reproduced on an information processing apparatus is varied in accordance with an application executed on another information processing apparatus.

SUMMARY

Therefore, example embodiments of the present invention provide an innovative information processing system enabling a video reproduced on an information processing apparatus to be varied in accordance with an application executed on another information processing apparatus.

Example embodiments of the present invention may have the following features.

A first aspect of example embodiments of the present invention is a system including a first information processing apparatus and a second information processing apparatus. The first information processing apparatus includes execution means, control data generating means, and first transmission means. The execution means executes an application. The control data generating means generates control data in accordance with a state of an execution of the application. The first transmission means transmits the control data to the second information processing apparatus. The second information processing apparatus includes video storage means, video reproduction means, reception means, and reproduced video determining means. The video storage means stores at least one piece of video data. The video reproduction means reproduces a video, based on the video data stored in the video storage means. The reception means receives the control data transmitted by the first transmission means. The reproduced video determining means determines a video to be reproduced by the video reproduction means, based on the received control data. The video reproduction means reproduces the video determined by the reproduced video determining means, based on the video data.

According to the first aspect, a video reproduced on the second information processing apparatus can be varied in accordance with a state of an application executed on the first information processing apparatus. Thus, there can be provided a system in which information processing such as game processing realizing an innovative and new way to enjoy a game is performed.

In a second aspect of example embodiments of the present invention based on the first aspect, the second information processing apparatus further includes application storage means and second transmission means. The application storage means stores an application. The second transmission means transmits the application stored in the application storage means to the first information processing apparatus. The execution means executes the application transmitted by the first transmission means.

According to the second aspect, it becomes possible to store a video and an application in the second information processing apparatus, and, of the video and the application, to distribute only the application to the first information processing apparatus.

In a third aspect of example embodiments of the present invention based on the first aspect, the control data is data for designating a part of a video included in the video data. The reproduced video determining means determines the part of the video included in the video data, based on the received control data. The video reproduction means reproduces the part of the video determined by the reproduced video determining means.

According to the third aspect, it becomes possible to designate a part of videos which is to be reproduced, and to reproduce the part of videos on the second information processing apparatus. Moreover, since the first information processing apparatus designates a video to be reproduced on the second information processing apparatus, the second information processing apparatus only performs processing for reproducing the video based on the designation, thereby enabling a processing load on the second information processing apparatus to be reduced.

In a fourth aspect of example embodiments of the present invention based on the first aspect, the first information processing apparatus further includes video designating means for designating, in a random manner, one of pieces of information which respectively indicate a plurality of candidate videos defined in advance as candidates to be reproduced, in accordance with the state of the execution of the application. The control data generating means generates, as the control data, data including the piece of information about a video designated by the video designating means.

According to the fourth aspect, videos can be reproduced in various patterns, thereby providing an information processing system which does not bore a player.

In a fifth aspect of example embodiments of the present invention based on the fourth aspect, the first information processing apparatus further includes first determination means for determining whether or not the state of the execution of the application satisfies one of a first condition and a second condition. The video designating means, when the first determination means determines that the first condition is satisfied, designates a piece, of information, which indicates a predetermined video defined in advance and, when the first determination means determines that the second condition is satisfied, designates, in a random manner, one of the pieces of information which respectively indicate the plurality of candidate videos defined in advance as the candidates to be reproduced.

According to the fifth aspect, a way of designating a video to be reproduced on the second information processing apparatus can be changed in accordance with a state of an execution of an application.

In a sixth aspect of example embodiments of the present invention based on the first aspect, the control data generating means generates, as the control data, data including a loop reproduction instruction that is an instruction to repeat the reproduction of the video, in accordance with the state of the execution of the application. The video reproduction means, when the received control data includes the loop reproduction instruction, repeatedly reproduces the video determined by the reproduced video determined means until the reception means receives other control data.

According to the sixth aspect, it can be prevented that, when a reproduction of a video is ended, a still image is kept to be displayed on the second information processing apparatus, thereby increasing realistic feeling.

In a seventh aspect of example embodiments of the present invention based on the first aspect, the control data generating means generates, as the control data, data including one of a loop reproduction instruction that is an instruction to repeat the reproduction of the video, and a one play instruction that is an instruction to perform the reproduction of the video only one time, in accordance with the state of the execution of the application. The video reproduction means, when the received control data includes the loop reproduction instruction, repeatedly reproduces the video determined by the reproduced video determined means until the reception means receives other control data, and, when the received control data includes the one play reproduction instruction, reproduces only one time the video determined by the reproduced video determined means until the reception means receives other control data.

According to the seventh aspect, a way of reproducing a video can be changed in accordance with a state of an execution of an application.

In an eighth aspect of example embodiments of the present invention based on the fourth aspect, the second information processing apparatus further includes second transmission means for, when the reproduction of the video determined by the reproduced video determined means is ended, transmitting reproduction completion data indicating that the reproduction of the video is ended to the first information processing apparatus. The first information processing apparatus further includes second reception means for receiving the reproduction completion data transmitted by the second transmission means. The video designating means, when the second reception means receives the reproduction completion data, designates, in a random manner, one of the pieces of information which respectively indicate the plurality of candidate videos defined in advance as the candidates to be reproduced.

According to the eighth aspect, it can be prevented that, when a reproduction of a video is ended, a still image is kept to be displayed on the second information processing apparatus, and unnaturalness that the same video is repeatedly reproduced can be resolved.

In a ninth aspect of example embodiments of the present invention based on the first aspect, the second information processing apparatus further includes second transmission means for, when the reproduction of the video determined by the reproduced video determined means is ended, transmitting reproduction completion data indicating that the reproduction of the video is ended to the first information processing apparatus. The first information processing apparatus further includes video designating means, second reception means, and second determination means. The video designating means designates, in a random manner, one of pieces of information which respectively indicate a plurality of candidate videos defined in advance as candidates to be reproduced, in accordance with the state of the execution of the application. The second reception means receives the reproduction completion data transmitted by the second transmission means. The second determination means determines whether or not the state of the execution of the application satisfies a third condition. The video designation means designates, in a random manner, a piece, of information, which indicates a video among a first candidate video group which includes at least two or more videos of the plurality of candidate videos defined in advance as the candidates to be reproduced. In this configuration, the control data generating means generates, as the control data, data including the piece of information designated by the video designating means. When the second reception means receives the reproduction completion data after the reproduction of the video based on the control data is started on the second information processing apparatus, the video designating means, when the second determination means determines that the third condition is not satisfied, designates in a random manner a piece of information which indicates a next video to be reproduced among the first candidate video group, and, when the second determination means determines that the third condition is satisfied, designates in a random manner a piece of information which indicates a next video to be reproduced among a second candidate video group which includes a plurality of videos different from those included in the first candidate video group.

According to the ninth aspect, a next video to be reproduced on the second information processing apparatus can be selected from candidate videos different between when a reproduction of a video is ended and when a state of an execution of an application satisfies a predetermined condition.

In a tenth aspect of example embodiments of the present invention based on the first aspect, the first information processing apparatus further includes frame designating means for designating a reproduction start frame number and a reproduction end frame number of a video included in the video data, in accordance with the state of the execution of the application. The control data generating means generates, as the control data, data including the content of the designation performed by the frame designating means.

According to the tenth aspect, it becomes possible to designate a video in a versatile and simple way of designation.

In an eleventh aspect of example embodiments of the present invention based on the first aspect, the information processing system further comprises a server storing the video data and the application. The server includes a third transmission means for transmitting the video data and the application to the second information processing apparatus. The second information processing apparatus further includes a third reception means for receiving the video data and the application transmitted by the third transmission means, and a fourth transmission means for transmitting the application received by the third reception means to the first information processing apparatus. The first information processing apparatus further includes a fourth reception means for receiving the application transmitted by the fourth transmission means. The execution means executes the application received by the fourth reception means.

According to the eleventh aspect, an application and video data can be transmitted at one time from the server to the second information processing apparatus. Thus, frequency of communications between the server and the second information processing apparatus can be reduced, thereby reducing a processing load on the server. Moreover, by accessing the server when needed (for example, when a player wants to executes an application on the first information processing apparatus) an application and video data can be obtained. Therefore, the second information processing apparatus does not need to keep storing an application and video data, and thus the storage space of the second information processing apparatus can be saved.

In a twelfth aspect of example embodiments of the present invention based on the first aspect, the second information processing apparatus further includes reproduction state transmission means for repeatedly transmitting, to the first information processing apparatus, reproduction state data indicating a state of a reproduction of a video executed by the video reproduction means. The first information processing apparatus further includes reproduction state reception means and reproduction start confirmation means. The reproduction state reception means receives the reproduction state data transmitted by the reproduction state transmission means. The reproduction start confirmation means determines, based on the reproduction state data received by the reproduction state reception means, whether or not the reproduction of the video is properly started on the second information processing apparatus, after the control data is transmitted by the first transmission means. The execution means repeatedly causes the reproduction start confirmation means to repeatedly perform the determination until the reproduction start confirmation means determines that the reproduction of the video is properly started on the second information processing apparatus, after the control data is transmitted by the first transmission means.

In a thirteenth aspect of example embodiments of the present invention based on the twelfth aspect, the control data generating means generates, as the control data, data including information about a reproduction range of a video included by the video data. The reproduction state transmission means generates, as the reproduction state data, data including information about a frame number of the video being reproduced by the video reproduction means. The reproduction start confirmation means determines, based on the information about the reproduction range of the video and the information, about the frame number of the video being reproduced, indicated by the reproduction state data, whether or not the reproduction of the video is properly started on the second information processing apparatus.

According to the twelfth and thirteenth aspects, processing of an application on the first information processing apparatus can be kept from progressing, until it is confirmed that a reproduction of a video is started on the second information processing apparatus after a reproduction instruction of a video is sent from the first information processing apparatus to the second information processing apparatus. Thus, coordination between a state of an execution of an application on the first information processing apparatus and a video reproduced on the second information processing apparatus can be enhanced.

In a fourteenth aspect of example embodiments of the present invention based on the twelfth aspect, the reproduction start confirmation means determines whether or not the reproduction of the video is properly started on the second information processing apparatus within a predetermined time period after the control data is transmitted by the first transmission means. The first transmission means transmits again the control data when the reproduction start confirmation means determines that the reproduction of the video is not properly started on the second information processing apparatus within a predetermined time period.

According to the fourteenth aspect, an execution of a reproduction of a video on the second information processing apparatus can be further ensured.

A fifteenth aspect of example embodiments of the present invention is an information processing apparatus comprising execution means, control data generating means, and transmission means. The execution means executes an application. The control data generating means generates control data in accordance with a state of an execution of the application. The transmission means transmits the control data to another information processing apparatus.

According to the fifteenth aspect, there can be provided an information processing apparatus capable of instructing another information processing apparatus to reproduce a predetermined video.

A sixteenth aspect of example embodiments of the present invention is an information processing apparatus comprising video storage means, video reproduction means, reception means, reproduced video determining means, and reproduction state transmission means. The video storage means for storing at least one piece of video data. The video reproduction means reproduces a video, based on the video data stored in the video storage means. The reception means receives control data, which indicates a part, of the video, which is to be reproduced, the control data being transmitted by another information processing apparatus. The reproduced video determining means determines a video to be reproduced by the video reproduction means, based on the received control data. The reproduction state transmission means transmits, to the another information processing apparatus which transmits the control data, reproduction state data indicating a state of a reproduction of a video executed by the video reproduction means. The video reproduction means reproduces the video determined by the reproduced video determining means, based on the video data.

According to the sixteenth aspect, there can be provided an information processing apparatus capable of reproducing a predetermined video based on an instruction from another information processing apparatus, and of transmitting information about a state of the reproduction of the video to the another information processing apparatus.

A seventeenth aspect of example embodiments of the present invention is a computer-readable storage medium having stored therein an information processing program which is executed by a computer of an information processing apparatus including communication means for communicating with another information processing apparatus, the information processing program causing the computer to function as execution means, control data generating means, and transmission means. The execution means executes an application. The control data generating means generates control data in accordance with a state of an execution of the application. The transmission means transmits the control data to another information processing apparatus.

According to the seventeenth aspect, the same effect as in the fifteenth aspect can be obtained.

A eighteenth aspect of example embodiments of the present invention is a computer-readable storage medium having stored therein an information processing program executed by a computer of an information processing apparatus including communication means for communicating with another information processing apparatus, and video storage means for storing at least one piece of video data, the information processing program causing the computer to function as video reproduction means, reception means, reproduced video determining means, and reproduction state transmission means. The video reproduction means reproduces a video, based on the video data stored in the video storage means. The reception means receives control data, which indicates a part, the video, which is to be reproduced, the control data being transmitted by another information processing apparatus. The reproduced video determining means determines the video to be reproduced by the video reproduction means, based on the received control data. The reproduction state transmission means transmits, to the another information processing apparatus which transmits the control data, reproduction state data indicating a state of a reproduction of a video executed by the video reproduction means. The video reproduction means reproduces the video determined by the reproduced video determining means, based on the video data.

According to the eighteenth aspect, the same effect as in the sixteenth aspect can be obtained.

According to example embodiments of the present invention, a video reproduced on the second information processing apparatus can be varied in accordance with a state of an application executed on the first information processing apparatus, and thereby an information processing system in which an innovative and new way to enjoy a game is obtained can be provided.

These and other objectives, characteristics, aspects, and advantages of example embodiments of the present invention will be made obvious further by the following detailed description with reference to the attached drawings.

BRIEF DESCRIPTION OF THE DRAWINGS

FIG. 1 is an entire view showing a system according to an embodiment of the present invention;
FIG. 11 is a block diagram showing an example of an internal configuration of the hand-held apparatus 100;
FIG. 21 shows an example of a configuration of video data assumed in the present embodiment.

DESCRIPTION OF THE EXAMPLE EMBODIMENTS

The following will describe an embodiment of the present invention with reference to the drawings. It is noted that the present invention is not limited by the embodiment.

FIG. 1 is an entire view showing a system according to an embodiment of the present invention. As shown in FIG. 1, the system according to the present embodiment includes a server 200, a stationary game apparatus (hereinafter, simply referred to as stationary apparatus) 3, and a hand-held game apparatus (hereinafter, simply referred to as hand-held apparatus) 100. The server 200 is connected to the Internet, and can communicate with the stationary apparatus 3 via the Internet. The stationary apparatus 3 and the hand-held apparatus 100 are assumed to be used at home. The stationary apparatus 3 can be connected to the Internet via a predetermined wireless router. Moreover, the stationary apparatus 3 can communicate with the server 200 via the Internet. In addition, the stationary apparatus 3 and the hand-held apparatus 100 can perform wireless communication with each other. In the present embodiment, TCP/IP is used as a communication protocol for communication performed between the stationary apparatus 3 and the server 200, and a unique protocol based on IEEE 802.11 is used for wireless communication performed between the stationary apparatus 3 and the hand-held apparatus 100.

Figure 2:
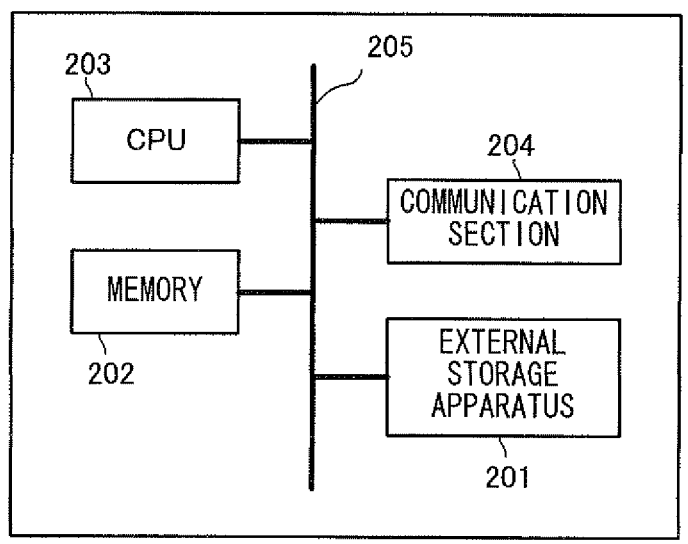
FIG. 2 is a block diagram showing a configuration of a server 200.

The following will describe hardwares of the server 200, the stationary apparatus 3, and the hand-held apparatus 100 described with reference to FIG. 1. Firstly, a configuration of the server 200 will be described. FIG. 2 is a diagram showing the configuration of the server 200. The server 200 includes an external storage unit 201, a memory 202, a CPU 203, and a communication section 204 which are connected to each other via a bus 205. The external storage unit 201 stores a communication connection control program for establishing communication connection with the stationary apparatus 3, video data described below, a coordination application, and a distribution program for distributing the video data and the coordination application to the stationary apparatus 3. The distribution program includes a processing procedure, various commands, and the like which cause the CPU 203 to execute the distribution program, and which include a content for controlling the distribution of the below-described video data and coordination application in accordance with a predetermined distribution request signal from the stationary apparatus 3. The memory 202 is an internal storage unit which, when executing the distribution program, temporarily stores data, a program, or the like, e.g., loads, from the external storage unit 201, files including the distribution program, video data, a coordination application, or the like. The CPU 203 is a computing apparatus or a control apparatus for executing a program loaded to the memory. The communication section 204 communicates with the stationary apparatus 3 or the like via the network. Besides the above, an input/output apparatus such as a key board or a mouse, and/or a display apparatus such as a monitor may be included or connected, although not shown in the drawings.

The following will describe the stationary apparatus 3 and a stationary game system 1 including the stationary apparatus 3.

(Whole Configuration of Stationary Game System)

Figure 3:
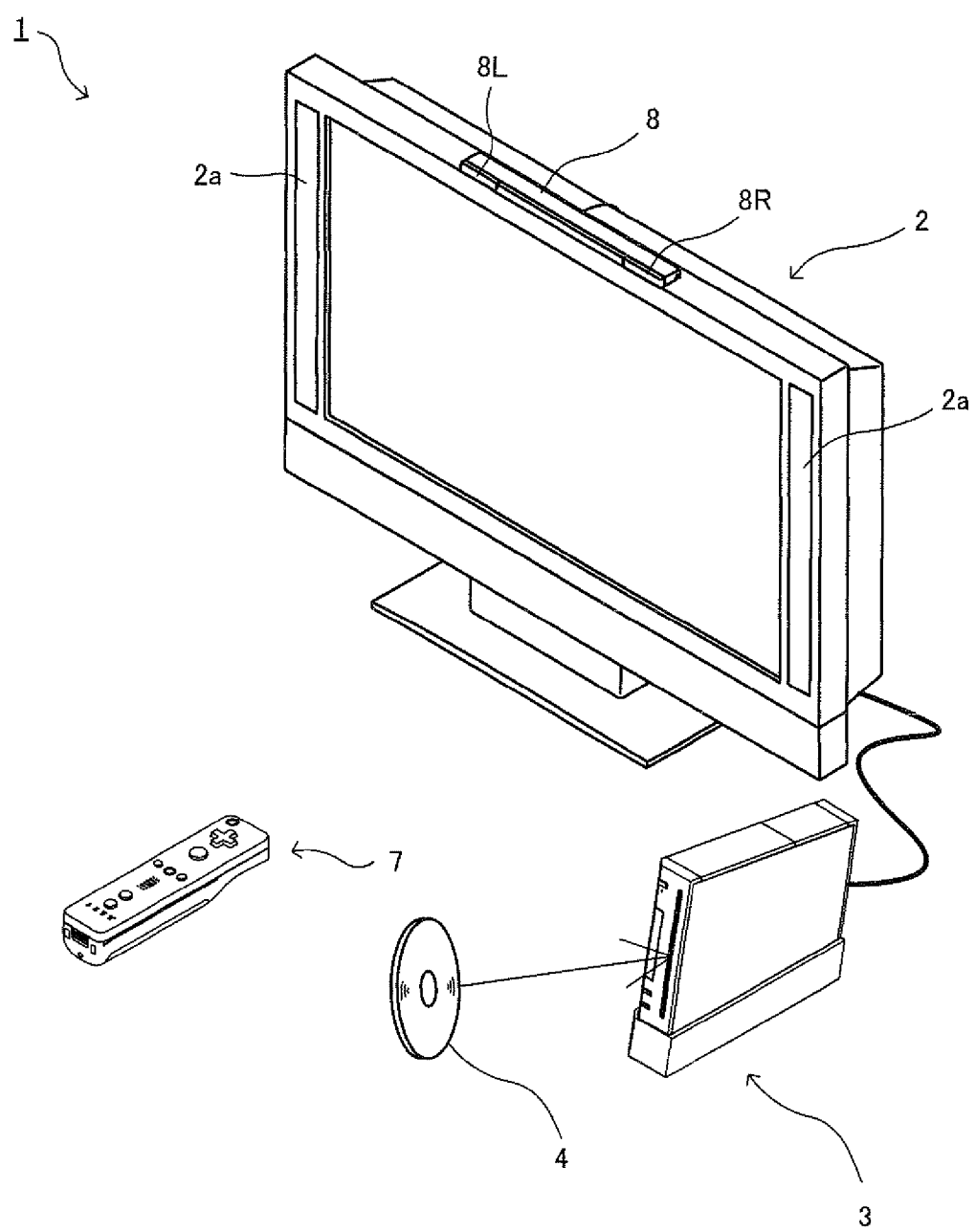
FIG. 3 is an external view of a stationary game system 1 including a stationary apparatus 3.

FIG. 3 is an external view of the stationary game system 1 including the stationary apparatus 3. As shown in FIG. 3, the stationary game system 1 includes a television receiver (hereinafter, referred to merely as a television) 2, a stationary apparatus 3, an optical disc 4, a controller 7, and a marker section 8. The game system 1 executes game processing at the stationary apparatus 3 in accordance with a game operation using the controller 7.

The optical disc 4 as an example of an exchangeable information storage medium replaceably used with respect to the stationary apparatus 3 is detachably inserted in the stationary apparatus 3. The optical disc 4 stores a game program which is to be executed by the stationary apparatus 3. The stationary apparatus 3 has an insertion slot at its front surface. The stationary apparatus 3 can read and execute the game program stored in the optical disc 4 which is inserted in the insertion slot for executing the game processing.

The television 2 as an example of a display device is connected to the stationary apparatus 3 via a connection cord. The television 2 displays game images which are obtained as the result of the game processing executed by the stationary apparatus 3. The marker section 8 is mounted adjacent to the screen of the television 2 (on the upper surface of the screen in FIG. 3). The marker section 8 has a marker 8R and a marker 8L at its opposite ends, respectively. The marker 8R has one or more infrared LEDs which output infrared lights forward from the television 2. The marker 8L has the same configuration as the marker 8R. The marker section 8 is connected to the stationary apparatus 3, and the stationary apparatus 3 is capable of controlling illumination of each infrared LED of the marker section 8.

The controller 7 is an input device which provides the stationary apparatus 3 with operation data which indicates contents of an operation made to the controller 7. The controller 7 is connected to the stationary apparatus 3 by wireless communication. In the present embodiment, the technology of, for example, Bluetooth (registered trademark) is used for the wireless communication between the controller 7 and the stationary apparatus 3. It is noted that in an alternative embodiment, the controller 7 may be connected to the stationary apparatus 3 via a wire.

(Internal Configuration of Stationary Apparatus 3)

Figure 4:
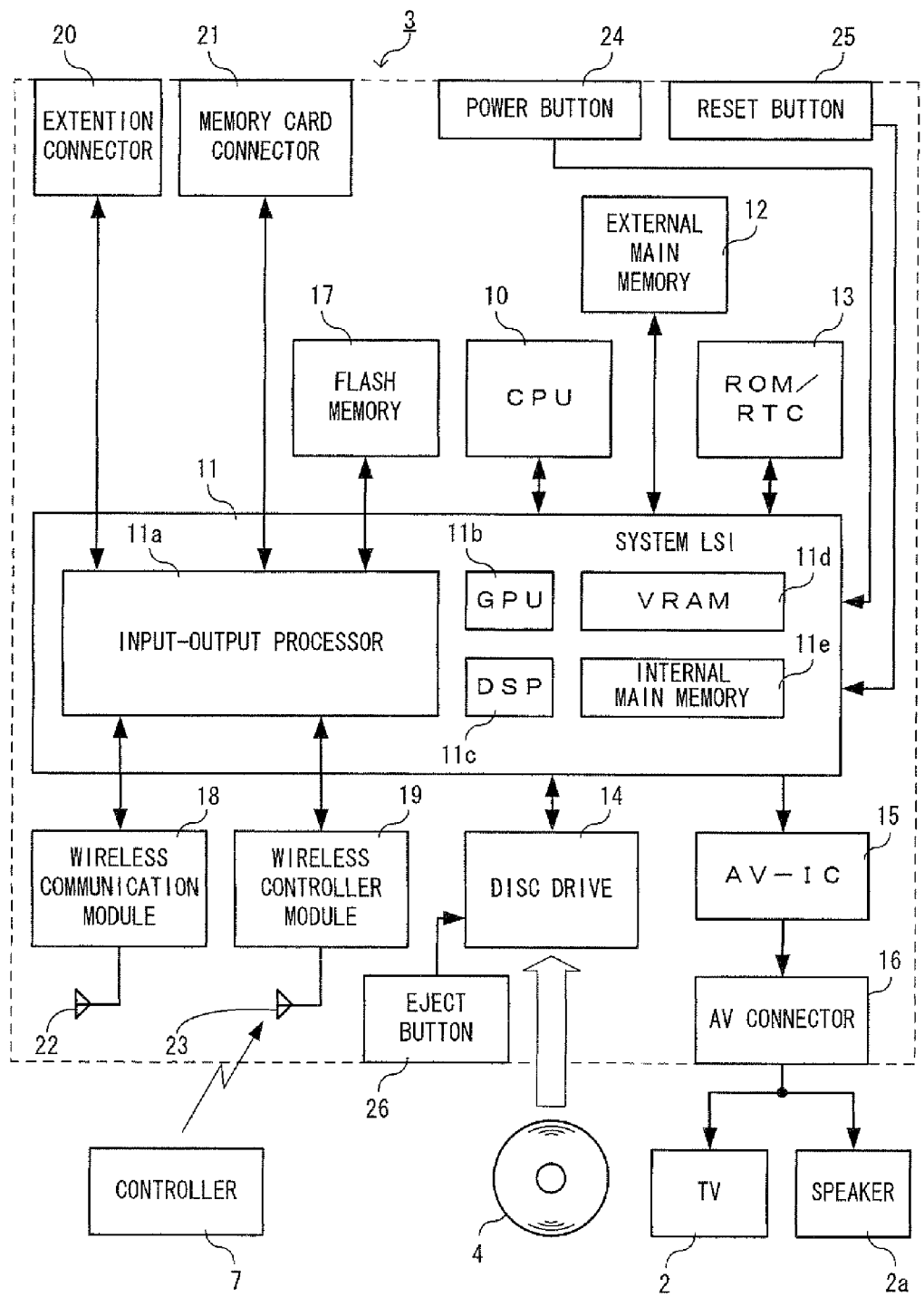
FIG. 4 is a block diagram showing a configuration of the stationary apparatus 3.

The following will describe an internal configuration of the stationary apparatus 3 with reference to FIG. 4. FIG. 4 is a block diagram showing a configuration of the stationary apparatus 3. The stationary apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the stationary apparatus 3, and a clock circuit (RTC: Real Time Clock) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data and texture data, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the audio data generated thus are read by the AV-IC 15. The AV-IC 15 outputs the image data to the television 2 via an AV connector 16, and the audio data to speakers 2a built in the television 2. Thus, an image is displayed on the television 2, and sound is outputted from the speakers 2a.

The input-output processor (I/O processor) 11a performs transmission and reception of data to and from each component connected to the input-output processor 11a, and downloads data from an external device. The input-output processor 11a is connected to the flash memory 17, a wireless communication module 18, a wireless controller module 19, an extension connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the stationary apparatus 3 and the other game apparatus and various servers, the flash memory 17 may store saved data (result data or midstream data of the game) of the game played using the stationary apparatus 3.

The input-output processor 11a receives operation data transmitted from the controller 7 via the antenna 23 and the wireless controller module 19, and stores (temporarily stores) the operation data in the buffer region of the internal main memory 11e or the external main memory 12.

In addition, the extension connector 20 and the memory card connector 21 are connected to the input-output processor 11a. The extension connector 20 is a connector for an interface such as USB and SCSI, and the communication with the network is enabled by connecting a medium such as an external storage medium, a peripheral device such as another controller, or a wired connector for communication to the extension connector 20 instead of the wireless communication module 18. The memory card connector 21 is a connector for connecting thereto an external storage medium such as a memory card. For example, the input-output processor 11a accesses the external storage medium via the extension connector 20 and the memory card connector 21 for storing data in the external storage medium and reading data from the external storage medium.

The stationary apparatus 3 is provided with a power button 24, a reset button 25, and an eject button 26. The power button 24 and the reset button 25 are connected to the system LSI 11. When the power button 24 is turned on, electric power is supplied to each component of the stationary apparatus 3 via an AC adaptor (not shown). In the state where the power has been turned on, the power button 24 is pressed to shift to a low power standby mode. Even in the low power standby mode, electric power is supplied to the stationary apparatus 3. Because electric power is always supplied to the stationary apparatus 3, the stationary apparatus 3 can be always connected to a network such as the Internet even in this state. For turning off the power once the power is turned on, the power button 24 is pressed for a predetermined period of time or longer. The reset button 25 is pressed to cause the system LSI 11 to restart a boot program of the stationary apparatus 3. The eject button 26 is connected to the disc drive 14. The eject button 26 is pressed to eject the optical disc 4 from the disc drive 14.

Figure 5:
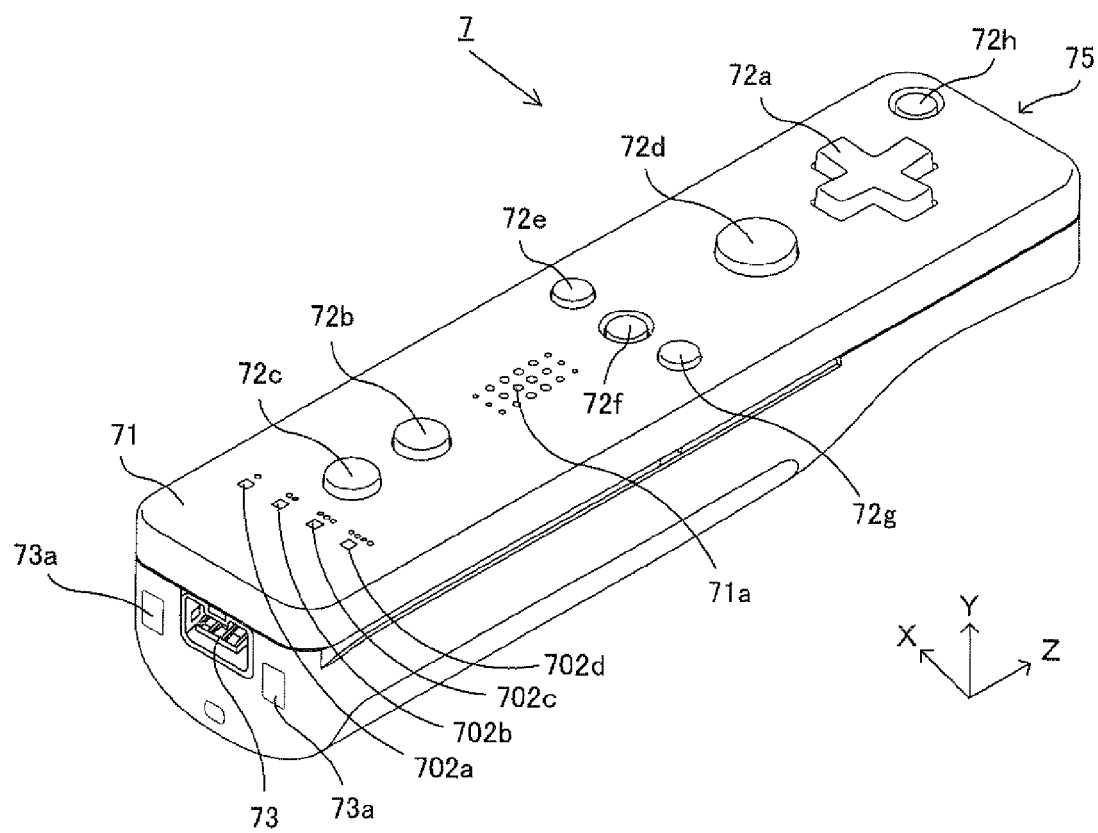
FIG. 5 is a perspective view of a controller 7 seen from a top rear side thereof.
Figure 6:
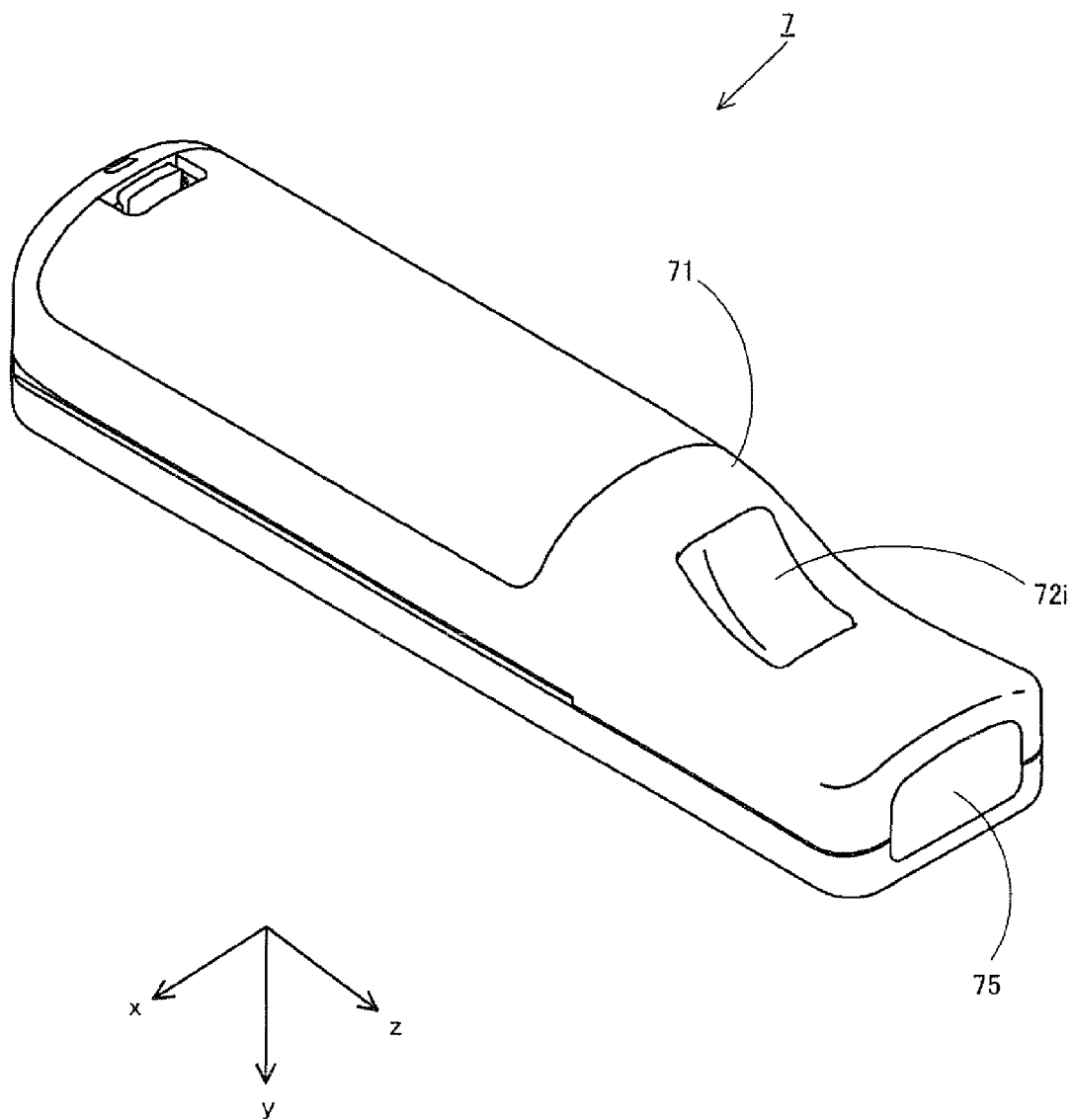
FIG. 6 is a perspective view of the controller 7 seen from a bottom front side thereof.

The following will describe the controller 7 with reference to FIGS. 5 and 6. FIG. 5 is a perspective view of the controller 7 seen from a top rear side thereof, and FIG. 6 is a perspective view of the controller 7 seen from a bottom front side thereof.

As shown in FIGS. 5 and 6, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player object or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section which includes an inclinable stick (or joystick) projecting from a top surface of the housing 71 and which outputs an operation signal in accordance with an inclining direction of the stick. Still alternatively, the cross key 72a may be replaced with an operation section which includes a disc-shaped and horizontally slidable member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button and an A button are assigned to the operation buttons 72b to 72d, respectively. Also, functions as a minus button, a home button and a plus button are assigned to the operation buttons 72e to 72g, respectively. Operation functions are assigned to the operation buttons 72b to 72g in accordance with the game program executed by the stationary apparatus 3. In an exemplary arrangement shown in FIG. 5, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the stationary apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the stationary apparatus 3, one of the plurality of LEDs 702 which corresponds to the controller type of the controller 7 is lit up.

On the top surface of the housing 71, a plurality of holes is provided between the operation button 72b and the operation buttons 72e to 72g for emitting sound from a speaker (a speaker 706 in FIG. 7), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72i is provided. The operation button 72i is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 5 and 6, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72a is provided) is a positive direction of y-axis. The left-right direction of the controller 7 corresponds to x-axis, and the direction toward the right side surface housing 71 (the side surface which is not shown in FIG. 5 but shown in FIG. 6) is a positive direction of x-axis.

Figure 7:
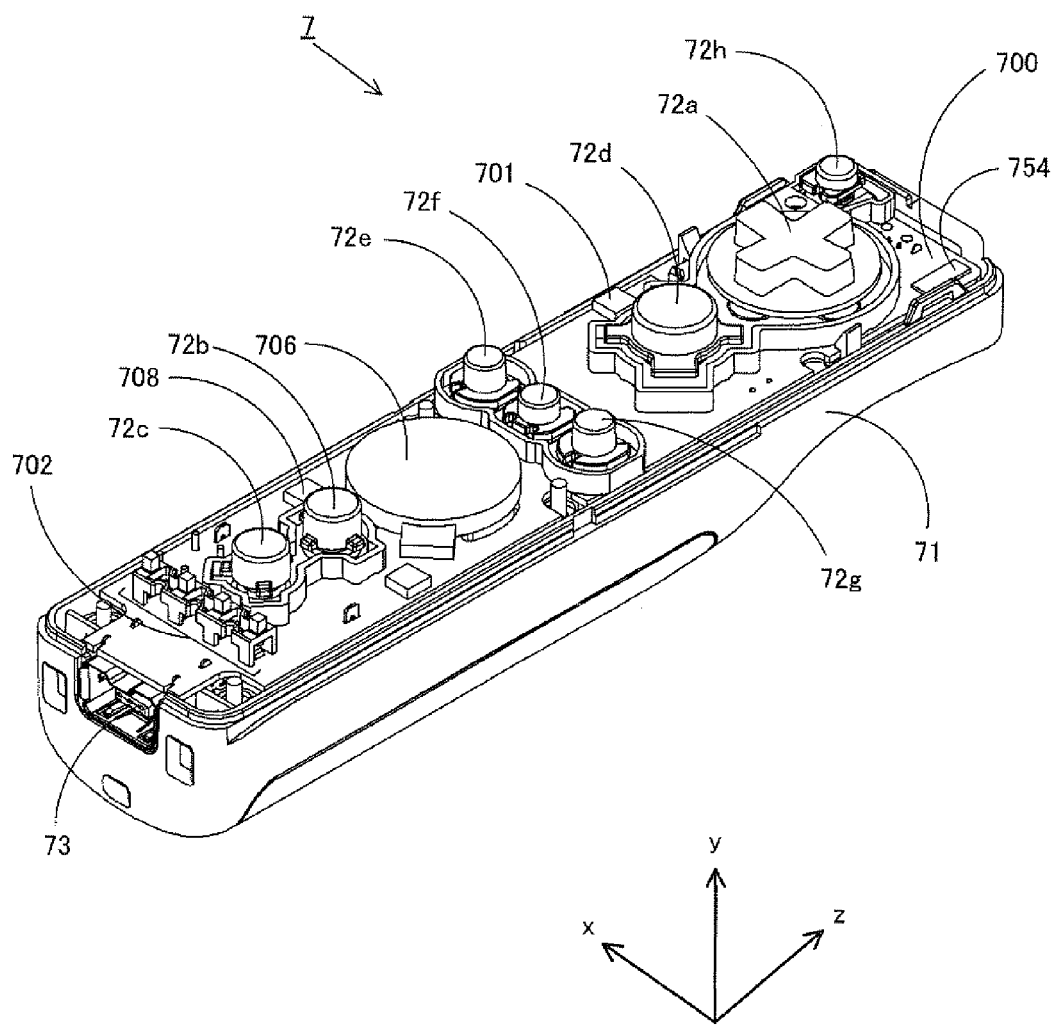
FIG. 7 is a perspective view showing the controller 7 seen from a rear side thereof in a state where an upper housing of the controller 7 is removed.
Figure 8:
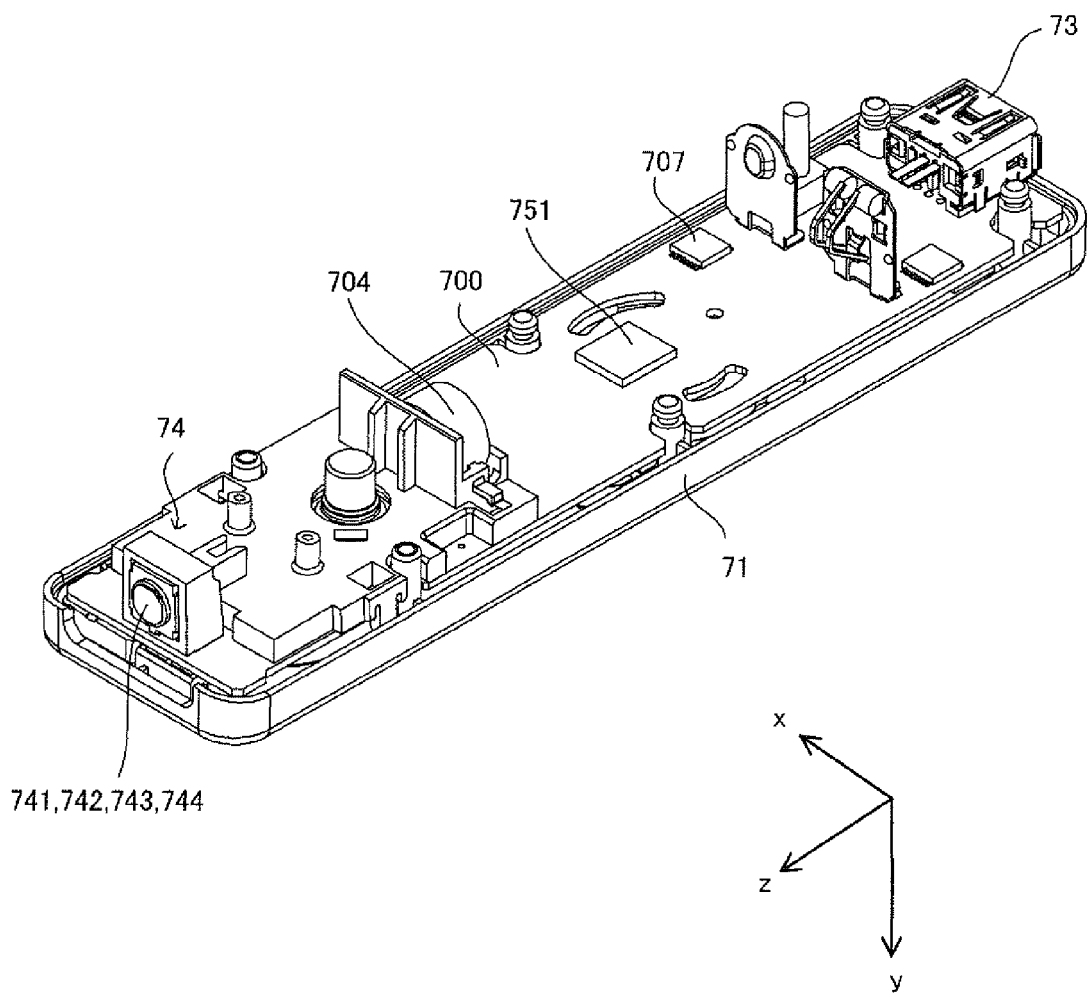
FIG. 8 is a perspective view showing the controller 7 seen from a front side thereof in a state where a lower housing of the controller 7 is removed.

The following will describe an internal structure of the controller 7 with reference to FIGS. 7 and 8. FIG. 7 is a perspective view showing a state where an upper housing (a part of the housing 71) of the controller 7 is removed as seen from a rear side thereof. FIG. 8 is a perspective view showing a state where a lower housing (a part of the housing 71) of the controller 7 is removed as seen from a front side thereof. FIG. 8 shows a reverse side of a substrate 700 shown in FIG. 7.

As shown in FIG. 7, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751, and the like (see FIGS. 8 and 9) by lines (not shown) formed on the substrate 700 and the like. The microcomputer 751 as an example of button data generation means of example embodiments of the present invention functions to generate operation button data in accordance with a type of the operation button 72a and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 9) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the stationary apparatus 3 or the like can be sensitive enough to determine the rotation of the controller 7 from detected acceleration data using a predetermined calculation.

As shown in FIG. 8, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the stationary apparatus 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the stationary apparatus 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

Figure 9:
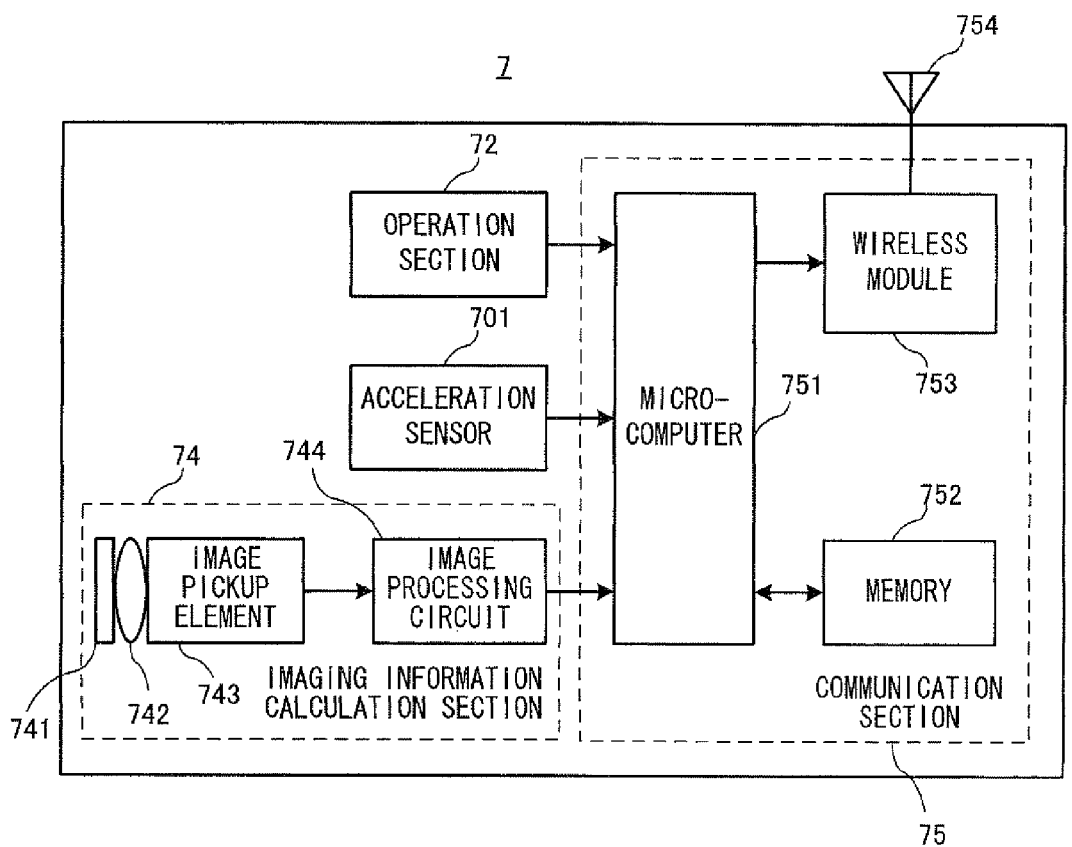
FIG. 9 is a block diagram showing a configuration of the controller 7.

The following will describe an internal constitution of the controller 7 with reference to FIG. 9. FIG. 9 is a block diagram showing an internal configuration of the controller 7.

As shown in FIG. 9, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. More specifically, the image processing circuit 744 processes the image data obtained from the image pickup element 743, detects an area of the image which has a high brightness, and outputs to the communication section 75 process result data indicating the result of a calculated coordinate position and a square measure of the area. The imaging information calculation section 74 is fixed to the housing 71 of the core unit 70. An imaging direction of the imaging information calculation section 74 can be changed by changing a facing direction of the housing 71.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micro-machined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate)

path, rotation, rotational movement, angular displacement, inclination, position, attitude or any other physical characteristic.

However, through processing by a computer such as the processor of the game apparatus (e.g. the CPU 10) or the processor of the controller 7 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1 G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

In an alternative embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the acceleration sensor 701, a gyro-sensor is capable of directly detecting rotation (or angular rate) around an axis defined by the gyroscopic element (or elements) therein. Thus, due to the fundamental differences between a gyro-sensor and a acceleration sensor, corresponding changes need to be made to the processing operations which are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tile previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the stationary apparatus 3 via the antenna 754. The sound IC 707 processes the sound data and the like transmitted from the stationary apparatus 3 via the communication section 75. The microcomputer 751 actuates the vibrator 704 in accordance with the vibration data (e.g. a signal for actuating or unactuating the vibrator 704) transmitted from the stationary apparatus 3 via the communication section 75.

Data from the controller 7 including an operation signal (key data) from the operation section 72, acceleration signals (acceleration data of directions of x-axis, y-axis, and z-axis which is hereinafter referred to merely as acceleration data)

from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be collected and transmitted at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth (registered trademark) technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the process result data from the imaging information calculation section 74 are modulated into the radio signal by the wireless module 753 and transmitted from the controller 7. The wireless controller module 19 of the stationary apparatus 3 receives the radio signal, and the stationary apparatus 3 demodulates or decodes the radio signal to obtain the series of operation information (the key data, the acceleration data, and the process result data). Based on the obtained operation information and the game program, the CPU 10 of the stationary apparatus 3 performs the game processing. In the case where the communication section 75 is structured using the Bluetooth (registered trademark) technology, the communication section 75 can have a function of receiving transmission data which is wirelessly transmitted from another device.

Figure 10:
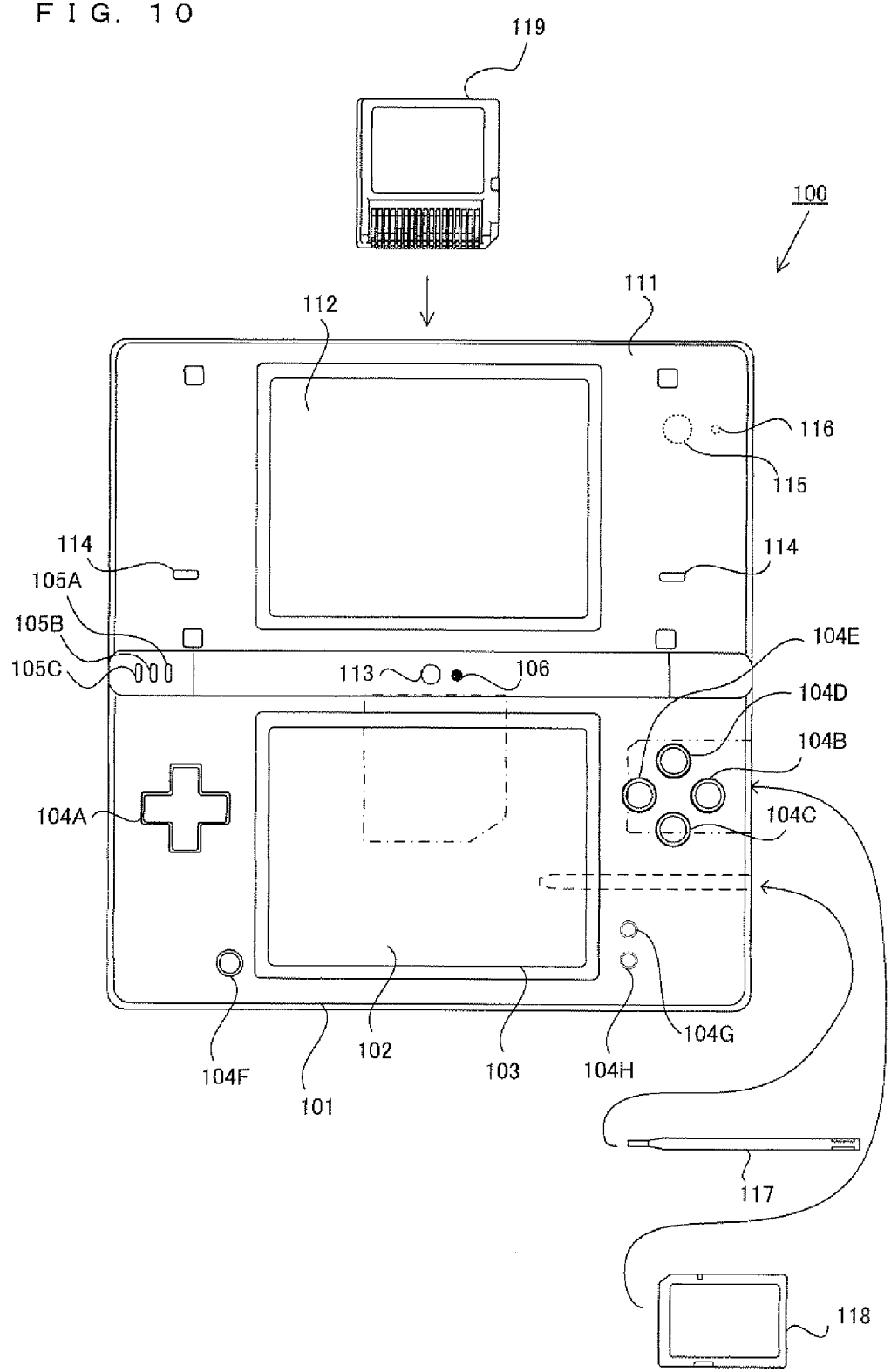
FIG. 10 is an external view showing a configuration of a hand-held apparatus 100.

The following will describe the hand-held apparatus 100. FIG. 10 is an external view of the hand-held apparatus 100. As shown in FIG. 10, the hand-held apparatus 100 is a fold-type hand-held game apparatus and is opened (in an open state). The hand-held apparatus 100 has a size which allows a player to hold, by one hand or both hands, the hand-held apparatus 100 even in the open state.

The hand-held apparatus 100 includes a lower housing 101 and an upper housing 111. The lower housing 101 and the upper housing 111 are connected to each other such that they can be opened or closed (foldable). Each of the lower housing 101 and the upper housing 111 in FIG. 10 has a shape of horizontally-long rectangular plate, and one long side of the lower housing 101 and one long side of the upper housing 111 are rotatably connected to each other. Normally, a player uses the hand-held apparatus 100 in the open state. On the other hand, a player keeps the hand-held apparatus 100 in a closed state when the hand-held apparatus is not used. In addition, the hand-held apparatus 100 in FIG. 10 does not only keep in the above-described closed state or open state, but also can keep an angle between the lower housing 101 and the upper housing 111 at any degree between a degree of the angle in the closed state and a degree of the angle in the open state, owing to a frictional force generated at the connection part. That is, the upper housing 111 can be kept stationary relative to the lower housing at any degree of the angle.

The lower housing 101 contains a lower LCD (Liquid Crystal Display) 102. The lower LCD 102 has a horizontally-long shape, and located such that a direction of a long side of the lower LCD 102 coincides with a direction of a long side of the lower housing 101. In the present embodiment, an LCD is used as a display included in the hand-held apparatus 100. However, there may be used any other display, e.g., a display in which EL (ElectroLuminescence) is used. In addition, a display having any resolution can be used for the hand-held apparatus 100. It is noted that the lower LCD 102 is mainly used for displaying in real time an image which is to be taken by an inside camera 113 or an outside camera 115, although the detail thereof will be described later.

The lower housing 101 contains operation buttons 104A to 104K and a touch panel 103 as input devices. As shown in FIG. 10, of the operation buttons 104A to 104K, the direction input button 104A, the operation button 104B, the operation button 104C, the operation button 104D, the operation button 104E, the power button 104F, the start button 104G, and the select button 104H are provided on the inside main surface of the lower housing 101 which corresponds to the inner surface when the upper housing 111 and the lower housing 101 are folded together. The direction input button 104A is used for, e.g., a selection operation. The operation buttons 104B to 104E are used for, e.g., a determination operation or a cancel operation. The power button 104F is used for powering ON/OFF the hand-held apparatus 100. As shown in FIG. 10, the direction input button 104A and the power button 104F are provided, on the inside main surface of the lower housing 101, at one of the right side and the left side (in FIG. 10, left side) relative to the lower LCD 102 provided around the center of the main surface. The operation buttons 104B to 104E, the start button 104G, and the select button 104H are provided, on the inside main surface of the lower housing 101, at the other one of the right side and the left side (in FIG. 10, right side) relative to the lower LCD 102. The direction input button 104A, the operation buttons 104B to 104E, the start button 104G, and the select button 104H are used for performing various operations for the hand-held apparatus 100.

It is noted that, in FIG. 10, the operation buttons 104I to 104K are not shown. For example, the L button 104I is provided at the left end of the upper side surface of the lower housing 101, and the R button 104J is provided at the right end of the upper side surface of the lower housing 101. The L button 104I and the R button 104J are used for performing a shooting instruction operation (shutter operation) for the hand-held apparatus 100. In addition, the volume button 104K is provided on the left side surface of the lower housing 101. The volume button 104K is used for adjusting the volume of a speaker included in the hand-held apparatus 100.

The hand-held apparatus 100 includes a touch panel 103 as an input device other than the operation buttons 104A to 104K. The touch panel 103 is provided so as to cover a screen of the lower LCD 102. In the present embodiment, for example, a resistive touch panel is used for the touch panel. However, the touch panel 103 is not limited to a resistive touch panel, and any pressing-type touch panel can be used. In the present embodiment, the touch panel 103 has the same resolution (detection accuracy) as that of the lower LCD 12, for example. However, the resolution of the touch panel 103 may not necessarily coincide with that of the lower LCD 12. At the right side surface of the lower housing 101, an insertion opening (dashed line shown in FIG. 10) is provided. The insertion opening can accommodate a stylus 117 used for an operation of the touch panel 103. Normally, the stylus 117 is used for input to the touch panel 103. However, other than the stylus 117, an operation of the touch panel 103 can also be performed by a finger of a player.

Moreover, at the right side surface of the lower housing 101, an insertion slot (in FIG. 10, shown by a two-dot chain line) for accommodating a memory card 118 is provided. A connector (not shown) for electrically connecting the hand-held apparatus 100 and the memory card 118 is provided at the inside of the insertion slot. The memory card 118 is, for example, an SD (SecureDigital) memory card, and is detachably attached to the connector. The memory card 118 is used for storing (saving) an image taken by the hand-held apparatus 100 or loading an image generated by other apparatuses to the hand-held apparatus 100, for example.

Moreover, at the upper side surface of the lower housing 101, an insertion slot (in FIG. 10, shown by a dashed dotted line) for storing a cartridge 119 is provided. Also inside the insertion slot, a connector (not shown) for electrically connecting the hand-held apparatus 100 and the cartridge 119 is provided. The cartridge 119 is a storage medium having stored therein a color conversion program or a game program, and is detachably inserted into the insertion slot provided to the lower housing 101.

Three LEDs 105A to 105C are provided at the left of a connection part between the lower housing 101 and the upper housing 111. Here, the hand-held apparatus 100 can perform wireless communication with other apparatuses. The first LED 105A is lighted when the hand-held apparatus 100 is ON. The second LED 105B is lighted while the hand-held apparatus 100 is being charged. The third LED 105C is lighted when wireless communication is established. Thus, the three LEDs 105A to 105C make it possible to notify a player of ON/OFF of the hand-held apparatus 100, a state of the charge, and a state of establishment of communication.

On the other hand, the upper housing 111 contains an upper LCD 112. The upper LCD 112 has a horizontally-long shape, and is located such that a direction of a long side of the upper LCD 112 coincides with a direction of a long side of the lower housing 111. It is noted that, as in the lower LCD 102, a display using any other method or having any resolution can be used instead of the upper LCD 112. A touch panel may be provided so as to cover the upper LCD 112. On the upper LCD 112, there is displayed, for example, an operation explanation screen for informing a player of functions of the operation buttons 104A to 104K and the touch panel 103.

Moreover, the upper housing 111 contains two cameras (the inside camera 113 and the outside camera 115). As shown in FIG. 10, the inside camera 113 is provided, near the connection, on the inside main surface of the upper housing 111. On the other hand, the outside camera 115 is provided on a surface, of the upper housing 111, which is opposite to the inside main surface on which the inside camera 113 is provided, that is, the outside camera 115 is provided on an outside main surface (which faces outward when the hand-held apparatus 100 is closed, i.e., which is a back face of the upper housing 111 shown in FIG. 10) of the upper housing 111. In FIG. 10, the outside camera 115 is shown by a dashed line. Thus, the inside camera 113 can perform shooting in a direction in which the inside main surface of the upper housing 111 faces, and the outside camera 115 can perform shooting in a direction opposite to the shooting direction of the inside camera 113, that is, in a direction in which the outside main surface of the upper housing 111 faces. As described above, in the present embodiment, two cameras, i.e., the inside camera 113 and the outside camera 115 are provided such that the shooting directions of them are opposite to each other. For example, a player can take a view seen in a direction from the hand-held apparatus 100 toward a player with use of the inside camera 113, and can take a view seen in a direction opposite to the direction from the hand-held apparatus 100 to a player with use of the outside camera 115.

A microphone (microphone 132 shown in FIG. 11) which is an audio input device is provided, at the connection part, in the inside main surface. Moreover, a microphone opening 106 is formed, at the connection part, in the inside main surface, such that a sound outside the hand-held apparatus 100 can be detected. The microphone 132 and the microphone opening 106 are not necessarily located at the connection part. For example, the microphone 132 may be provided in the lower housing 101, and the microphone opening 106 may be provided to the lower housing 101 such that a position of the microphone opening 106 corresponds to the position of the microphone 132.

A fourth LED 116 (shown by a dashed line in FIG. 10) is provided in the outside main surface of the upper housing 111. The fourth LED 116 is lighted when shooting is performed by the outside camera 115 (when a shutter button is pressed down). In addition, the fourth LED 116 is lighted while a movie is being shot by the outside camera 115. The fourth LED 116 makes it possible to notify a person who is shot or a person around the person who is shot that shooting has been performed (is being performed) by the hand-held apparatus 100.

A sound hole 114 is formed, on the inside main surface, at each of the right and left side relative to the upper LCD 112 provided around the center of the main surface of the upper housing. A speaker is accommodated, in the upper housing 111, at the back of each sound hole 114. The sound holes 114 are provided in order to release a sound emitted from the speakers to the outside of the hand-held apparatus 100.

As described above, the upper housing 111 contains the inside camera 113 and the outside camera 115 for taking an image, and the upper LCD 112 which is display means for displaying, e.g., an operation explanation screen when shooting. On the other hand, the lower housing 101 includes input devices (touch panel 103 and buttons 104A to 104K) for performing input to operate the hand-held apparatus 100, and the lower LCD 102 which is display means for displaying game screen. Therefore, when using the hand-held apparatus 100, a player can perform input to the input devices while viewing a taken image (image which is take by the camera) displayed on the lower LCD 102 and holding the lower housing 101.

The following will describe an internal configuration of the hand-held apparatus 100 with reference to FIG. 11. FIG. 11 is a block diagram showing an internal configuration of the hand-held apparatus 100.

As shown in FIG. 11, the hand-held apparatus 100 includes electronic parts such as a CPU 121, a main memory 122, a memory control circuit 123, a data save memory 124, a preset data memory 125, a memory card interface (memory card I/F) 126, a cartridge I/F 134, a wireless communication module 127, a local communication module 128, a real time clock (RTC) 129, a power circuit 130, and an interface circuit (I/F circuit) 131. After being mounted on electronic circuit substrates, these electronic parts are accommodated in the lower housing 101 (alternatively, may be included in the upper housing 111).

The CPU 121 is information processing means for executing a predetermined program. In the present embodiment, a coordination application downloaded from the stationary apparatus 3 is stored in a memory in the hand-held apparatus 100, and the CPU 121 executes a program of the coordination application to carry out below-described coordination game processing.

The main memory 122, the memory control circuit 123, and the preset data memory 125 are connected to the CPU 121. In addition, the data save memory 124 is connected to the memory control circuit 123. The main memory 122 is storage means used as a work region or a buffer region for the CPU 121. That is, the main memory 122 stores a program and various data used in the below-described coordination game processing. In the present embodiment, for example, a PSRAM (Pseudo-SRAM) is used for the main memory 122. The data save memory 124 is storage means for storing a program executed by the CPU 121, data of an image taken by the inside camera 113 or the outside camera 115, and the like. The data save memory 124 is composed of a nonvolatile storage medium. In the present embodiment, for example, a NAND-type flash memory is used as a nonvolatile storage medium. The memory control circuit 123 controls readout of data from or writing of data to the data save memory 124, in accordance with an instruction from the CPU 121. The preset data memory 125 is storage means for storing data (preset data) such as various parameters which are set in advance in the hand-held apparatus 100. A flash memory connected to the CPU 121 via a SPI (SerialPeripheralInterface) bus can be used as the preset data memory 125.

The memory card I/F 126 is connected to the CPU 121. The memory card I/F 126 performs readout of data from or writing of data to the memory card 118 connected to the connector, in accordance with an instruction from the CPU 121. In the present embodiment, for example, data of an image taken by the outside camera 115 is written to the memory card 118, or data of an image stored in the memory card 118 is read out therefrom and then stored in the data save memory 124.

The cartridge I/F 134 is connected to the CPU 121. The cartridge I/F 134 performs readout of data from or writing of data to the cartridge 119 connected to the connector, in accordance with an instruction from the CPU 121.

The wireless communication module 127 has a function to establish a connection to a wireless LAN based on, for example, the standards of IEEE 802.11.b/g. The local communication module 128 has a function to perform, based on a predetermined communication method, wireless communication with other types of game apparatuses which can perform communication by the same type of communication method or the same communication method as the predetermined communication method. The wireless communication module 127 and the local communication module 128 are connected to the CPU 121. The CPU 121 can transmit data to and receive data from other apparatuses via the Internet by using the wireless communication module 127, and can transmit data to and receive data from the same type of game apparatuses or other types of game apparatuses by using the local communication module 128.

The RTC 129 and the power circuit 130 are connected to the CPU 121. The RTC 129 counts time and outputs the counted time to the CPU 121. For example, the CPU 121 can also calculate a current time (date) or the like based on the counted time. The power circuit 130 controls a power supplied from a power source (which is typically a battery and is accommodated in the lower housing 101) of the hand-held apparatus 100, and then supplies the power to each part of the hand-held apparatus 100.

The hand-held apparatus 100 includes the microphone 132 and an amplifier 133. Each of the microphone 132 and the amplifier 133 is connected to the I/F circuit 131. The microphone 132 detects a sound emitted from a player toward the hand-held apparatus 100, and outputs an audio signal representing the sound to the I/F circuit 131. The amplifier 133 amplifies the audio signal by using the I/F circuit 131 and outputs the amplified audio signal through the speaker (not shown). The I/F circuit 131 is connected to the CPU 121.

The touch panel 103 is connected to the I/F circuit 131. The I/F circuit 131 includes an audio control circuit for controlling the microphone 132 and the amplifier 133 (speaker), and a touch panel control circuit for controlling the touch panel 103. The audio control circuit performs A/D conversion or D/A conversion for the audio signal, or converts the audio signal into audio data in a predetermined format. The touch panel control circuit generates touch position data in a predetermined format, based on a signal from the touch panel 103, and outputs the touch position data to the CPU 121. For example, the touch position data indicates a coordinate of a position, on an input surface of the touch panel 103, at which input has been performed. In the touch panel control circuit, reading of a signal from the touch panel 103 and generation of touch position data are performed once a predetermined time period. The CPU 121 obtains touch position data from the I/F circuit 131 and thereby can recognize a position, on the touch panel, at which input is performed.

The operation button 104 includes the above-described operation buttons 104A to 104K, and is connected to the CPU 121. Operation data indicating states of inputs to the operation buttons 104A to 104K, i.e., indicating whether or not the respective operation buttons are pressed, is outputted from the operation button 104 to the CPU 121. The CPU 121 obtains the operation data from the operation button 104, and carries out processing based on inputs to the operation button 104.

Each of the inside camera 113 and the outside camera 115 is connected to the CPU 121. The inside camera 113 or the outside camera 115 takes an image in accordance with an instruction from the CPU 121, and outputs data of the taken image to the CPU 121.

Each of the lower LCD 102 and the upper LCD 112 is connected to the CPU 121. Each of the lower LCD 102 and the upper 112 displays an image in accordance with an instruction from the CPU 121.

The following will describe an outline of the coordination game system assumed in the present embodiment. In the present embodiment, there will be described an example where an application of, so called, a "trial version" of a game (hereinafter, simply referred to as "trial version") executed by the hand-held apparatus is played. More specifically, in this example, the stationary apparatus 3 obtains a "trial version" by downloading it from the server. Thereafter, the application of the "trial version" is downloaded from the stationary apparatus 3 to the hand-held apparatus 100, and executed on the hand-held apparatus 100. In the present embodiment, this "trial version" is the "coordination game" in which both the stationary apparatus 3 and the hand-held apparatus 100 are used.

FIGS. 12 to 20 are examples of screens displayed in the coordination game system assumed in the present embodiment. First, a player operates the stationary apparatus 3 to start a distribution control program from a screen of an initial menu which is not shown. After the distribution control program is started, the stationary apparatus 3 establishes a connection with the server 200 via the Internet, thereby it becomes possible to communicate with the server 200, and then the initial menu (not shown) of the distribution control program is displayed.

Figure 12:
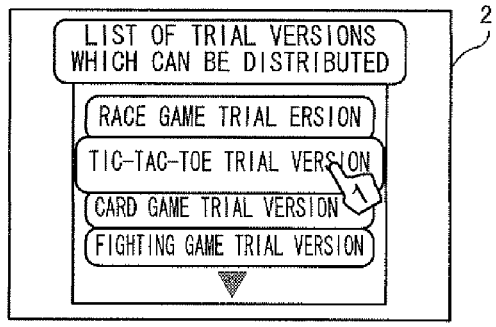
FIG. 12 shows an example of a screen displayed in a coordination game system assumed in the present embodiment.

Next, the player performs a predetermined operation on the initial menu of the distribution control program to display a screen for downloading "trial versions" as shown in FIG. 12. In FIG. 12, a list of "trial versions" which can be downloaded from the server 200 are displayed (data of a basis for the list is obtained from the server 200 before displaying the screen). On the screen in FIG. 12, the player selects a "trial version" which the player wants to download. In the present embodiment, "tic-tac-toe trial version" is selected.

Figure 13:
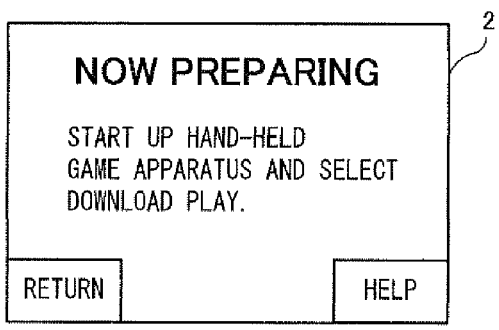
FIG. 13 shows an example of a screen displayed in the coordination game system assumed in the present embodiment.
Figure 14:
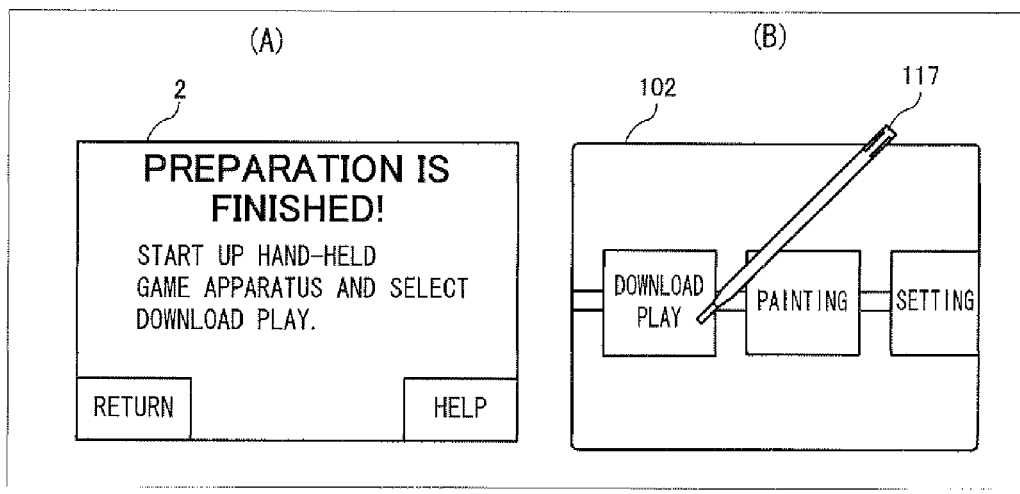
FIG. 14 shows an example of a screen displayed in the coordination game system assumed in the present embodiment.
Figure 15:
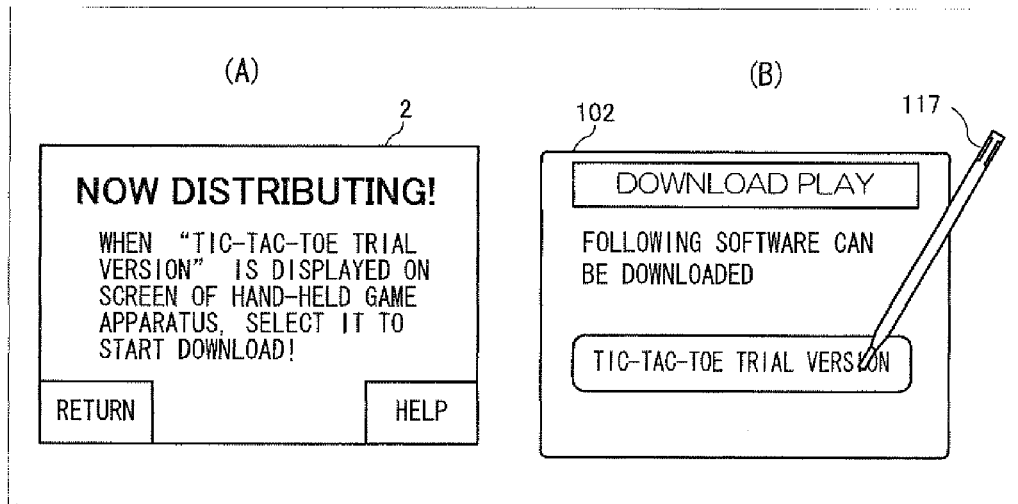
FIG. 15 shows an example of a screen displayed in the coordination game system assumed in the present embodiment.
Figure 16:
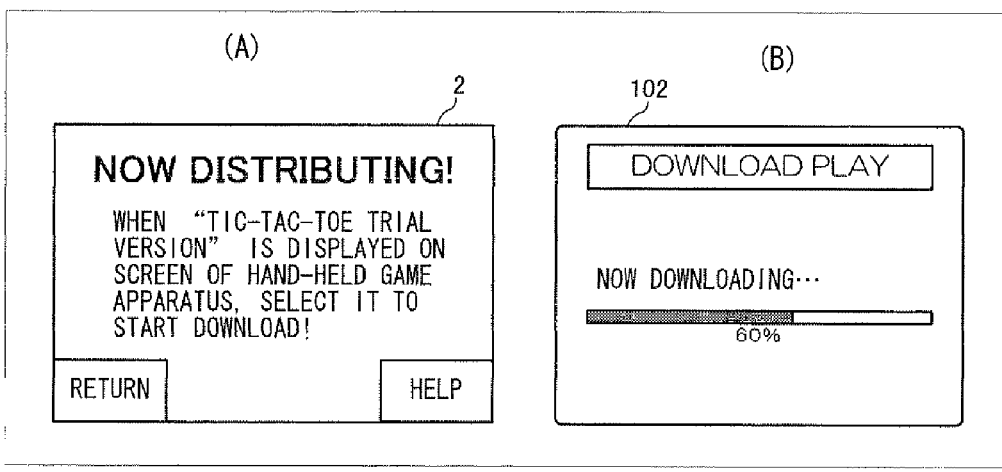
FIG. 16 shows an example of a screen displayed in the coordination game system assumed in the present embodiment.
Figure 17:
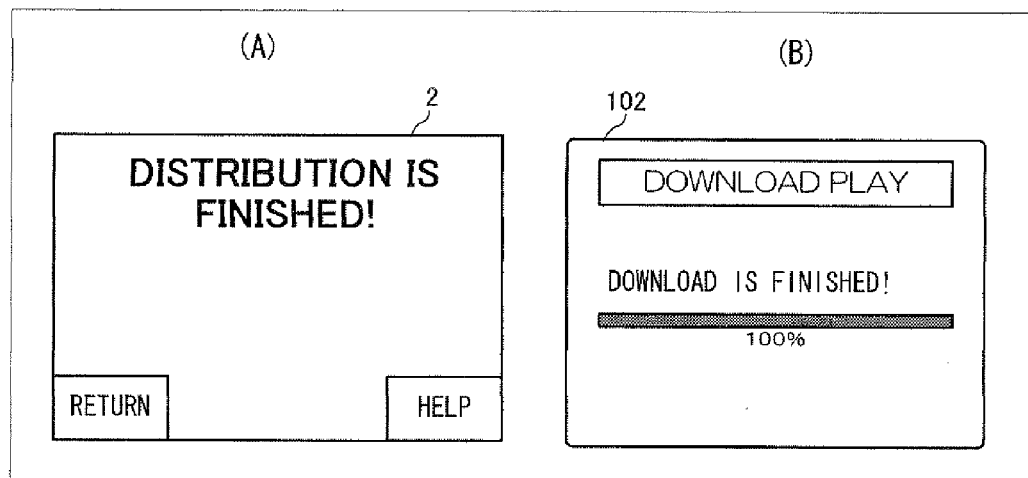
FIG. 17 shows an example of a screen displayed in the coordination game system assumed in the present embodiment.
Figure 18:
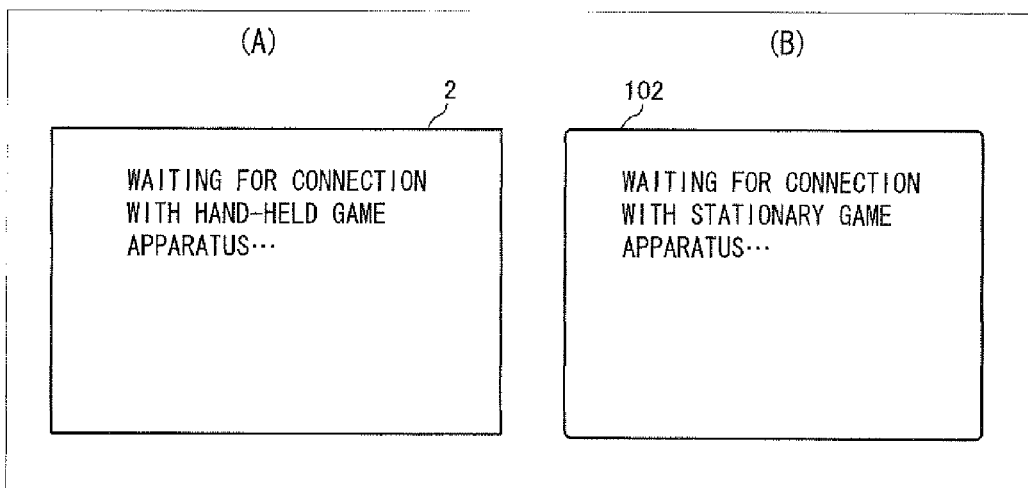
FIG. 18 shows an example of a screen displayed in the coordination game system assumed in the present embodiment.
Figure 19:
FIG. 19 shows an example of a screen displayed in the coordination game system assumed in the present embodiment.
Figure 20:
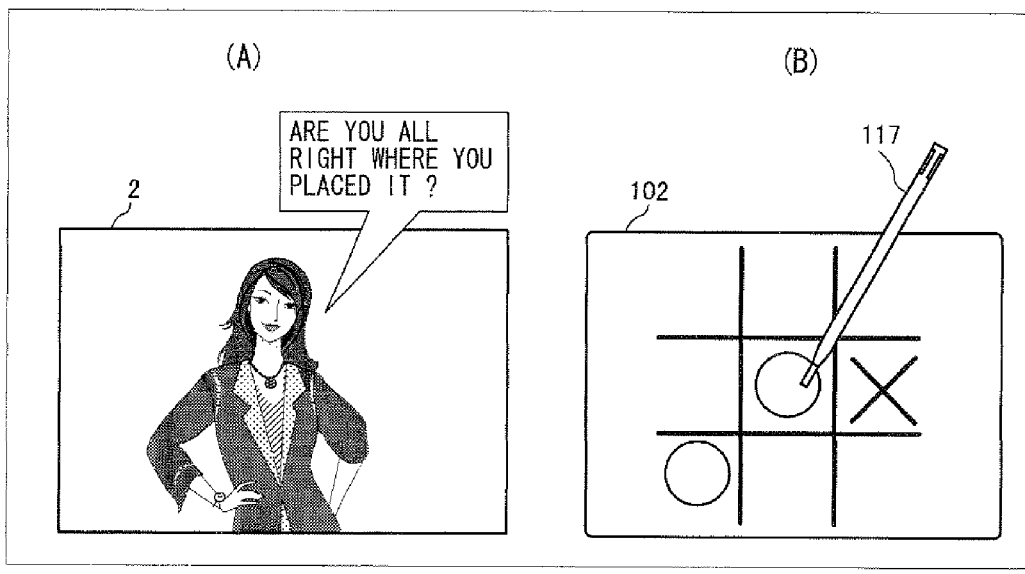
FIG. 20 shows an example of a screen displayed in the coordination game system assumed in the present embodiment.

When a "trial version" which the player wants to download is selected, the stationary apparatus 3 communicates with the server 200 to obtain data constituting the selected "trial version" from the server 200. Specifically, the data constituting the "trial version" includes two elements, which are "video data" and an "application (hereinafter, referred to as coordination application) to be executed by the hand-held apparatus 100" (the details of the two elements are described later). That is, the "coordination application" executed by the hand-held apparatus 100, and a video reproduced by the stationary apparatus 3 are coordinated with each other, thereby realizing "coordination game" of the present embodiment. While the data constituting the "trial version" is being obtained from the server, a screen shown in FIG. 13 is displayed on the stationary apparatus 3. On this screen, there is also displayed a message inducing the player to make ready the hand-held apparatus 100.

When the download is completed, a message to the effect that the download from the server 200 is completed is displayed on the stationary apparatus 3, as shown in FIG. 14(A). On this screen, there is also displayed a message inducing the player to make ready the hand-held apparatus 100. Next, the player starts the hand-held apparatus 100, and then starts, from an initial menu displayed on the hand-held apparatus 100 as shown in FIG. 14(B), an application (in FIG. 14(B), "download play") for downloading and playing a game. When this application is started, connection for performing wireless communication between the stationary apparatus 3 and the hand-held apparatus 100 is established (and connection between the stationary apparatus 3 and the server 200 is terminated).

When the connection between the stationary apparatus 3 and the hand-held apparatus 100 is established, a screen indicating that distribution is being performed is displayed on the stationary apparatus 3, as shown in FIG. 15(A). On the other hand, an application (in this case, the "tic-tac-toe trial version") which can be downloaded from the stationary apparatus 3 is displayed on the hand-held apparatus 100, as shown in FIG. 15(B). When the player operates the hand-held apparatus 100 and selects the "tic-tac-toe trial version", download from the stationary apparatus 3 is started and a screen indicating a state of download is displayed on the hand-held apparatus 100, as shown in FIG. 16(B) (meanwhile, the screen indicating that distribution is being performed remains displayed on the stationary apparatus 3, as shown in FIG. 16(A)).

When the download of the "tic-tac-toe trial version" from the stationary apparatus 3 to the hand-held apparatus 100 is completed, a screen shown in FIG. 17(A) indicating completion of the download is displayed on the stationary apparatus 3, and a screen shown in FIG. 17(B) indicating completion of the download is displayed on the hand-held apparatus 100 as well.

Thereafter, the "tic-tac-toe trial version" is automatically started on the hand-held apparatus 100. Alternatively, there may be displayed a confirmation screen for start of the "tic-tac-toe trial version". In the present embodiment, processing for once terminating communication between the stationary apparatus 3 and the hand-held apparatus 100 and establishing a connection therebetween again is performed when starting the "tic-tac-toe trial version". That is, when executing the "tic-tac-toe trial version", a connection between the stationary apparatus 3 and the hand-held apparatus 100 is re-established such that communication suitable for executing the game is performed. Accordingly, just after starting the "tic-tac-toe trial version", a screen indicating that a connection is being established again is displayed, as shown in FIGS. 18(A) and (b).

After the connection between the stationary apparatus 3 and the hand-held apparatus 100 is established, an initial menu of the "tic-tac-toe trial version" as shown in FIG. 19(B) is displayed on the lower LCD 102 of the hand-held apparatus 100. On the other hand, a video as shown in FIG. 19(A) is reproduced on the TV 2 connected to the stationary apparatus 3. The video shown in FIG. 19(A) is an introduction video in which a woman introduces the "tic-tac-toe trial version". This video is based on the "video data" downloaded from the server 200 to the stationary apparatus 3.

After the player selects start of the "tic-tac-toe trial version" on the screen in FIG. 19(B), the "tic-tac-toe" game is started. The following is a simple description of rules of the "tic-tac-toe". In this game, the player and the CPU 121 of the hand-held apparatus 100 alternately places marks one by one on nine squares of a grid of three squares in a vertical row by three squares in a horizontal row as shown in FIG. 20(B), wherein the first one, of the player or the CPU 121, that places three of the same mark in a line vertically, horizontally, or diagonally, is a winner. In the present embodiment, the player is first to place a mark, and the CPU 121 is second to place a mark. Marks for the player is represented by "o", and marks for the CPU 121 is represented by "x". By touching any one of the squares with the stylus 117, the player can place his or her own mark.

In the present embodiment, different videos are reproduced on the stationary apparatus 3 depending on the player's operation of the hand-held apparatus 100 and a progress of the "tic-tac-toe" game. That is, a predetermined video which is coordinated with a state of an execution of an application on the hand-held apparatus 100 is reproduced on the stationary apparatus 3. For example, when the player places marks, the stationary apparatus 3 reproduces a video in which the woman says "Are you all right where you placed it?". Moreover, when the player wins, the stationary apparatus 3 reproduces a video in which the woman says "I lost". Hereinafter, an outline of the above processing will be described.

Firstly, there will be described a configuration of the video data downloaded from the server 200 to the stationary apparatus 3. FIG. 21 shows an example of the configuration of the video data. The video data downloaded from the server 200 to the stationary apparatus 3 includes a plurality of videos to be reproduced in accordance with the progress of the game. Each of the videos includes one group of frames which makes up one motion picture. As shown in FIG. 21, for example, frames 0001 to 0100 constitute the above-described introduction video for introducing the game.

Frames 0201 to 0300 constitute a guide video for explaining operations of the game.

Next, there will be described coordination processing performed between a reproduction of the video data and the progress of the game described above. In the present embodiment, the hand-held apparatus 100 notifies the stationary apparatus 3 of a frame number of the video which should be reproduced, in accordance with the progress of the game and the player's operation, thereby causing the stationary apparatus 3 to reproduce a video corresponding to a situation of the game. For example, in the case where the introduction video described above is to be reproduced, the hand-held apparatus 100 transmits, to the stationary apparatus 3, data designating the frame 0001 as a reproduction start frame and the frame 0100 as a reproduction end frame, at the timing just after the "tic-tac-toe" game is started. In accordance with this data, the stationary apparatus 3 performs processing for reproducing a video, of the video data, corresponding to the frames 0001 to 0100. Thus, the introduction video, which includes the frames 0001 to 0100, is reproduced on the TV 2 at the time of starting the coordination game.

Similarly, while the "tic-tac-toe" game is being played, the hand-held apparatus 100 timely transmits data designating a start frame and an end frame, and the stationary apparatus 3 performs processing for reproducing a video including frames from the transmitted start frame to the transmitted end frame. In this game, marks are alternately placed as described above, and for example, at the timing when the player performs an operation of placing a mark, the hand-held apparatus 100 transmits, to the stationary apparatus 3, data designating frames (a start frame and an end frame, shown at No. 12 in FIG. 21) which constitute a video in which the woman says "Are you all right where you placed it?". In accordance with this data, the stationary apparatus 3 performs processing for reproducing the video including the designated frames.

Thereafter, at the timing when the CPU 121 performs processing for placing marks on its turn, the hand-held apparatus 100 transmits, to the stationary apparatus 3, data designating frames (frames constituting a video of No. 16 in FIG. 21) which constitute a video in which the woman operates a hand-held apparatus 100 while saying "I'll place it here". Moreover, at the timing when a winner is decided, if the player is a winner, the hand-held apparatus 100 transmits, to the stationary apparatus 3, data designating frames (frames constituting a video of No. 17 in FIG. 21) which constitute a video in which the woman says "I lost", or if the CPU 121 is a winner, the hand-held apparatus 100 transmits, to the stationary apparatus 3, data designating frames (frames constituting a video of No. 18 in FIG. 21) which constitute a video in which the woman says "I won" with joy.

In the present embodiment, there are some scenes for each of which a plurality of videos are prepared. In FIG. 21, three videos of No. 7 to 9 are created as videos to be reproduced when the player places a mark on the first turn. In the present embodiment, in such a scene for which a plurality of videos are prepared, one video is selected from the plurality of videos in a random manner, and is reproduced.

As described above, in the present embodiment, the hand-held apparatus 100 designates frames which should be reproduced, in accordance with the player's operation and the progress of the game, and notifies the stationary apparatus 3 of the frames, thereby: causing the stationary apparatus 3 to reproduce a video coordinated with a development of the game; and displaying the video on the TV 2. Thus, at a versus game as described above, it becomes possible to provide, to the player, feelings of playing the versus game against the woman reproduced on the TV 2.

As a matter of course, example embodiments of the present invention are applicable to not only a versus game as described above but also other types of games. That is, the TV 2 can be used as an additional screen for a game executed by the hand-held apparatus 100, and moreover, supplementary information, or the like can be displayed on the TV 2. For example, in an action game, an RPG, or the like, a video including a hint for the game can be displayed on the TV 2 in accordance with a scene in the game.

Other than the above, it is assumed that there exists a screen or a monitor as an object in a virtual space of a game executed by the hand-held apparatus 100. For example, when a scene of an RPG in which there exists a building having a large screen on its wall is displayed on the lower LCD 102 of the hand-held apparatus 100 (wherein the scene displayed on the lower LCD 102 is small and therefore a player cannot recognize what is reproduced on the screen of the building), the game can become increasingly realistic by causing the stationary apparatus to reproduce the video displayed on the screen of the building. Moreover, if a video including information (e.g., profile) about a character in the game, or the like is reproduced on the stationary apparatus 3, the player can learn about the character in further detail along with the progress of the game, and, for example, the player can easily empathize with the character, thereby enabling amusingness of the game to be increased.

As described above, in the present embodiment, video data, and a coordination application executed by the hand-held apparatus 100 are downloaded from the server 200 to the stationary apparatus 3, and only the coordination application is transmitted from the stationary apparatus 3 to the hand-held apparatus 100. The downloaded video data is reproduced on the stationary apparatus 3 in coordination with a state of an execution of the coordination application on the hand-held apparatus 100, or the like. Thus, an unprecedented application, such as a game, in which a stationary apparatus and a hand-held apparatus are coordinated with each other, can be distributed.

The following will describe, in detail, coordination game distribution processing and coordination game processing executed by the system according to the present embodiment. Firstly, data stored in each of the server 200, the stationary apparatus 3, and the hand-held apparatus 100 in the system will be described.

Figure 22:
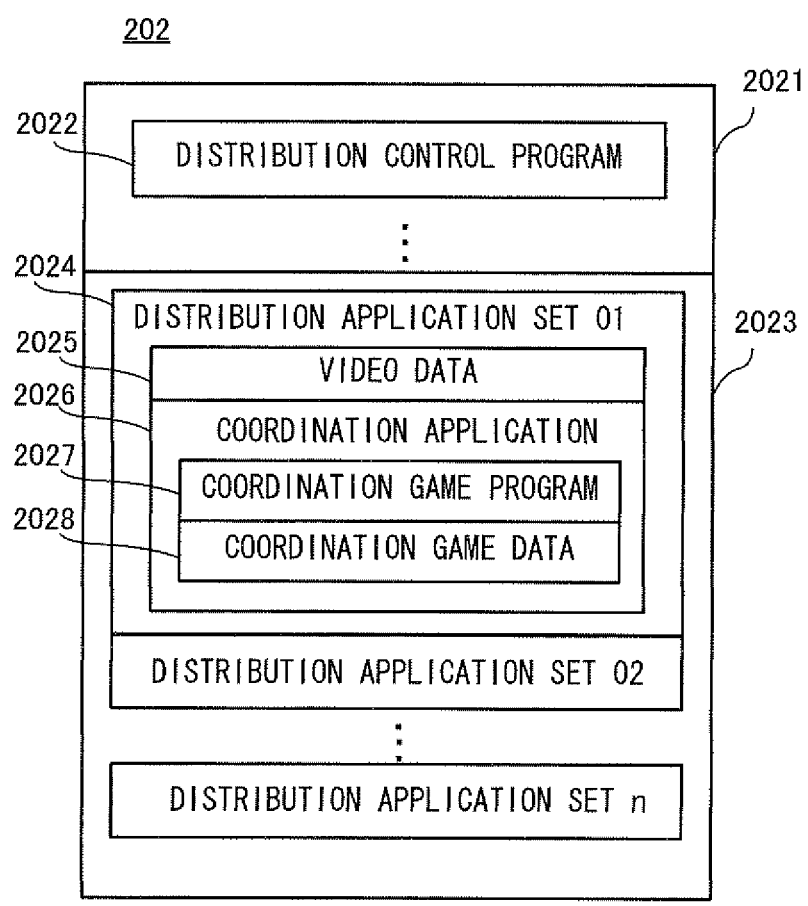
FIG. 22 shows a memory map of a memory 202 of the server 200.

Here, the data stored in the server 200 is described. FIG. 22 shows a memory map of the memory 202 of the server 200. As shown in FIG. 22, the memory 202 includes a program storage area 2021 and a data storage area 2023. The program storage area 2021 stores a distribution control program 2022. The distribution control program 2022 is used for transmitting, to the stationary apparatus 3, a predetermined coordination application and predetermined video data (in the present embodiment, which correspond to the "trial version" described above), in accordance with a request from the stationary apparatus 3. On the other hand, the data storage area 2023 stores a plurality of distribution application sets 24. Each of the distribution application sets 24 includes video data 2025 and a coordination application 2026. The video data 2025 includes a video to be reproduced by the stationary apparatus 3 as described above and is already encoded by a predetermined encoding method (note that a method which allows the encoded data to be reproduced by the stationary apparatus 3 is used for the predetermined encoding method). The coordination application 2026 is data including an application (in the present embodiment, "tic-tac-toe" game) to be eventually executed on the hand-held apparatus 100. The coordination application 2026 includes a coordination game program 2027 for causing the CPU 121 of the hand-held apparatus 100 to execute the "tic-tac-toe" game, and coordination game data 2028 including various data to be used in the game, e.g., image data and audio data. Data to be stored in the program storage area 2021 and the data storage area 2023 is stored in the external storage unit 201, and when executing the distribution control program 2022, the data is transferred to and stored in the memory 202.

Figure 23:
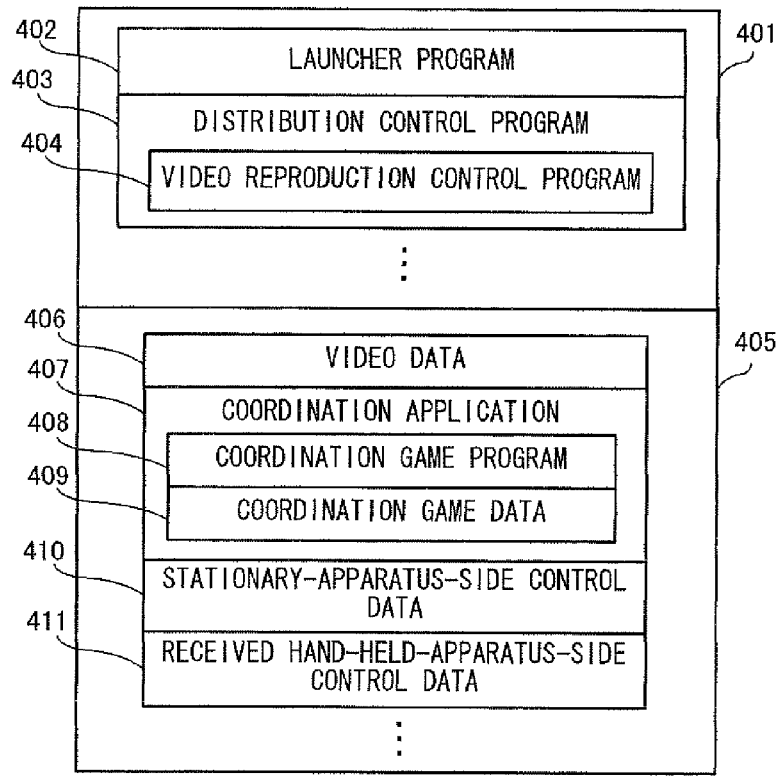
FIG. 23 shows a memory map of an external main memory 12 of the stationary apparatus 3.

Next, the data stored in the stationary apparatus 3 is described. FIG. 23 shows a memory map of the external main memory 12 of the stationary apparatus 3. As shown in FIG. 23, the external main memory 12 includes a program storage area 401 and a data storage area 405. Data to be stored in the program storage area 401 is stored in the flash memory 17, and when executing the program, the data is transferred to and stored in the external main memory 12.

The program storage area 401 stores a launcher program 402, and a distribution control program 403. The launcher program 402 is used for controlling an initial menu (not shown) which is displayed when the stationary apparatus 3 is started. The distribution control program 403 is an application which can be selected from the initial menu, and is used for, as described above, downloading the "trial version" from the server 200 and controlling transmission of the "trial version" to the hand-held apparatus 100. In addition, the distribution control program 403 includes a video reproduction control program 404 for, based on a reproduction instruction from the hand-held apparatus 100, reproducing video data 406 obtained from the server 200.

The data storage area 405 stores the video data 406, a coordination application 407, stationary-apparatus-side control data 410, and received hand-held-apparatus-side control data 411. Of these data stored in the data storage area 405, the video data 406 and the coordination application 407 are downloaded from the server 200 and then stored in the data storage area 405. Therefore, the video data 406 and the coordination application 407 are the same as the video data 2025 and the coordination application 2026, respectively.

Figure 24:
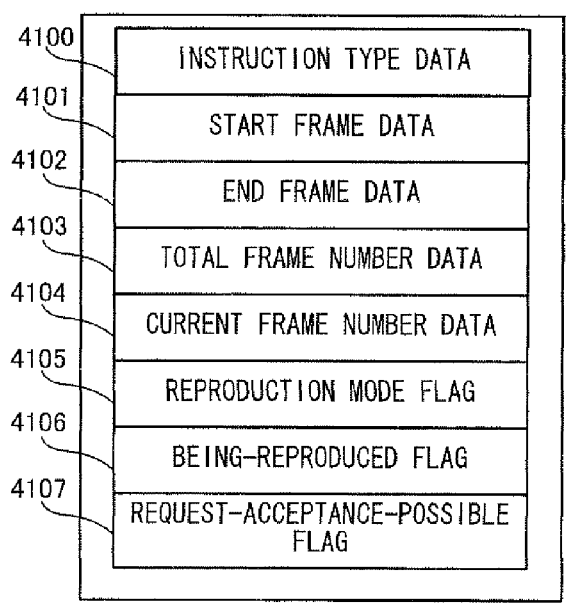
FIG. 24 shows an example of a data configuration of a stationary-apparatus-side control data 410.

The stationary-apparatus-side control data 410 is transmitted frame by frame (in the present embodiment, every 1/60 second) from the stationary apparatus 3 to the hand-held apparatus 100, and indicates a state of a reproduction of a video on the stationary apparatus 3. FIG. 24 shows an example of a data configuration of the stationary-apparatus-side control data 410. The stationary-apparatus-side control data 410 includes instruction type data 4100, start frame data 4101, end frame data 4102, total frame number data 4103, current frame number data 4104, a reproduction mode flag 4105, a being-reproduced flag 4106, and a request-acceptance-possible flag 4107.

The instruction type data 4100 indicates a content of an instruction transmitted from the hand-held apparatus 100 to the stationary apparatus 3. That is, the instruction type data 4100 indicates what instruction is received by the stationary apparatus 3 from the hand-held apparatus 100. Specifically, in the present embodiment, the instruction type data 4100 is data indicating either one of "reproduction of a video" or "quitting a game".

The start frame data 4101 indicates a start frame number of a video to be reproduced, and the end frame data 4102 indicates an end frame number of a video to be reproduced.

The total frame number data 4103 indicates the number of total frames included in the video data 2025 downloaded from the server 200. For example, the number of total frames included in all the videos shown in FIG. 21 described above is "2100". The current frame number data 4104 indicates a number of a frame which is currently being reproduced on the stationary apparatus 3.

The reproduction mode flag 4105 indicates a current reproduction mode. As a reproduction mode, there are a "one play" mode in which a designated video is reproduced once and then the reproduction is stopped, and a "loop" mode in which a designated video is repeatedly reproduced. The hand-held apparatus 100 designates one of the modes by using hand-held-apparatus-side control data 508 described below.

The being-reproduced flag 4106 indicates whether or not a video is currently being reproduced. The being-reproduced flag 4106 is turned on during a reproduction, and turned off when a video is not being reproduced.

The request-acceptance-possible flag 4107 indicates whether or not the stationary apparatus 3 can accept a video reproduction instruction, which is included in the hand-held-apparatus-side control data 508 described below and is transmitted from the hand-held apparatus 100. The request-acceptance-possible flag 4107 is turned on when the stationary apparatus 3 can accept the instruction, and is turned off when the stationary apparatus 3 cannot accept the instruction. It is noted that, for example, the stationary apparatus 3 cannot accept the instruction when the stationary apparatus 3 is in preparation for reproducing a video (when the stationary apparatus 3 is reading video data, or seeking a start frame).

The hand-held-apparatus-side control data 508 (shown in FIG. 26 described below) transmitted from the hand-held apparatus 100 is received as the received hand-held-apparatus-side control data 411. The stationary apparatus 3 starts a reproduction from a predetermined frame of the video data 406, based on the received hand-held-apparatus-side control data 411. Hereinafter, characters "j" are added to the ends of the reference numerals of data included in the received hand-held-apparatus-side control data 411, as in, for example, "start frame data 5082j", for the purpose of distinguishing the data from data stored in the hand-held apparatus 100.

Figure 25:
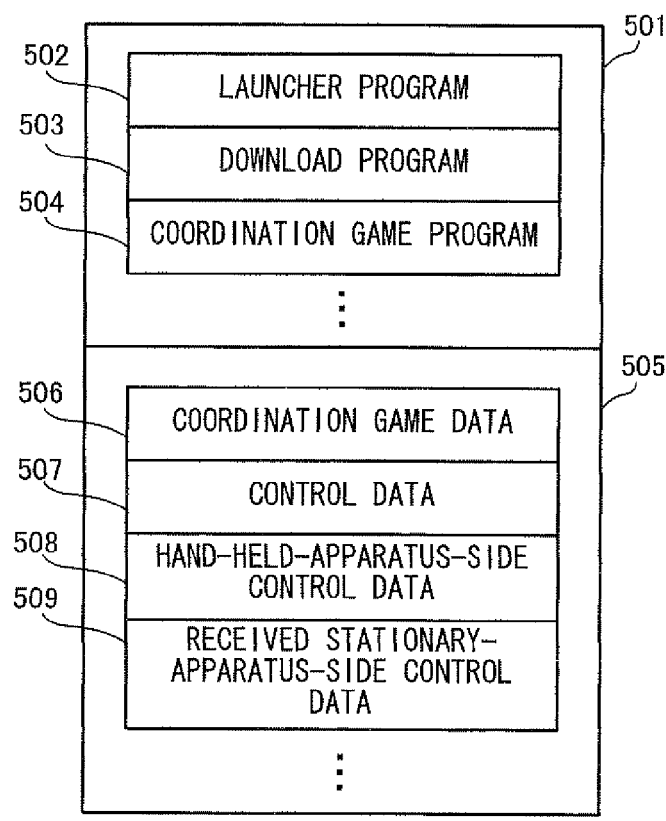
FIG. 25 shows a memory map of a main memory 122 of the hand-held apparatus 100.

Next, the data stored in hand-held apparatus 100 is described. FIG. 25 shows a memory map of the main memory 122 of the hand-held apparatus 100. As shown in FIG. 25, the main memory 122 includes a program storage area 501 and a data storage area 505. Of data in the program storage area 501, a launcher program 502 and a download program 503 are stored in the data save memory 124, and when executing these programs, are transferred to and stored in the external main memory 122. A coordination game program 408 included in the coordination application 407 downloaded from the stationary apparatus 3 is stored as a coordination game program 508.

The data storage area 505 stores coordination game data 506, operation data 507, the hand-held-apparatus-side control data 508, received stationary-apparatus-side control data 509, and the like. Coordination game data 409 included in the coordination application 407 downloaded from the stationary apparatus 3 is stored as the coordination game data 506. The operation data 507 indicates an operation performed for the hand-held apparatus 100 by a player. In the present embodiment, the operation data 507 is updated at intervals of 1/60 second.

The hand-held-apparatus-side control data 508 is transmitted from the hand-held apparatus 100 to the stationary apparatus 3 while a coordination game is being executed, and is used for designating and reproducing a video as described above which is reproduced on the stationary apparatus 3.

Figure 26:
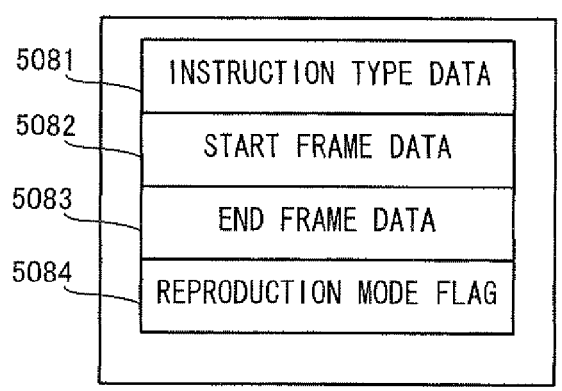
FIG. 26 shows an example of a data configuration of a hand-held-apparatus-side control data 508.

FIG. 26 shows an example of a data configuration of the hand-held-apparatus-side control data 508. The hand-held-apparatus-side control data 508 includes instruction type data 5081, start frame data 5082, end frame data 5083, and a reproduction mode flag 5084.

The instruction type data 5081 indicates what instruction is sent from the hand-held apparatus 100 to the stationary apparatus 3. Specifically, in the present embodiment, the instruction type data 5081 is data indicating either one of "reproduction of a video" or "quitting of a game".

The start frame data 5082 indicates a start frame number of a video which should be reproduced by the stationary apparatus 3, and the end frame data 5083 indicates an end frame number of a video which should be reproduced by the stationary apparatus 3.

The reproduction mode flag 5084 is used for designating a reproduction mode when reproducing a video on the stationary apparatus 3. Either one of the "one play" mode or the "loop" mode as described above is designated.

The stationary-apparatus-side control data 410 transmitted frame by frame (every 1/60 second) from the stationary apparatus 3 is received as the received stationary-apparatus-side control data 509. Therefore, a configuration of the received stationary-apparatus-side control data 509 is the same as that of the stationary-apparatus-side control data 410 shown in FIG. 24 described above (hereinafter, characters "j" are added to the ends of the reference numerals of data included in the received hand-held-apparatus-side control data 411, as in, for example, "start frame data 4101j", for the purpose of distinguishing the data from data stored in the stationary apparatus 3. As described above, in the present embodiment, since the stationary-apparatus-side control data is sent from the stationary apparatus 3 to the hand-held apparatus 100 at the rate of once per 1/60 second, the received stationary-apparatus-side control data 509 is updated at this rate. In the present embodiment, data which is necessary to be stored as the received stationary-apparatus-side control data 509 is only the latest stationary-apparatus-side control data (obtained last).

Figure 27:
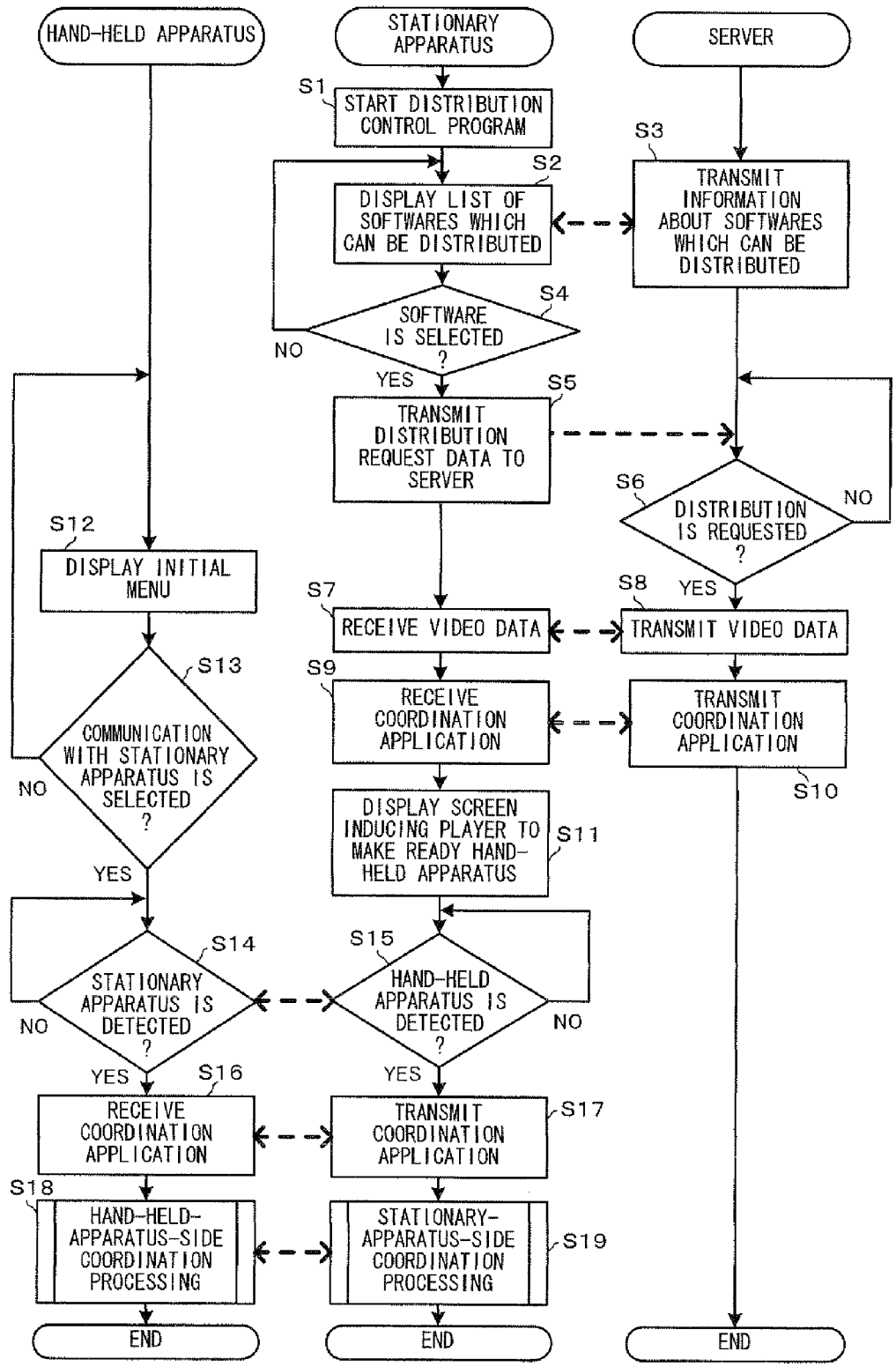
FIG. 27 is a flowchart showing all processings included in the coordination game processing executed by the system.

Next, the coordination game processing executed by the system according to the present embodiment will be described, with reference to FIGS. 27 to 37. FIG. 27 is a flowchart showing all processings included in the coordination game processing executed by the system. FIG. 27 shows, starting from the right, a flow of processing on the server 200, a flow of processing on the stationary apparatus 3, and a flow of processing on the hand-held apparatus 100. As shown in FIG. 27, first, the distribution control program 403 is started on the stationary apparatus 3 (step S1).

Next, a list of software which can be distributed (which can be downloaded) is displayed on the stationary apparatus 3 (step S2). More specifically, the CPU 10 of the stationary apparatus 3 requests the server 200 for information about the software which can be distributed. In response, the server 200 executes processing for transmitting, to the stationary apparatus 3, the information about the software which can be distributed (step S3). The information is received by the stationary apparatus 3, and the list of software which can be distributed is generated based on the information and displayed on the stationary apparatus 3.

Next, the stationary apparatus 3 accepts an operation from a player, and determines whether or not an operation of selecting, from the list, a piece of software to be downloaded is performed (step S4). In the result, if it is determined that a piece of software is selected (NO in step S4), determination in step S4 is repeated until a piece of software is selected. On the other hand, if it is determined that a piece of software is selected (YES in step S4), the stationary apparatus 3 generates data requesting distribution of the selected piece of software and transmits the data to the server 200 (step S5).

The server 200 determines whether or not distribution is requested by the stationary apparatus 3 after transmitting the information about the software which can be distributed (step S6). In the result of the determination in step S6, if it is determined that distribution is not requested (NO in step S6), determination in step S6 is repeated (i.e., keeps waiting for a request for distribution).

On the other hand, in the result of the determination in step S6, if it is determined that distribution is requested (YES in step S6), the server 200 transmits the video data 2025 to the stationary apparatus 3 (step S7), and the stationary apparatus 3 receives the video data 2025 (step S8). After transmission and reception of the video data 2025 are finished, then the server 200 transmits the coordination application 2026 to the stationary apparatus 3 (step S9), and the stationary apparatus 3 receives the coordination application 2026 (step S10).

After transmission and reception of the coordination application 2026 are finished, the stationary apparatus 3 displays, on the TV 2, the screen (see FIG. 14(A)) inducing a player to make ready the hand-held apparatus 100 (step S11). Thereafter, the stationary apparatus 3 executes processing for detecting the hand-held apparatus 100 (step S15). For example, the CPU 10 of the stationary apparatus 3 determines whether or not a request for connection from the hand-held apparatus 100 is detected. In the result, if it is determined that the request is not detected (NO in step S15), the determination whether or not the request for connection from the hand-held apparatus 100 is detected is repeated. If it is determined that the request is detected (YES in step S15), processing for transmitting the coordination application 407 stored in the stationary apparatus 3 to the hand-held apparatus 100 is executed (step S17).

On the other hand, the hand-held apparatus 100 executes the launcher program 502 based on a predetermined operation (power-on operation, or the like) performed by the player, and thereby an initial menu is displayed on the hand-held apparatus 100 (step S12).

Next, on the hand-held apparatus 100, the download program 503 is started from the initial menu, and then it is determined whether or not processing (see FIG. 14(B)) for communicating with the stationary apparatus 3 is selected (step S13). In the result of the determination, if the processing for communicating with the stationary apparatus 3 is not selected (NO in step S13), the processing of step S13 is repeated until the processing for communicating with the stationary apparatus 3 is selected. If any other item (not shown) is selected, a program, setting screen, or the like corresponding to the selected item is started. If the processing for communicating with the stationary apparatus 3 is selected (YES in step S13), processing for detecting the stationary apparatus 3 is executed (step S14). This processing for detecting the stationary apparatus 3 is executed by, for example, detecting a beacon transmitted at regular intervals from the stationary apparatus 3. If the stationary apparatus 3 is not detected (NO in step S14), the processing in step S14 for detecting the stationary apparatus 3 is repeated. If the stationary apparatus 3 is detected (YES in step S14), the hand-held apparatus 100 executes processing for establishing connection with the stationary apparatus 3. Thereafter, the hand-held apparatus 100 executes processing for receiving the coordination application 407 from the stationary apparatus 3 (step S16, see FIG. 15(B) and FIG. 16(B)).

After processing for transmission and reception of the coordination application 407 is finished on the stationary apparatus 3 and the hand-held apparatus 100, the hand-held apparatus 100 executes hand-held-apparatus-side coordination processing (step S18) and the stationary apparatus 3 executes stationary-apparatus-side coordination processing (step S19), whereby a coordination game is executed.

Figure 28:
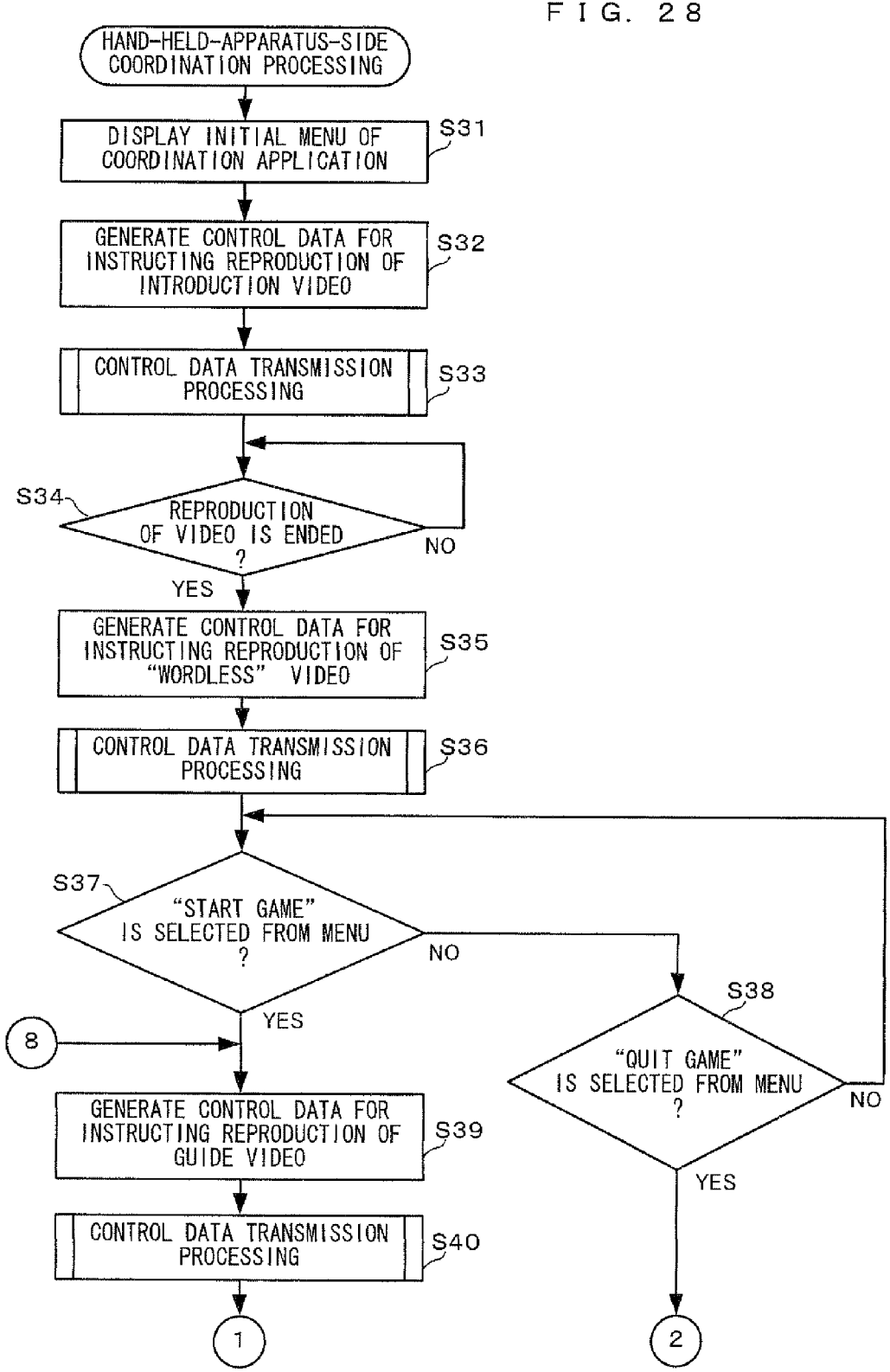
FIG. 28 is a flowchart showing, in detail, hand-held-apparatus-side coordination processing of step S18 in FIG. 27.

Next, coordination game processing executed in steps S18 and S19 is described in detail. FIG. 28, and FIGS. 32 to 35 are flowcharts showing, in detail, the hand-held-apparatus-side coordination processing of step S18. As shown in FIG. 28, an initial menu of the coordination game is generated and displayed on the lower LCD 102 (step S31).

Next, the hand-held-apparatus-side control data 508 used for causing the stationary apparatus 3 to reproduce an introduction video which is used just after the game is started, is generated (step S32). If the above-described video data in FIG. 21 is used as an example for description of step S32, the introduction video includes the frames 0001 to 0100. In this case, the CPU 121 generates the hand-held-apparatus-side control data 508 in which the instruction type data 5081 indicates "reproduction", the start frame data 5082 indicates "0001", the end frame data 5083 indicates "0100", and the reproduction mode flag 5084 indicates "one play" (i.e., a reproduction is performed only one time).

Next, control data transmission processing for transmitting the hand-held-apparatus-side control data 508 generated in step S32 to the stationary apparatus 3 is executed (step S33). This processing transmits the above-described hand-held-apparatus-side control data 508, and, in addition, confirms whether or not the reproduction instruction indicated by the hand-held-apparatus-side control data 508 is properly accepted by the stationary apparatus 3 and whether or not a reproduction of a designated video is started on the stationary apparatus 3. Here, an outline of this processing is described. A state (information about a start frame, an end frame, whether or not a reproduction is being performed, and the like) of a reproduction indicated by the stationary-apparatus-side control data 410 which is transmitted frame by frame from the stationary apparatus 3 to the hand-held apparatus 100, is checked against the reproduction instruction indicated by the transmitted hand-held-apparatus-side control data 508 described above. If the state of the reproduction matches the reproduction instruction, it is determined that the reproduction is properly started. On the other hand, if the state of the reproduction does not match the reproduction instruction, it is considered that the reproduction is not properly started, and processing for transmitting the above-described hand-held-apparatus-side control data 508 is executed again. The above-described processing for confirming whether or not the stationary apparatus 3 properly starts a reproduction is used for avoiding that a video is not reproduced on the stationary apparatus 3 in coordination with processing executed by the hand-held apparatus 100 when the stationary apparatus 3 cannot accept the reproduction instruction transmitted from the hand-held apparatus 100 for some reason.

Figure 29:
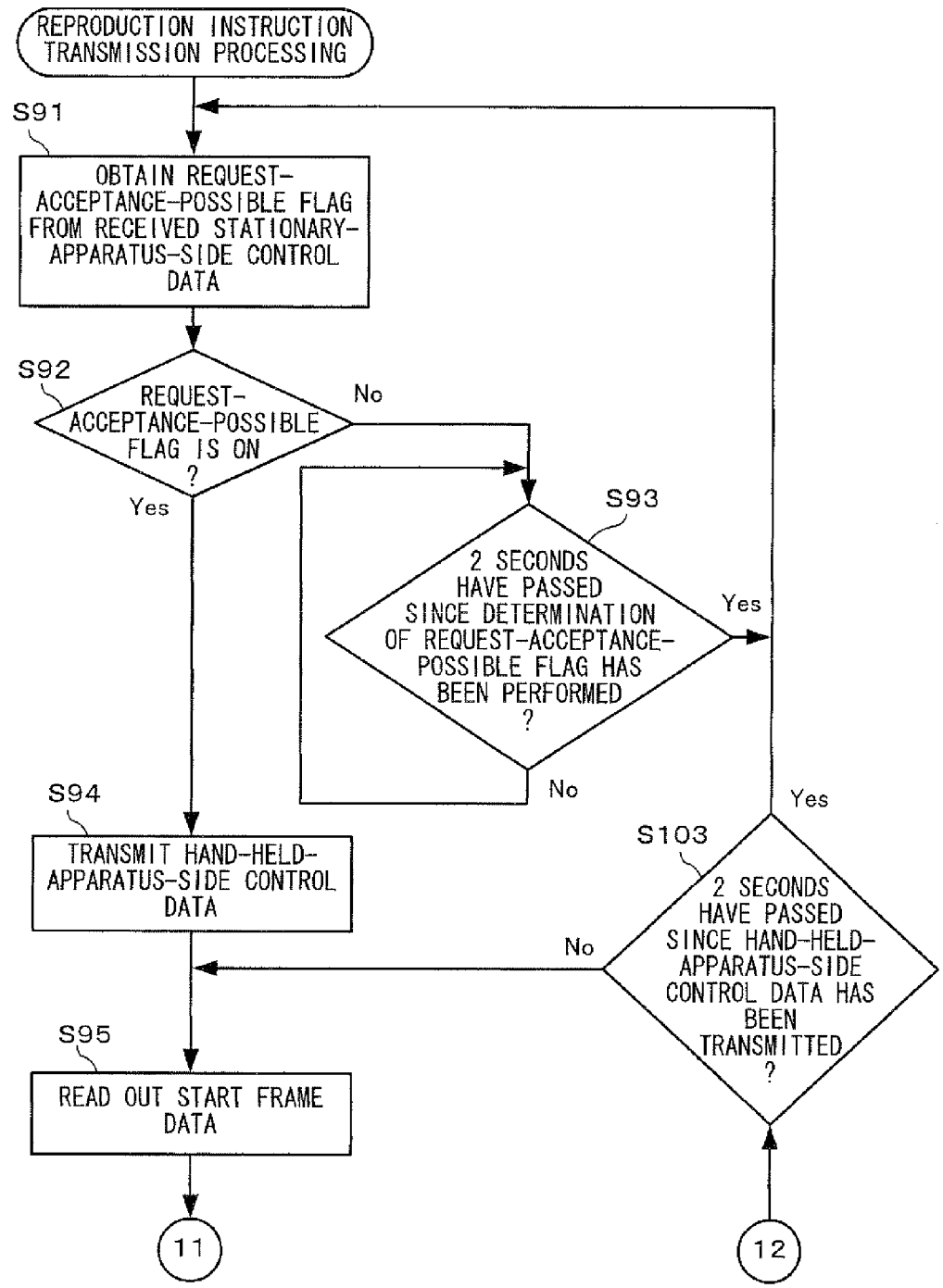
FIG. 29 is a flowchart showing, in detail, the control data transmission processing of step S33.
Figure 30:
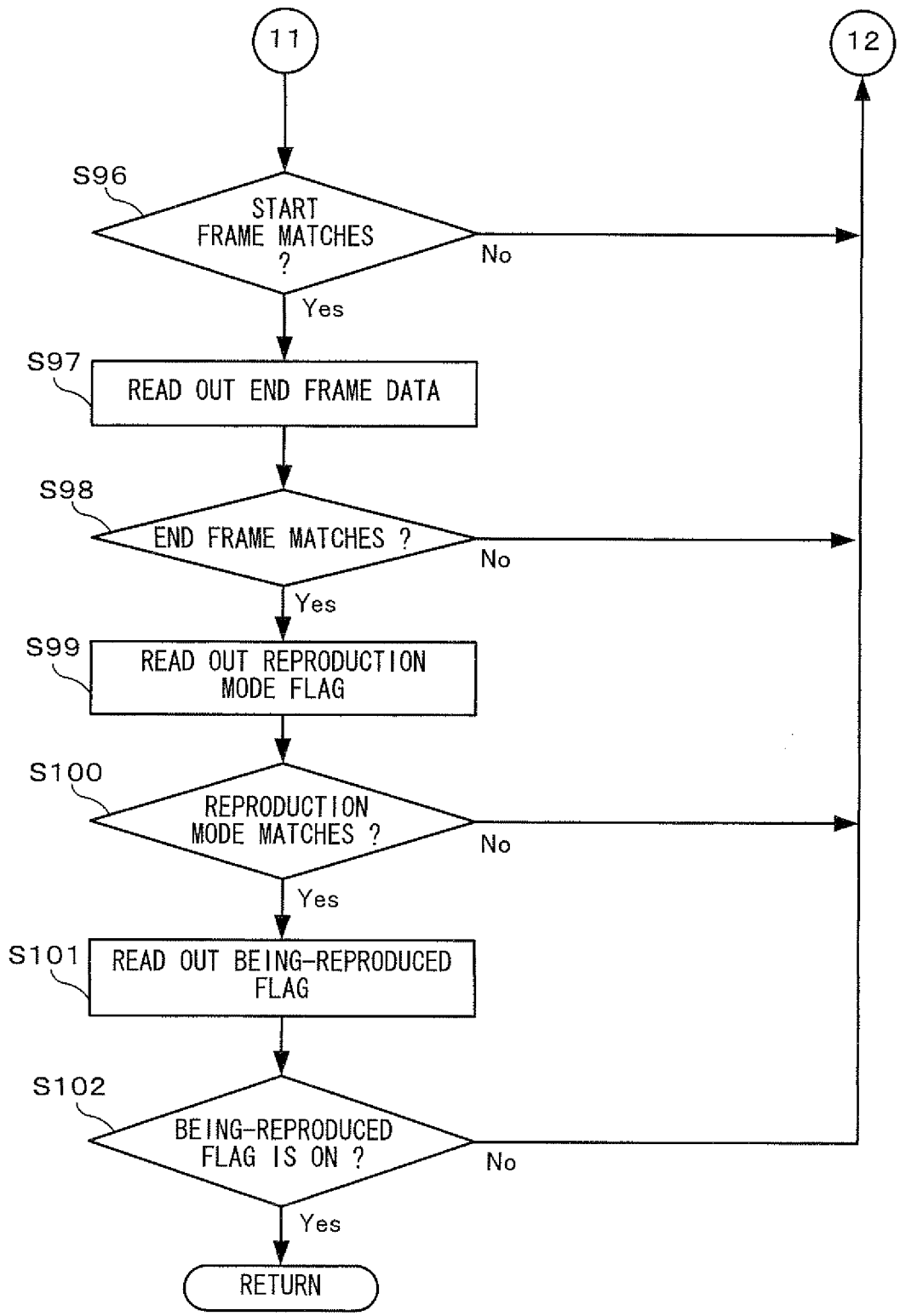
FIG. 30 is a flowchart showing, in detail, the control data transmission processing of step S33.

FIGS. 29 and 30 are flowcharts showing, in detail, the control data transmission processing of step S33. As shown in FIG. 29, first, the received stationary-apparatus-side control data 509 which is transmitted frame by frame from the stationary apparatus 3 is referenced, thereby obtaining the request-acceptance-possible flag 4107$j$ (step S91).

Next, it is determined whether or not the request-acceptance-possible flag 4107$j$ is on (step S92). In the result of the determination, if it is determined that the request-acceptance-possible flag 4107$j$ is not on (NO in step S92), the stationary apparatus 3 is considered to be unable to accept the reproduction instruction. In this case, it is determined whether or not 2 seconds have passed since the determination in step S92 has been performed (step S93). In the result, if it is determined that 2 seconds have not passed (NO in step S93), the determination in step S93 is repeated until 2 seconds pass. If it is determined that 2 seconds have passed (YES in step S93), the determination in step S93 is performed again.

On the other hand, in the result of the determination in step S92, if it is determined that the request-acceptance-possible flag 4107$j$ is on (YES in step S92), then processing for transmitting the hand-held-apparatus-side control data 508 to the stationary apparatus 3 is executed (step S94). Next, start frame data 4101$j$ is obtained from the received stationary-apparatus-side control data 509 (step S95). Thereafter, it is determined whether or not the start frame data 4101$j$ matches the start frame data 5082 included in the transmitted hand-held-apparatus-side control data 508 (step S96 in FIG. 30). In the result of the determination, if it is determined that the start frame data 4101$j$ does not match the start frame data 5082 (NO in step S96), it is considered that processing according to the instruction transmitted by the hand-held apparatus 100 is not properly executed on the stationary apparatus 3. In this case, since there is a possibility that the hand-held-apparatus-side control data 508 needs to be transmitted again, it is determined whether or not 2 seconds have passed since the hand-held-apparatus-side control data 508 has been transmitted (step S103). In the result of the determination, if it is determined that 2 seconds have not passed (NO in step S103), processing returns to step S95 to obtain the start frame data 4101$j$ again. As described above, the stationary-apparatus-side control data 410 is transmitted from the stationary apparatus 3 at short time intervals, i.e., frame by frame (1/60 second). Therefore, even if, for example, it is determined that the start frame data 4101$j$ does not match the start frame data 5082 at the first time of determination, the received stationary-apparatus-side control data 509 is updated at the determination performed several frames later, and if it is determined that the start frame data 4101$j$ matches the start frame data 5082 at the determination performed several frames later, there is no problem in light of reproducing a video in a coordinated manner. On the other hand, in the result of the determination in step S103, if it is determined that 2 seconds have passed (YES in step S103), processing returns to step S91 and is executed from step S91 again. That is, if the reproduction instruction does not match the state of the reproduction even after 2 seconds passes from when the hand-held-apparatus-side control data 508 is transmitted, another transmission of the hand-held-apparatus-side control data 508 is attempted.

On the other hand, in the result of the determination in step S96, if it is determined that the start frame data 4101$j$ matches the start frame data 5082 (YES in step S96), end frame data 4102$j$ is obtained from the received stationary-apparatus-side control data 509 (step S97). Thereafter, it is determined whether or not the end frame data 4102$j$ matches end frame data 5083 of the transmitted hand-held-apparatus-side control data 508 (step S98). In the result of the determination, if it is determined that the end frame data 4102*j* does not match the end frame data 5083 (NO in step S98), the processing of step S103 is executed.

On the other hand, in the result of step S98, if it is determined that the end frame data 4102*j* matches the end frame data 5083 (YES in step S98), a reproduction mode flag 4105*j* is obtained from the received stationary-apparatus-side control data 509 (step S99). Thereafter, it is determined whether or not the reproduction mode flag 4105*j* matches a reproduction mode flag 5084 of the transmitted hand-held-apparatus-side control data 508 (step S100). In the result of the determination, if it is determined that the reproduction mode flag 4105*j* does not match the reproduction mode flag 5084 (NO in step S100), the processing of step S103 is executed.

On the other hand, in the result of the determination in step S100, if it is determined that the reproduction mode flag 4105*j* matches the reproduction mode flag 5084 (YES in step S100), a being-reproduced flag 4106*j* is obtained from the received stationary-apparatus-side control data 509 (step S101). Thereafter, it is determined whether or not the being-reproduced flag 4106*j* is on (step S102). In the result of the determination, if it is determined that the being-reproduced flag 4106*j* is not on (NO in step S102), it is considered that a reproduction of a video is not started on the stationary apparatus 3. In this case, the processing of step S103 is executed. On the other hand, if it is determined that the being-reproduced flag 4106*j* is on (step YES S102), it is considered that a reproduction of a video is properly started on the stationary apparatus 3, and therefore the control data transmission processing is ended.

Figure 31:
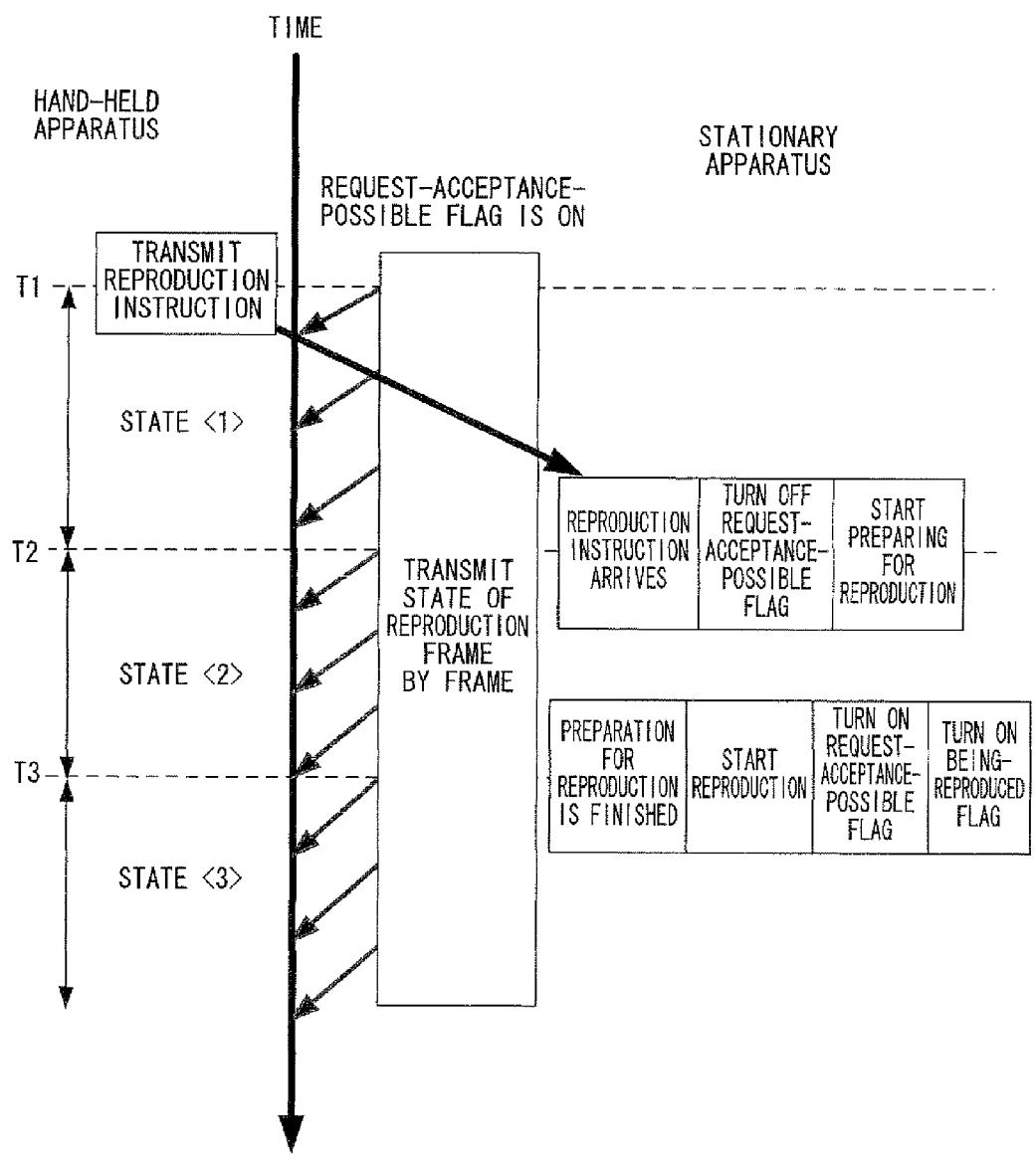
FIG. 31 is a diagram showing a flow of the control data transmission processing.

A flow of such control data transmission processing, from the reproduction instruction sent by the hand-held apparatus 100, to the start of a reproduction of a video on the stationary apparatus 3, is as shown in FIG. 31. As shown in FIG. 31, a time axis is in the vertical direction, processing executed on the hand-held apparatus 100 is shown at the left side of the drawing, and processing executed on the stationary apparatus 3 is shown at the right side of the drawing. The stationary apparatus 3 transmits, frame-by-frame, data (the stationary-apparatus-side control data 410) indicating a state of the reproduction to the hand-held apparatus 100. As shown in FIG. 31, the hand-held apparatus 100 transmits the reproduction instruction (the hand-held-apparatus-side control data 508) at time T1 (the request-acceptance-possible flag 4107 of the stationary apparatus 3 is on at the time T1). The reproduction instruction arrives at the stationary apparatus 3 at time T2. However, in a state <1> which is from the time T1 to the time T2, since the reproduction instruction is yet to arrive at the stationary apparatus 3, the reproduction instruction transmitted from the hand-held apparatus 100 does not match the state of the reproduction transmitted from the stationary apparatus 3. Therefore, in the state <1>, until 2 seconds pass, the hand-held apparatus 100 repeatedly executes the processing of steps S95 to S102 in FIG. 29 to determine whether or not the reproduction instruction transmitted from the hand-held apparatus 110 matches the state of the reproduction transmitted from the stationary apparatus 3. If the reproduction instruction never matches the state of the reproduction for 2 seconds, processing returns to step S91 to determine the request-acceptance-possible flag 4107*j*.

Next, at the time T2, the reproduction instruction arrives at the stationary apparatus 3 and the stationary apparatus 3 starts preparation for reproducing the video based on the reproduction instruction. At time T3, the preparation for the reproduction is finished and the reproduction of the video is actually started. In a state <2> which is from the time T2 to the time T3, since the stationary apparatus 3 is preparing for the reproduction of the video, the request-acceptance-possible flag 4107 included in the stationary-apparatus-side control data 410 transmitted from the stationary apparatus 3 to the hand-held apparatus 100 is off (processing executed on the stationary apparatus 3 is described later). Therefore, the hand-held apparatus 100 cannot transmit the reproduction instruction to the stationary apparatus 3, and processing returns to step S91 to determine the request-acceptance-possible flag 4107*j*.

After the reproduction of the video is started on the stationary apparatus 3, that is, in a state <3> which is after the time T3, since the reproduction instruction transmitted from the hand-held apparatus 100 matches the state of the reproduction transmitted from the stationary apparatus 3, the hand-held apparatus 100 determines that the reproduction of the video is properly started.

As shown in FIG. 28, after the processing of step S33 is finished (i.e., after the reproduction of the introduction video is properly started), it is determined whether or not the reproduction of the video on the stationary apparatus 3 is ended (step S34). Specifically, the received stationary-apparatus-side control data 509 is referenced to determine whether or not the being-reproduced flag 4106*j* is off, thereby determining whether or not the reproduction of the video on the stationary apparatus 3 is ended. In the result of the determination, if it is determined that the reproduction of the video is not ended (NO in step S34), the processing of step S34 is repeated until the reproduction is ended. On the other hand, if it is determined that the reproduction of the video is ended (YES in step S34), the hand-held-apparatus-side control data 508 for instructing a reproduction of a video of "wordless" is generated (step S35). This processing is performed in order to keep reproducing the video of "wordless" until a start of the game is instructed from when the reproduction of the introduction video is ended. This processing will more specifically be described below, with use of the configuration of video data in FIG. 21 as an example. In this case, the video of "wordless" includes the frames 0101 to 0200. Therefore, the CPU 121 generates the hand-held-apparatus-side control data 508 in which the instruction type data 5081 indicates "reproduction", the start frame data 5082 indicates "0101", the end frame data 5083 indicates "0200", and the reproduction mode flag 5084 indicates "loop" (i.e., the video of "wordless" is repeatedly reproduced until the game is started).

Next, processing for transmitting the hand-held-apparatus-side control data 508 generated in step S35 to the stationary apparatus 3 is executed (step S36). This processing is the same as that of step S33, therefore detailed description thereof is omitted.

Next, operation data 507 is obtained, and then it is determined, based on the obtained operation data 507, whether or not "start game" is selected from the initial menu displayed in step S31 (step S37). In the result of the determination, if it is determined that "start game" is not selected (NO in step S37), it is determined, based on the obtained operation data 507, whether or not "quit game" is selected from the initial menu displayed in step S31 (step S38). In the result, if it is determined that "quit game" is not selected, processing returns to step S37 and is executed from step S37 again. On the other hand, if it is determined that "quit game" is selected, processing proceeds to step S73 described below.

On the other hand, in the result of the determination in step S37, if it is determined that "start game" is selected, the hand-held-apparatus-side control data 508 for instructing a reproduction of a guide video for explaining operations of the game, and the like, is generated (step S39). This processing will specifically be described below, with use of the configuration of video data in FIG. 21 as an example. In this case, the guide video includes the frames 0201 to 0300. Therefore, the CPU 121 generates the hand-held-apparatus-side control data 508 in which the instruction type data 5081 indicates "reproduction", the start frame data 5082 indicates "0201", the end frame data 5083 indicates "0300", and the reproduction mode flag 5084 indicates "one play".

Next, processing for transmitting the hand-held-apparatus-side control data 508 generated in step S39 to the stationary apparatus 3 is executed (step S40). This processing is the same as that of step S33, therefore detailed description thereof is omitted.

Figure 32:
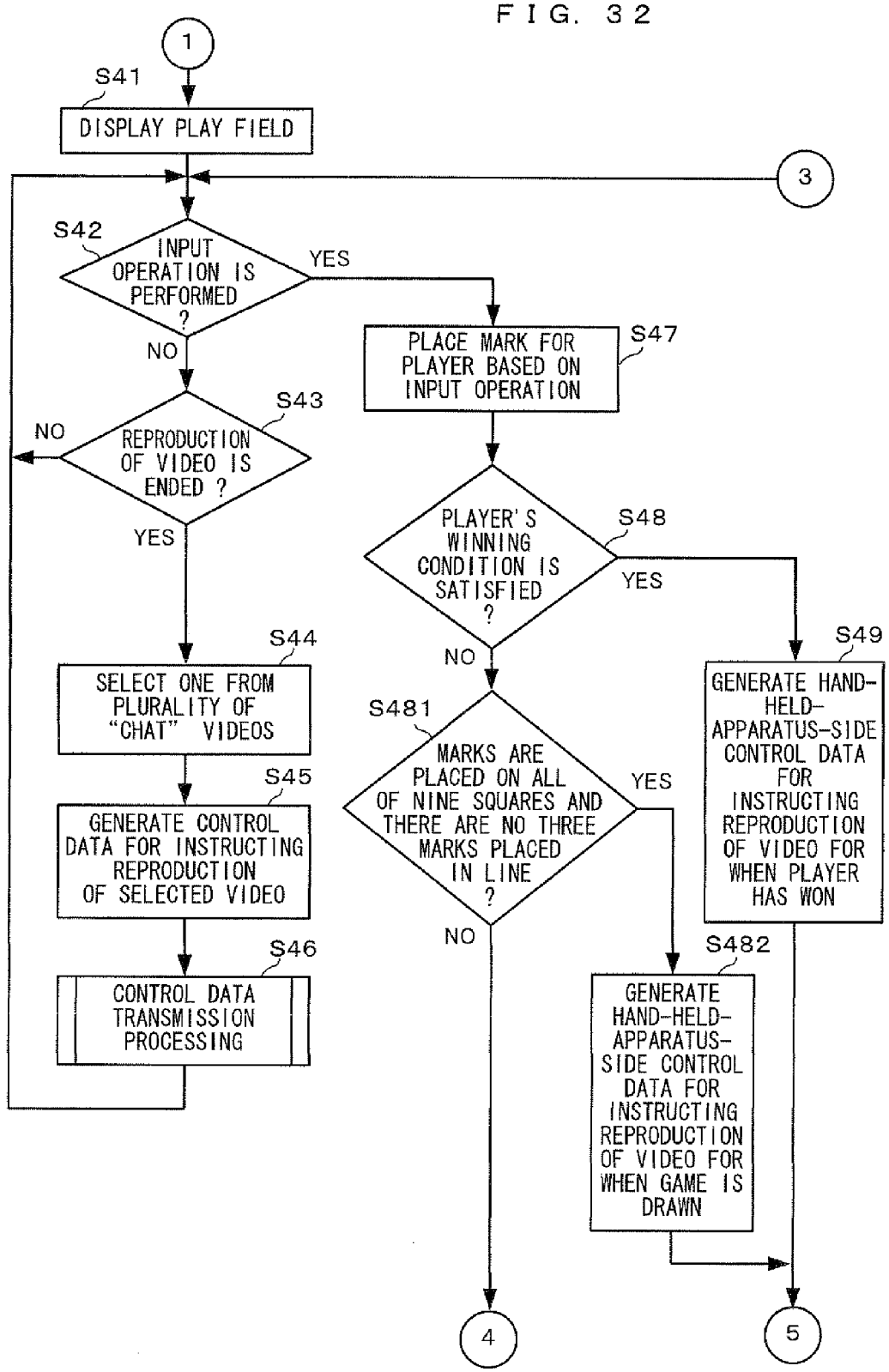
FIG. 32 is a flowchart showing, in detail, the hand-held-apparatus-side coordination processing of step S18 in FIG. 27.

Next, a play field (see FIG. 20(B)) used for a versus screen of the "tic-tac-toe" game is generated and displayed on the lower LCD 102 (step S41 in FIG. 32).

Next, the operation data 507 is obtained and thereby it is determined whether or not an input operation (operation of placing a mark) is performed by the player (step S42). In the result of the determination, if it is determined that an input operation is not performed (NO in step S42), it is determined whether or not the reproduction of a video is ended (step S43). In the present embodiment, the video mentioned in step S43 is either one of the guide video the reproduction of which is started in step S39, or a "chat" video described below. The determination of step S43 is performed based on whether or not the being-reproduced flag 4106j of the received stationary-apparatus-side control data 509 is off. In the result of the determination, if it is determined that the reproduction of the video is not ended (the being-reproduced flag 4106j is on) (NO in step S43), processing returns to step S42 and is executed from step S42 again.

On the other hand, if it is determined that the reproduction of the video is ended (YES in step S43), processing for reproducing the "chat" video on the stationary apparatus 3 is executed. In the present embodiment, three kinds of videos are provided in advance as the "chat" videos. If the configuration of video data shown in FIG. 21 is used as an example, three videos of No. 4 to No. 6 in FIG. 21 are provided in advance as the "chat" videos. Then, one of the three "chat" videos is selected in a random manner (step S44). More specifically, any one of <0301, 0400>, <0401, 0500>, <0501, 0600> is selected as a combination of a start frame number and an end frame number, in a random manner.

Next, the hand-held-apparatus-side control data 508 is generated based on the selected video (combination of a start frame number and an end frame number) (step S45). For example, if <0401, 0500> is selected among the above-described combinations, the CPU 121 generates the hand-held-apparatus-side control data 508 in which the instruction type data 5081 indicates "reproduction", the start frame data 5082 indicates "0401", the end frame data 5083 indicates "0500", and the reproduction mode flag 5084 indicates "one play". Processing for transmitting the hand-held-apparatus-side control data 508 generated in step S45 to the stationary apparatus 3 is executed (step S46). This processing is the same as that of step S33, and therefore detailed description thereof is omitted. Thereafter, processing returns to step S42, and is repeated from step S42. As a result, as long as an input operation is not performed by the player, every time that the reproduction of one of the "chat" videos is ended, a next "chat" video to be reproduced is selected among the three videos described above in a random manner, and then reproduced. Executing such processing prevents unnaturalness of the same video being repeatedly reproduced.

Instead of reproducing the three "chat" videos in a random manner, for example, the video of "wordless" may be reproduced in the "loop mode" (the a reproduction mode flag 5084 is set to indicate "loop") after the reproduction of the guide video is ended. This is because reproducing the video of "wordless" causes less unnaturalness than in a case of a video in which something is spoken.

The following will describe processing (YES in step S42) executed when, in the result of the determination of step S42, it is determined that an input operation is performed by the player. In this case, first, processing for placing a mark for the player is executed based on the operation data 507 (step S47). At this time, the game screen is updated to display a screen in which the mark for the player has been placed.

Next, it is determined whether or not the player's winning condition is satisfied, that is, in the present embodiment, whether or not three marks for the player are placed in a line vertically, horizontally, or orthogonally (step S48). In the result of the determination, if it is determined that the player's winning condition is satisfied (YES in step S48), the hand-held-apparatus-side control data 508 for instructing a reproduction of a video for "when the player has won" is generated (step S49). If the configuration of video data shown in FIG. 21 is used as an example, the video for "when the player has won" includes frames 1601 to 1700. Therefore, the CPU 121 generates the hand-held-apparatus-side control data 508 in which the instruction type data 5081 indicates "reproduction", the start frame data 5082 indicates "1601", the end frame data 5083 indicates "1700", and the reproduction mode flag 5084 indicates "one play". Thereafter, processing proceeds to step S64 (control data transmission processing) in FIG. 34 described later.

On the other hand, in the result of the determination of step S48, if it is determined that the player's winning condition is not satisfied (NO in step S48), it is determined whether or not a draw condition is satisfied, that is, in the present embodiment, whether or not marks are placed on all of the nine squares and there are no three marks placed in a line (step S481). In the result of the determination, if it is determined that the draw condition is satisfied (YES in step S481), the hand-held-apparatus-side control data 508 for instructing a reproduction of a video for "when the game is drawn" (step S482). If the configuration of video data shown in FIG. 21 is used as an example, the video for "when the game is drawn" includes frames 1801 to 1900. Therefore, the CPU 121 generates the hand-held-apparatus-side control data 508 in which the instruction type data 5081 indicates "reproduction", the start frame data 5082 indicates "1801", the end frame data 5083 indicates "1900", and the reproduction mode flag 5084 indicates "one play". The processing of step S482 is ended, processing proceeds to S64 described above.

Figure 33:
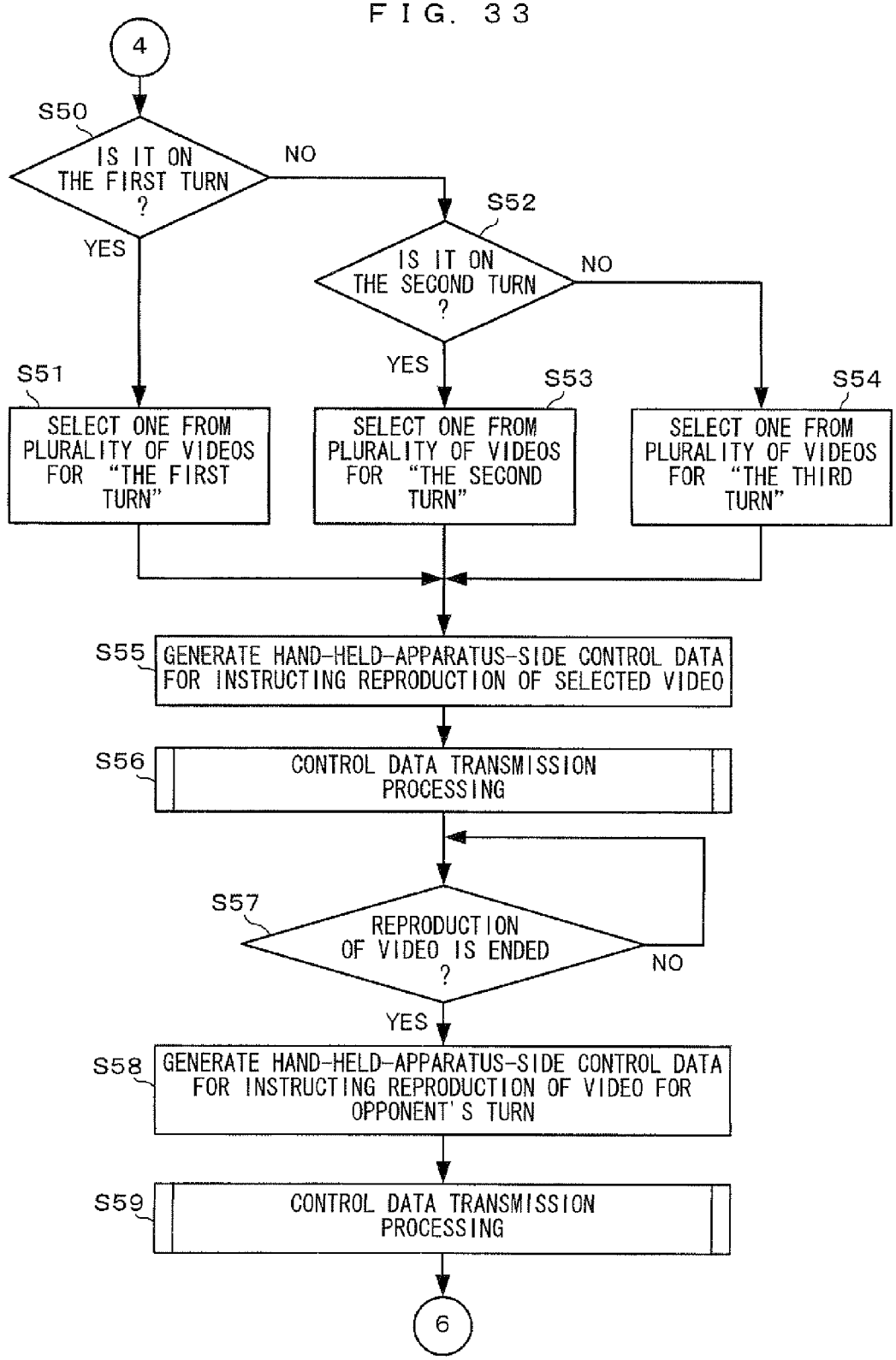
FIG. 33 is a flowchart showing, in detail, the hand-held-apparatus-side coordination processing of step S18 in FIG. 27.

On the other hand, in the result of the determination of step S481, if it is determined that the draw condition is not satisfied (NO in step S481), since the game is being played, it is determined whether or not the operation (the placement of the mark) performed by the player is "the first turn" operation (step S50 in FIG. 33). In the result of the determination, if it is determined that the operation is "the first turn" operation (YES in step S50), processing for reproducing on the stationary apparatus 3 a video to be reproduced on the first turn is executed. In the present embodiment, as in the "chat" videos described above, three kinds of videos (videos of No. 7 to No. 9 in FIG. 21) are provided in advance as the video for "the first turn". Accordingly, as in the "chat" videos, one of the three videos for "the first turn" is selected in a random manner (step S51). Thereafter, the hand-held-apparatus-side control data 508 for instructing a reproduction of the selected video is generated (step S55). In this processing, the reproduction mode flag 5084 is set to indicate "one play". Thereafter, processing for transmitting the hand-held-apparatus-side control data 508 generated in step S55 to the stationary apparatus 3 is executed (step S56), and then processing proceeds to step S57. The processing of step S56 is the same as that of step S33, and therefore detailed description thereof is omitted.

On the other hand, in the result of the determination of step S50, if it is determined that the operation is not "the first turn" operation (NO in step S50), it is determined whether or not the operation performed by the player is "the second turn" operation (step S52). In the result of the determination, if it is determined that the operation is "the second turn" operation (YES in step S52), processing for reproducing on the stationary apparatus 3 a video to be reproduced on the second turn is executed. As in the videos for "the first turn" described above, three kinds of videos (videos of No. 10 to No. 12 in FIG. 21) are also provided in advance as the video for "the second turn". Accordingly, one of the three videos for "the second turn" is selected in a random manner (step S53), and then processing proceeds to steps S55 and S56.

On the other hand, in the result of the determination of step S52, if it is determined that the operation is not "the second turn" operation (NO in step S52), processing for reproducing on the stationary apparatus 3 a video to be reproduced on or after the third turn, is executed (in the present embodiment, the video for "the third turn" is reproduced on the third turn and every turn after the third turn). As in the videos for "the first turn" described above, three kinds of videos (videos of No. 13 to No. 15 in FIG. 21) are also provided in advance as the video for "the second turn". Accordingly, one of the three videos for "the third turn" is selected in a random manner (step S54), and then processing proceeds to steps S55 and S56.

After the reproduction of the video on the stationary apparatus 3 is started in accordance with the processing of step S56, the being-reproduced flag 4106j of the received stationary-apparatus-side control data 509 is referenced and thereby it is determined whether or not the reproduction of the video is ended (step S57). In the result, if it is determined that the reproduction is not ended (NO in step S57), the processing of step S57 is repeated until the reproduction is ended. If it is determined that the reproduction is ended (YES in step S57), the hand-held-apparatus-side control data 508 for instructing a reproduction of a video to be reproduced on the CPU's turn, that is, when the CPU places a mark, is generated (step S58). In the present embodiment, one kind of video is provided as the video to be reproduced when the CPU places a mark (a video of No. 16 in FIG. 21). Accordingly, the CPU 121 generates the hand-held-apparatus-side control data 508 in which the instruction type data 5081 indicates "reproduction", the start frame data 5082 indicates "0201", the end frame data 5083 indicates "0300", and the reproduction mode flag 5084 indicates "one play".

Next, processing for transmitting the hand-held-apparatus-side control data 508 generated in step S58 to the stationary apparatus 3 is executed (step S59). This processing is the same as that of step S33, and therefore detailed description thereof is omitted.

Figure 34:
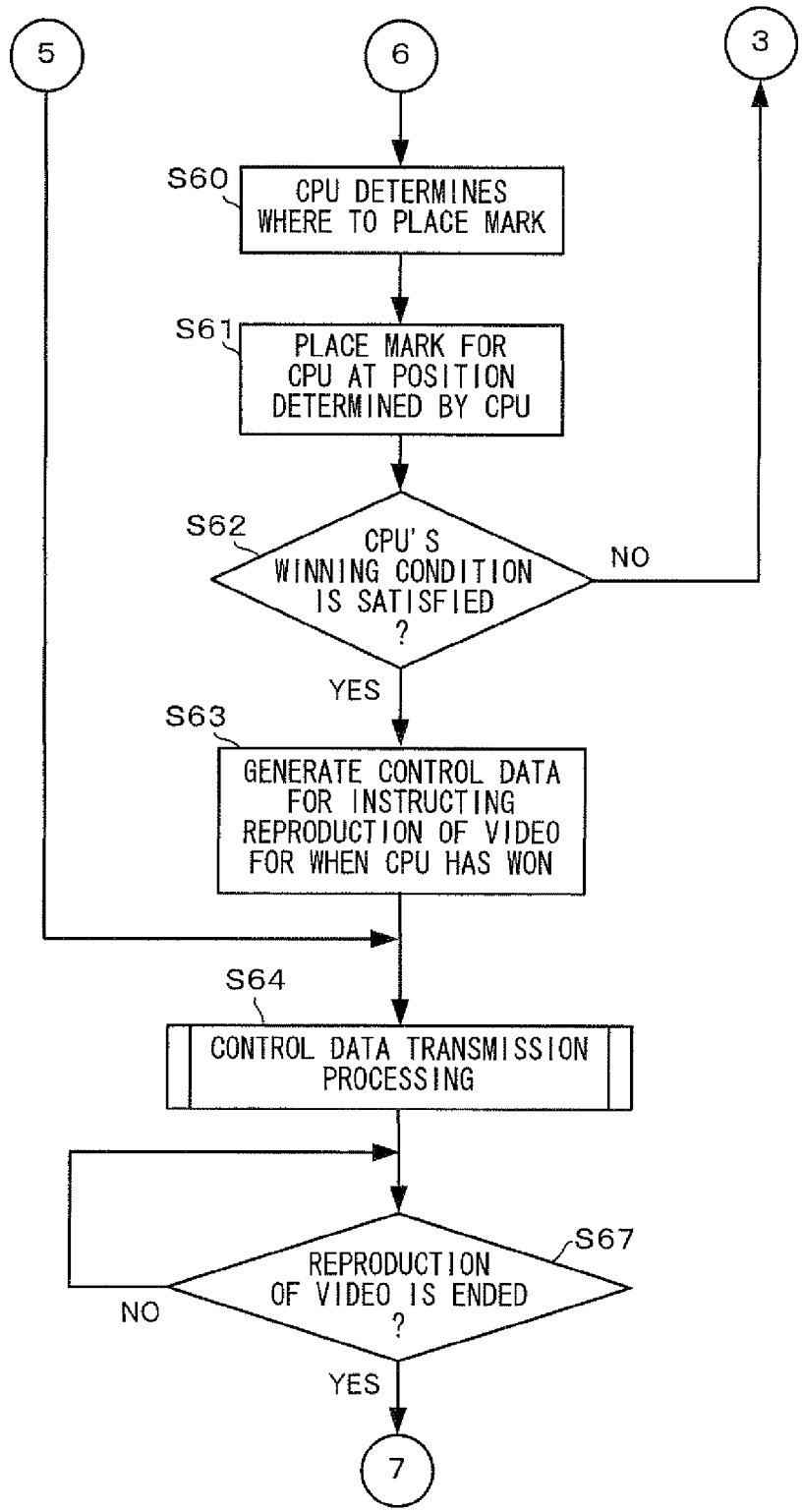
FIG. 34 is a flowchart showing, in detail, the hand-held-apparatus-side coordination processing of S18 in FIG. 27.
Figure 35:
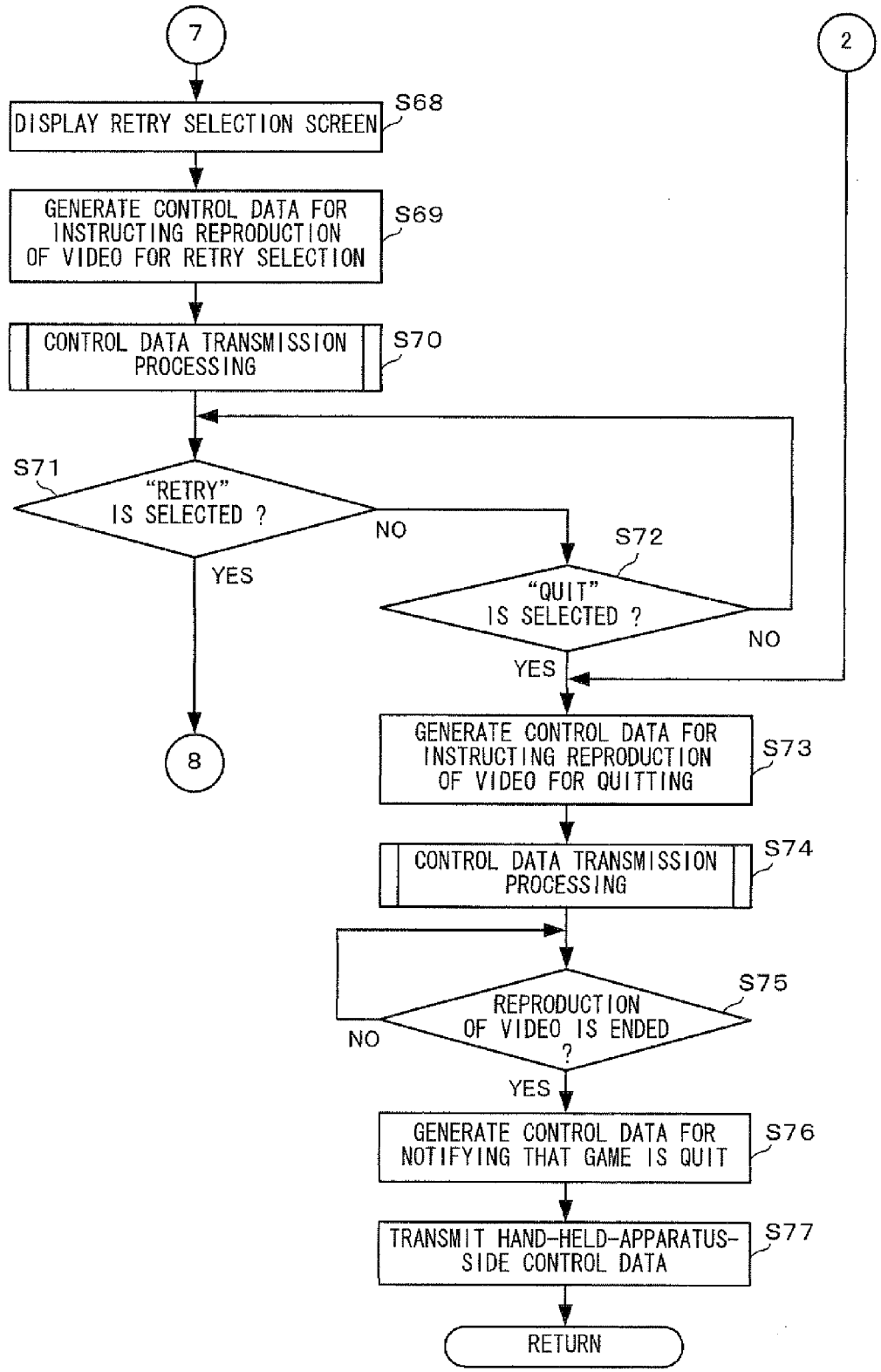
FIG. 35 is a flowchart showing, in detail, the hand-held-apparatus-side coordination processing of step S18 in FIG. 27.

After a reproduction of the video to be reproduced when the CPU places a mark is started in accordance with the processing of step S59, the CPU 121 determines where to place a mark (step S60 in FIG. 34). Thereafter, processing for placing a mark for the CPU at the position determined in step S60 is executed (step S61). At this time, the game screen is updated to display a screen in which the mark for the player has been placed.

Next, it is determined whether or not the CPU's winning condition is satisfied, that is, in the present embodiment, whether or not three marks for the CPU are placed in a line vertically, horizontally, or orthogonally (step S62). In the result of the determination, if it is determined that the CPU's winning condition is satisfied (YES in step S62), the hand-held-apparatus-side control data 508 for instructing a reproduction of a video for "when the CPU has won" is generated (step S63). If the configuration of video data shown in FIG. 21 is used as an example, the video for "when the CPU has won" includes frames 1701 to 1800. Therefore, the CPU 121 generates the hand-held-apparatus-side control data 508 in which the instruction type data 5081 indicates "reproduction", the start frame data 5082 indicates "1701", the end frame data 5083 indicates "1800", and the reproduction mode flag 5084 indicates "one play". Thereafter, processing proceeds to step S64 (control data transmission processing) described later.

On the other hand, in the result of the determination of step S62, if it is determined that the CPU's winning condition is not satisfied (NO in step S62), since the game is being played, processing is executed from step S42 again.

In step S64, processing for transmitting the hand-held-apparatus-side control data 508 generated in step S482, step S49, or step S63 to the stationary apparatus 3 is executed. This processing is the same as that of step S33, and therefore detailed description thereof is omitted.

After the reproduction of the video on the stationary apparatus 3 is started in accordance with the processing of step 864, the being-reproduced flag 4106j of the received stationary-apparatus-side control data 509 is referenced and thereby it is determined whether or not the reproduction of the video is ended (step S67). In the result, if it is determined that the reproduction is not ended (NO in step S67), the processing of step S67 is repeated until the reproduction is ended. If it is determined that the reproduction is ended (YES in step S67), since the game is over at the present time, a retry screen for inquiring whether or not the player plays the game again is generated and displayed on the lower LCD 102 (step S68 in FIG. 35). On the retry screen, two options of "retry" and "quit" are displayed, although not shown.

Thereafter, the hand-held-apparatus-side control data 508 for instructing a reproduction of a video (a "wordless" video of No. 20 in FIG. 21) to be reproduced when the retry screen is displayed, is generated (step S69). If the configuration of video data shown in FIG. 21 is used as an example, the video for the retry screen includes frames 1901 to 2000. Therefore, the CPU 121 generates the hand-held-apparatus-side control data 508 in which the instruction type data 5081 indicates "reproduction", the start frame data 5082 indicates "1901", the end frame data 5083 indicates "2000", and the reproduction mode flag 5084 indicates "loop". Since the reproduction mode flag indicates "loop", the video for the retry screen is repeatedly reproduced on the stationary apparatus 3 until the next time that the hand-held-apparatus-side control data 508 is transmitted from the hand-held apparatus 100.

Next, processing for transmitting the hand-held-apparatus-side control data 508 generated in step S69 to the stationary apparatus 3 is executed (step S70). This processing is the same as that of step S33, therefore detailed description thereof is omitted.

Next, the operation data 507 is referenced and thereby it is determined whether or not "retry" is selected on the retry screen (step S71). In the result of the determination, if it is determined that "retry" is selected (YES in step S71), processing is executed from step S39 again. When "retry" is selected, a predetermined video corresponding to when "retry" is selected may be reproduced, as in the case of, as described above, reproducing various videos in accordance with scenes.

On the other hand, in the result of the determination of step S71, if it is determined that "retry" is not selected (NO in step S71), it is determined whether or not "quit" is selected (step S72). In the result of the determination, if it is determined that "quit" is not selected (NO in step S71), since it is considered that an input operation is not performed on the retry screen, processing is executed from step S71 again.

On the other hand, if it is determined that "quit" is selected (YES in step S72), the hand-held-apparatus-side control data 508 for instructing a reproduction of a video for "when the game is quit" (step S73). If the configuration of video data shown in FIG. 21 is used as an example, the video for "when the game is quit" includes frames 2001 to 2100. Therefore, the CPU 121 generates the hand-held-apparatus-side control data 508 in which the instruction type data 5081 indicates "reproduction", the start frame data 5082 indicates "2001", the end frame data 5083 indicates "2100", and the reproduction mode flag 5084 indicates "one play".

Next, processing for transmitting the hand-held-apparatus-side control data 508 generated in step S73 to the stationary apparatus 3 is executed (step S74). This processing is the same as that of step S33, and therefore detailed description thereof is omitted.

After the reproduction of the video on the stationary apparatus 3 is started in accordance with the processing of step S74, the being-reproduced flag 4106$j$ of the received stationary-apparatus-side control data 509 is referenced and thereby it is determined whether or not the reproduction of the video is ended (step S75). In the result, if it is determined that the reproduction is not ended (NO in step S75), the processing of step S75 is repeated until the reproduction is ended. If it is determined that the reproduction is ended (YES in step S75), processing for quitting the game is executed. First, control data for notifying the stationary apparatus 3 that the game has been quit (step S76). Specifically, the hand-held-apparatus-side control data 508 in which the instruction type data 5081 indicates "quitting of a game", is generated. Next, processing for transmitting the control data to the stationary apparatus 3 is executed (step S77). The hand-held-apparatus-side coordination processing executed by the hand-held apparatus 100 is ended here.

Next, the stationary-apparatus-side coordination processing of step S19 executed on the stationary apparatus 3 is described in detail. Basically, on the stationary apparatus 3, processing for reproducing a predetermined video included in the video data 406 based on the hand-held-apparatus-side control data transmitted from the hand-held apparatus 100 is executed.

Figure 36:
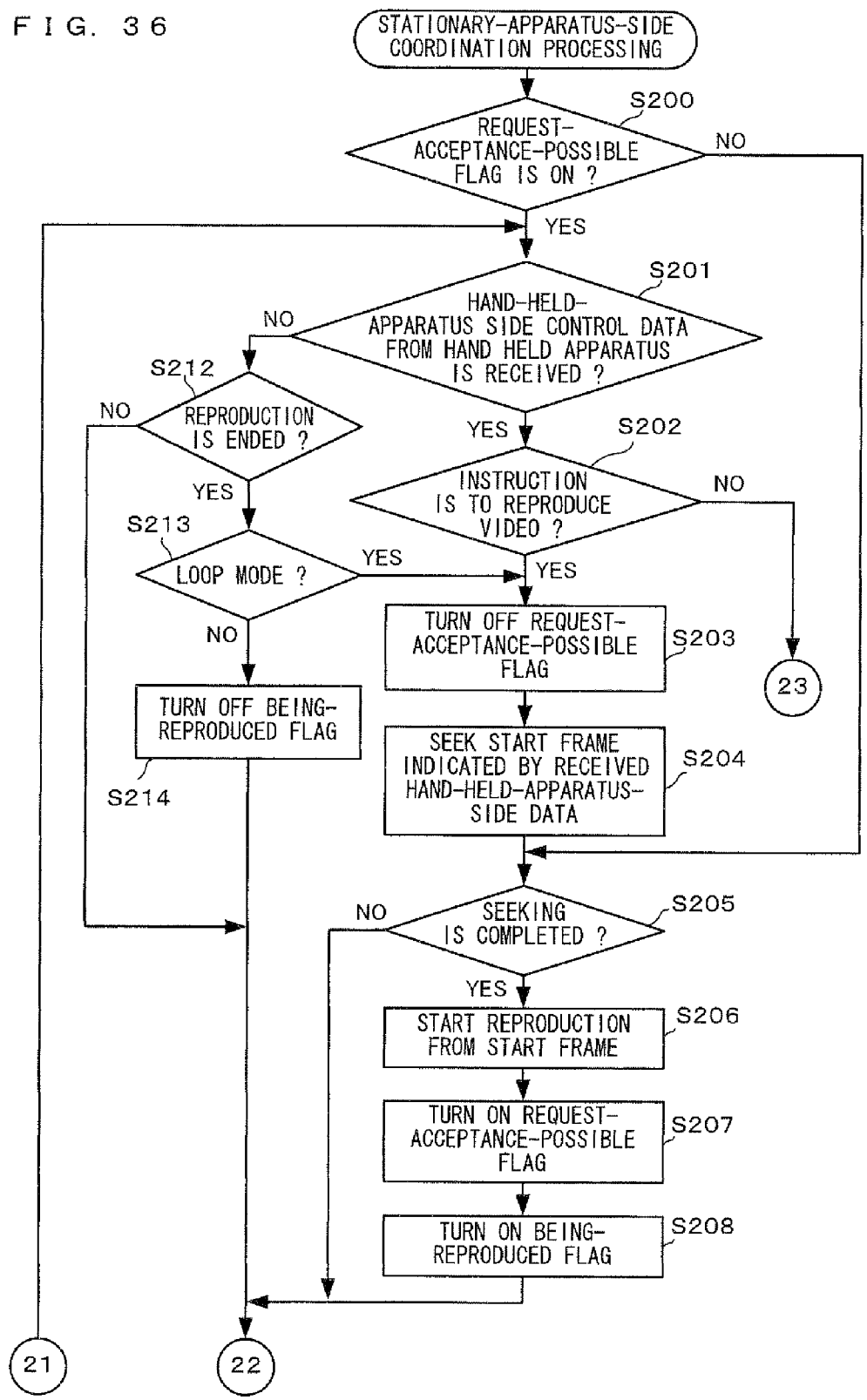
FIG. 36 is a flowchart showing, in detail, a stationary-apparatus-side coordination processing of step S19 in FIG. 27.
Figure 37:
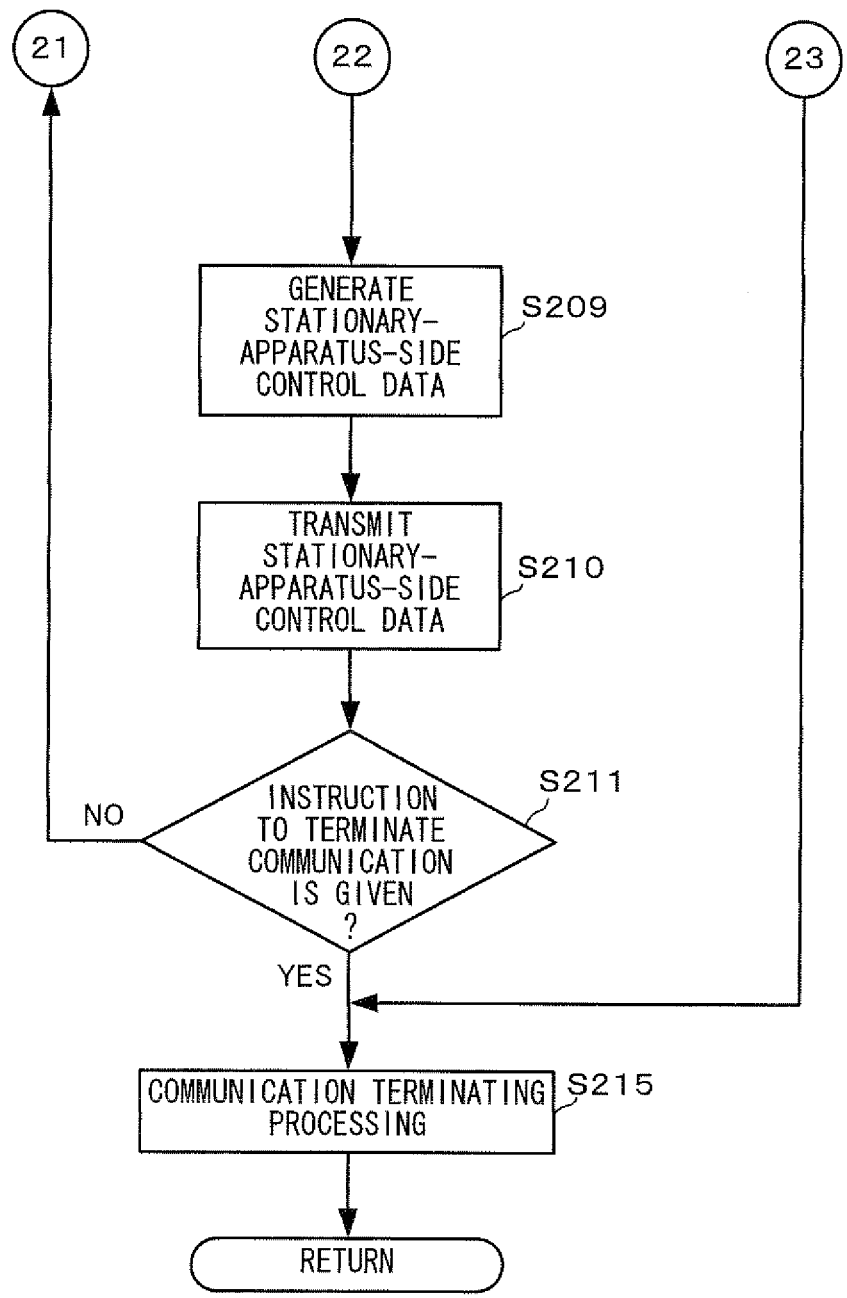
FIG. 37 is a flowchart showing, in detail, the stationary-apparatus-side coordination processing of step S19 in FIG. 27.

FIGS. 36 and 37 are flowcharts showing, in detail, the stationary-apparatus-side coordination processing. As shown in FIG. 36, first, it is determined whether or not the request-acceptance-possible flag 4107 is on (step S200). In the result of the determination, if it is determined that the request-acceptance-possible flag 4107 is off (NO in step S200), processing proceeds to step S205. In step S205, it is determined whether or not seeking processing being performed is completed. The detail of step S205 is described later.

On the other hand, it is determined that the request-acceptance-possible flag 4107 is on (YES in step S200), it is determined whether or not the hand-held-apparatus-side control data 508 transmitted from the hand-held apparatus 100 is received (step S201). The received hand-held-apparatus-side control data 508 is stored, as the received hand-held-apparatus-side control data 411, in the external main memory 12. In the result of the determination, if it is determined that the hand-held-apparatus-side control data 508 is not received (NO in step S201), processing proceeds to step S212.

On the other hand, if it is determined that the hand-held-apparatus-side control data 508 is received (YES in step S201), the received hand-held-apparatus-side control data 411 is referenced and thereby it is determined whether or not an instruction from the hand-held apparatus 100 is an instruction to reproduce a video (step S202). Specifically, it is determined whether or not the instruction type data 5081$j$ indicates "reproduction". In the result of the determination, if it is determined that the instruction from the hand-held apparatus 100 is an instruction to reproduce a video (YES in step S202), the request-acceptance-possible flag 4107 is set to be off (step S203). This indicates that the stationary apparatus 3 starts preparing for a reproduction of a video.

Next, processing for seeking, in the video data, a frame whose number is indicated by the start frame data 5082$j$ in the received hand-held-apparatus-side control data 411, is executed (step S204). In this processing, if there is a video being reproduced at the present time, the stationary apparatus 3 stops the reproduction and then seeks a start frame. In the case where video data is provided by an external storage medium such as a DVD, the video data may be transferred from the external storage medium to the external main memory 12 in this seeking processing. In this case, it takes some time until the seeking processing is completed.

Next, it is determined whether or not the seeking processing is completed (step S205). In the result of the determination, if it is determined that the seeking processing is not completed (NO in step S205), processing proceeds to step S209. In this case, in step S209, the stationary-apparatus-side control data 410 is generated with the request-acceptance-possible flag 4107 being off. The detail of step S209 is described later. On the other hand, if it is determined that the seeking processing is completed (YES in step S205), a reproduction of a video from the sought start frame (step S206).

Next, the request-acceptance-possible flag 4107 is turned on (step S207). This indicates that the stationary apparatus 3 has finished the preparation for the reproduction of the video and actually has started the reproduction. From when the request-acceptance-possible flag is set to be off in step S207 until the request-acceptance-possible flag is set to be on in step S207, the hand-held apparatus 110 does not transmit the hand-held-apparatus-side control data to the stationary apparatus 3 (see FIG. 29), since the hand-held apparatus 110 determines that the stationary apparatus 3 cannot accept a reproduction instruction.

Next, the being-reproduced flag 4106 to be included in the stationary-apparatus-side control data 410 is set to indicate "on" (step S208). Next, a state of the reproduction currently executed is detected, and in accordance with the detected state, data such as the request-acceptance-possible flag 4107, the current frame number data 4104, and the like, which are to be included in the stationary-apparatus-side control data 410, are set to indicate the state of the reproduction currently executed on the stationary apparatus 3, thereby generating the stationary-apparatus-side control data 410 (step S209).

Next, processing for transmitting the stationary-apparatus-side control data 410 generated in step S209 to the hand-held apparatus 100 is executed (step S210).

Thereafter, it is determined whether or not an instruction to terminate communication is given by the player by performing a predetermined operation on the stationary apparatus 3 (step S211). In the result of the determination, if it is determined that the instruction to terminate communication is given (YES in step S211), the reproduction of the video is stopped and processing for terminating communication with the hand-held apparatus 100 is executed (step S215). In the present embodiment, execution of the processing for terminating communication is led by the stationary apparatus 3. That is, the stationary apparatus 3 transmits the instruction to terminate communication to the hand-held apparatus 100, and then the stationary apparatus 3 executes the processing for terminating communication.

On the other hand, in the result of the determination of step S211, if it is determined that an instruction to terminate communication is not given (NO step S211), processing returns to step S200 and is executed from step S200 again.

Next, processing executed when it is determined in the result of the determination of step S201 that the hand-held-apparatus-side control data 508 is not received (NO in step S201), is described. In this case, it is determined whether or not the reproduction of the video started in step S206 is ended (step S212). In the result, if it is determined that the reproduction is not ended (NO in step S212), processing proceeds to step S209 to execute processing for generating the stationary-apparatus-side control data 410 indicating a state of the reproduction currently executed, and then processing for transmitting the stationary-apparatus-side control data 410 to the hand-held apparatus 100 is executed.

On the other hand, if it is determined that the reproduction is ended (YES in step S212), the reproduction mode flag 5084j of the received hand-held-apparatus-side control data 411 is referenced and thereby it is determined whether or not the reproduction mode is "loop" (step S213). In the result of the determination, if it is determined that the reproduction mode is "loop" (YES in step S213), processing proceeds to step S203 to start preparing for a reproduction of the video again. On the other hand, if it is determined that the reproduction mode is not "loop" (NO in step S213), since it is considered that the reproduction mode flag 5084j is "one play", the being-reproduced flag 4106 is set to be off (step S214) to notify the hand-held apparatus 100 that the reproduction of the video is ended. Thereafter, processing is executed from step S209 and thereby the stationary-apparatus-side control data 410 in which the being-reproduced flag 4106 indicates "off" is transmitted to the hand-held apparatus 100

On the other hand, in the result of the determination of step S202, if it is determined that the instruction from the hand-held apparatus 100 is not an instruction to reproduce a video (NO in step S202), since the instruction type data 5081j of the received hand-held-apparatus-side control data 411 indicates "quitting of a game", processing proceeds to step S215 to execute processing for terminating communication between the stationary apparatus 3 and the hand-held apparatus 100. The stationary-apparatus-side coordination processing executed by the stationary apparatus 3 is ended here.

As described above, in the present embodiment, the stationary apparatus 3 obtains, from the server 200, a coordination application which is operated on the hand-held apparatus 100, and video data which is created, in advance, in association with the coordination application. Then, the stationary apparatus 3 transmits only the coordination application to the hand-held apparatus 100, and reproduces a predetermined video among videos in the video data in coordination with the coordination application executed on the hand-held apparatus 100. Thus, the stationary apparatus 3 reproduces different videos depending on processing being executed on the hand-held apparatus 100, whereby an innovative and new way to enjoy a game can be provided.

Moreover, since processing for selecting a video to be reproduced is executed mainly by the hand-held apparatus 100, the stationary apparatus 3 only needs to implement processing related to a reproduction of a video. As a result, the stationary apparatus 3 does not need to implement processing which is directly related to a game, whereby a processing load on the stationary apparatus 3 can be reduced.

Moreover, in the present embodiment, as in a video reproduced on the first turn of the player, a plurality of videos are prepared for one scene to select in a random manner and reproduce a video among them. Thus, various developments of the game can be generated.

Moreover, when the hand-held apparatus 100 transmits a reproduction instruction to the stationary apparatus 3, processing for confirming that a designated video is properly reproduced on the stationary apparatus 3. Therefore, an execution of a reproduction of a video in coordination with processing being executed on the hand-held apparatus 100 can be further ensured.

In the present embodiment, a start frame number and an end frame number are used when a reproduction instruction of a predetermined video in video data is transmitted, whereby the predetermined video is reproduced. However, instead of such a method of designating a video, for example, a "chapter" may be set for video data and the "chapter" may be designated. However, depending on a method of creating video data, a format for designating a "chapter" can differ. Therefore, the method of designating a frame number has more versatility and thereby is more advantageous than that of designating a "chapter".

In the present embodiment, one piece of video data includes a video corresponding to a plurality of scenes. However, instead, one piece of video data (video file) may include one video corresponding to one scene. In this case, for example, a file name is designated instead of a start frame and an end frame, whereby a video in coordination with processing being executed on the hand-held apparatus 100 can be reproduced on the stationary apparatus 3.

In the present embodiment, the video data 406 and the coordination application 407 for the stationary apparatus 3 are downloaded and provided to the stationary apparatus 3. Instead, for example, a storage medium such as a DVD or the like may be used to provide the video data 406 and the coordination application 407 as described above to the stationary apparatus 3.

In the present embodiment, if a player performs an input operation during a reproduction of a "chat" video in the processing of, e.g., steps S42 to S46 for waiting the player's input operation, the next processing (processing from step S47) is immediately executed. However, instead, even if a predetermined condition is satisfied (in this case, a player performs an input operation), the next processing may be executed after a reproduction of a video currently performed is finished, without immediately executing the next processing. That is, the next processing may be executed when a predetermined condition is satisfied and a reproduction of a video currently performed is finished.

In the present embodiment, there is described an example in which the coordination processing is executed between the stationary apparatus 3 and the hand-held apparatus 100. However, apparatuses used in the coordination processing are not limited to the stationary apparatus 3 and the hand-held apparatus 100. For example, the coordination processing may be executed between a personal computer and a portable information terminal such as a PDA or a mobile phone.

While example embodiments of the invention has been described in detail, the foregoing description is in all aspects illustrative and not restrictive. It is understood that numerous other modifications and variations can be devised without departing from the scope of the invention.

What is claimed is:

1. An information processing system comprising a first information processing apparatus and a second information processing apparatus,
the first information processing apparatus including:
an execution result output unit configured to output an execution result of an application;
a control data generator configured to generate control data in accordance with a state of an execution of the application; and
a first transmitter configured to transmit the control data to the second information processing apparatus,
the second information processing apparatus including:
video storage memory configured to store at least one piece of video data;
a video reproduction unit configured to reproduce a video, based on the video data stored in the video storage memory;
a first receiver configured to receive the control data transmitted by the first transmitter; and
a reproduced video determining unit configured to determine video to be reproduced by the video reproduction unit, based on the received control data,
the information processing system further including a third information processing apparatus in which the video data and the application are stored,
the third information processing apparatus including a second transmitter configured to transmit a set of the video data and the application to the second information processing apparatus,
the second information processing apparatus further including:
a second receiver configured to receive the set of the video data and the application transmitted by the second transmitter; and
a third transmitter configured to transmit to the first information processing apparatus the application received by the second receiver,
the first information processing apparatus further including a third receiver configured to receive the application transmitted by the third transmitter,
the execution result output unit being configured to output an execution result of the application received by the third receiver, and
the video reproduction unit being configured to reproduce the video determined by the reproduced video determining unit, based on the video data.

2. The information processing system according to claim 1, wherein
the control data is data for designating a part of a video included in the video data,
the reproduced video determining unit is configured to determine the part of the video included in the video data, based on the received control data, and
the video reproduction unit is configured to reproduce the part, of the video, determined by the reproduced video determining unit.

3. The information processing system according to claim 1, wherein
the first information processing apparatus further includes video designating unit configured to designate, in a random manner, one of pieces of information which respectively indicate a plurality of candidate videos defined in advance as candidates to be reproduced, in accordance with the state of the execution of the application, and
the control data generator is configured to generate, as the control data, data including the piece of information about a video designated by the video designating unit.

4. The information processing system according to claim 3, wherein
the first information processing apparatus further includes first determination unit configured to determine whether or not the state of the execution of the application satisfies one of a first condition and a second condition, and
the video designating unit is configured to, when the first determination unit determines that the first condition is satisfied, designate a piece of information which indicates a predetermined video defined in advance and, when the first determination unit determines that the second condition is satisfied, designate, in a random manner, one of the pieces of information which respectively indicate the plurality of candidate videos defined in advance as the candidates to be reproduced.

5. The information processing system according to claim 1, wherein
the control data generator is configured to generate, as the control data, data including a loop reproduction instruction that is an instruction to repeat the reproduction of the video, in accordance with the state of the execution of the application, and
the video reproduction unit is configured to, when the received control data includes the loop reproduction instruction, repeatedly reproduce the video determined by the reproduced video determining unit until the first receiver receives other control data.

6. The information processing system according to claim 1, wherein
the control data generator is configured to generate, as the control data, data including one of a loop reproduction instruction that is an instruction to repeat the reproduction of the video, and a one play instruction that is an instruction to perform the reproduction of the video only one time, in accordance with the state of the execution of the application, and
the video reproduction unit is configured to, when the received control data includes the loop reproduction instruction, repeatedly reproduce the video determined by the reproduced video determining unit until the first receiver receives other control data, and, when the received control data includes the one play reproduction instruction, reproduce only one time the video determined by the reproduced video determining unit until the first receiver receives other control data.

7. The information processing system according to claim 3, wherein
the second information processing apparatus further includes a fourth transmitter is configured to, when the reproduction of the video determined by the reproduced video determining unit is ended, transmit reproduction completion data indicating that the reproduction of the video is ended to the first information processing apparatus,
the first information processing apparatus further includes a fourth receiver configured to receive the reproduction completion data transmitted by the fourth transmitter, and
the video designating unit, when the fourth receiver receives the reproduction completion data, designates, in a random manner, one of the pieces of information which respectively indicate the plurality of candidate videos defined in advance as the candidates to be reproduced.

8. The information processing system according to claim 1, wherein
the second information processing apparatus further includes a fourth transmitter configured to, when the reproduction of the video determined by the reproduced video determining unit is ended, transmit reproduction completion data indicating that the reproduction of the video is ended to the first information processing apparatus,
the first information processing apparatus further includes:
a video designating unit configured to designate, in a random manner, one of pieces of information which respectively indicate a plurality of candidate videos defined in advance as candidates to be reproduced, in accordance with the state of the execution of the application;
a fourth receiver configured to receive the reproduction completion data transmitted by the fourth transmitter; and
a second determination unit is configured to determine whether or not the state of the execution of the application satisfies a third condition,
the video designation unit is configured to designate, in a random manner, a piece, of information, which indicates a video among a first candidate video group which includes at least two or more videos of the plurality of candidate videos defined in advance as the candidates to be reproduced,
the control data generator is configured to generate, as the control data, data including the piece of information designated by the video designating unit, and
when the fourth receiver receives the reproduction completion data after the reproduction of the video based on the control data is started on the second information processing apparatus, the video designating unit is configured to, when the second determination unit determines that the third condition is not satisfied, designate in a random manner a piece of information which indicates a next video to be reproduced among the first candidate video group, and, when the second determination unit determines that the third condition is satisfied, designate in a random manner a piece of information which indicates a next video to be reproduced among a second candidate video group which includes a plurality of videos different from those included in the first candidate video group.

9. The information processing system according to claim 1, wherein
the first information processing apparatus further includes a frame designating unit configured to designate a reproduction start frame number and a reproduction end frame number of a video included in the video data, in accordance with the state of the execution of the application, and
the control data generating unit is configured to generate, as the control data, data including the content of the designation performed by the frame designating unit.

10. The information processing system according to claim 1, wherein:
the second information processing apparatus further includes a reproduction state transmitter is configured to repeatedly transmit, to the first information processing apparatus, reproduction state data indicating a state of a reproduction of a video executed by the video reproduction unit;
the first information processing apparatus further includes
a reproduction state receiver configured to receive the reproduction state data transmitted by the reproduction state transmitter, and
a reproduction start confirmation unit configured to determine, based on the reproduction state data received by the reproduction state receiver, whether or not the reproduction of the video is properly started on the second information processing apparatus, after the control data is transmitted by the first transmitter; and
the execution unit is configured to repeatedly cause the reproduction start confirmation unit to repeatedly perform the determination until the reproduction start confirmation unit determines that the reproduction of the video is properly started on the second information processing apparatus, after the control data is transmitted by the first transmitter.

11. The information processing system according to claim 10, wherein
the control data generator is configured to generate, as the control data, data including information about a reproduction range of a video included in the video data,
the reproduction state generator is configured to generate, as the reproduction state data, data including information about a frame number of a video being reproduced by the video reproduction unit, and
the reproduction start confirmation unit is configured to determine, based on the information about the reproduction range of the video and the information about the frame number of the video being reproduced indicated by the reproduction state data, whether or not the reproduction of the video is properly started on the second information processing apparatus.

12. The information processing system according to claim 10, wherein
the reproduction start confirmation unit is configured to determine whether or not the reproduction of the video is properly started on the second information processing apparatus within a predetermined time period after the control data is transmitted by the first transmitter, and
the first transmitter is configured to transmit again the control data when the reproduction start confirmation unit determines that the reproduction of the video is not properly started on the second information processing apparatus within a predetermined time period.

* * * * *